(12) United States Patent
Goto

(10) Patent No.: US 7,179,982 B2
(45) Date of Patent: Feb. 20, 2007

(54) MUSICAL COMPOSITION REPRODUCTION METHOD AND DEVICE, AND METHOD FOR DETECTING A REPRESENTATIVE MOTIF SECTION IN MUSICAL COMPOSITION DATA

(75) Inventor: Masataka Goto, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/532,400

(22) PCT Filed: Oct. 23, 2003

(86) PCT No.: PCT/JP03/13563

§ 371 (c)(1),
(2), (4) Date: Jul. 15, 2005

(87) PCT Pub. No.: WO2004/038694

PCT Pub. Date: May 6, 2004

(65) Prior Publication Data

US 2005/0241465 A1    Nov. 3, 2005

(30) Foreign Application Priority Data

Oct. 24, 2002   (JP)   ............... 2002-309519
Jan. 31, 2003   (JP)   ............... 2003-025331
Sep. 30, 2003   (JP)   ............... 2003-342676

(51) Int. Cl.
*G10H 7/00*   (2006.01)

(52) U.S. Cl. ............... 84/616; 84/609; 348/465; 369/275.2

(58) Field of Classification Search ............... 84/609, 84/616, 615, 653, 654; 715/727; 348/465; 369/275.2
See application file for complete search history.

(56) References Cited

U.S. PATENT DOCUMENTS 5,737,308 A * 4/1998 Nakai et al. ............. 369/275.2
5,918,223 A * 6/1999 Blum et al. ............... 707/1

(Continued)

FOREIGN PATENT DOCUMENTS

JP    07-284064    10/1995

OTHER PUBLICATIONS

Academic Paper, Six Probabilistic Retrieval.

(Continued)

*Primary Examiner*—Lincoln Donovan
*Assistant Examiner*—Christina Russell
(74) *Attorney, Agent, or Firm*—Rankin, Hill, Porter & Clark LLP

(57) ABSTRACT

The present invention provides a music playback system which uses an interface to easily play back a characteristic musical structure section with a music audio data playback apparatus. The interface 13 includes a function of selecting an arbitrary characteristic music structure section from a plurality of characteristic music structure sections, and a function of visualizing a characteristic music structure section. The characteristic music structure section specifying data for specifying the selected arbitrary characteristic music structure section is given to a music audio data playback apparatus 3. The music audio data playback apparatus 3 changes a playback position of the music audio data to the characteristic music structure section specified by the characteristic music structure section specifying data given by a specifying data providing means 12.

46 Claims, 37 Drawing Sheets

U.S. PATENT DOCUMENTS

| | | | |
|---|---|---|---|
| 6,972,363 B2 * | 12/2005 | Georges et al. | 84/609 |
| 2002/0020279 A1 | 2/2002 | Funaki | |
| 2002/0026867 A1 | 3/2002 | Hasegawa et al. | |
| 2004/0001161 A1 * | 1/2004 | Herley | 348/465 |

OTHER PUBLICATIONS

Academic Paper, Seven EVALUATION.

Academic Paper, Eight The Future.

Academic Paper, Papipuun: Music Summarization System based on GTTM.

Academic Paper, Information Retrieval.

Academic Paper, RWC Music Database: Popular, Classical, and Jazz Music Database.

Academic Paper, Mathematical Representation of Joint Time-Chroma Distribution.

Academic Paper, Circularity in Judgments of Relative Pitch.

Academic Paper, Music Summarization Using Key Pharases.

Academic Paper, Extraction of Features of "Sabi" from the Score in Japanese Popular Music Songs—in the case of Tetsuya Komuro—. (p. 4 of spec.).

Academic Paper, Smoothing and Differentiation of Data by simplified Least Squares Procedures.

Academic Paper, The Transactions of the Institute of Electronics and Communication Engineers of Japan. (p. 4 of spec.).

* cited by examiner

Fig.5
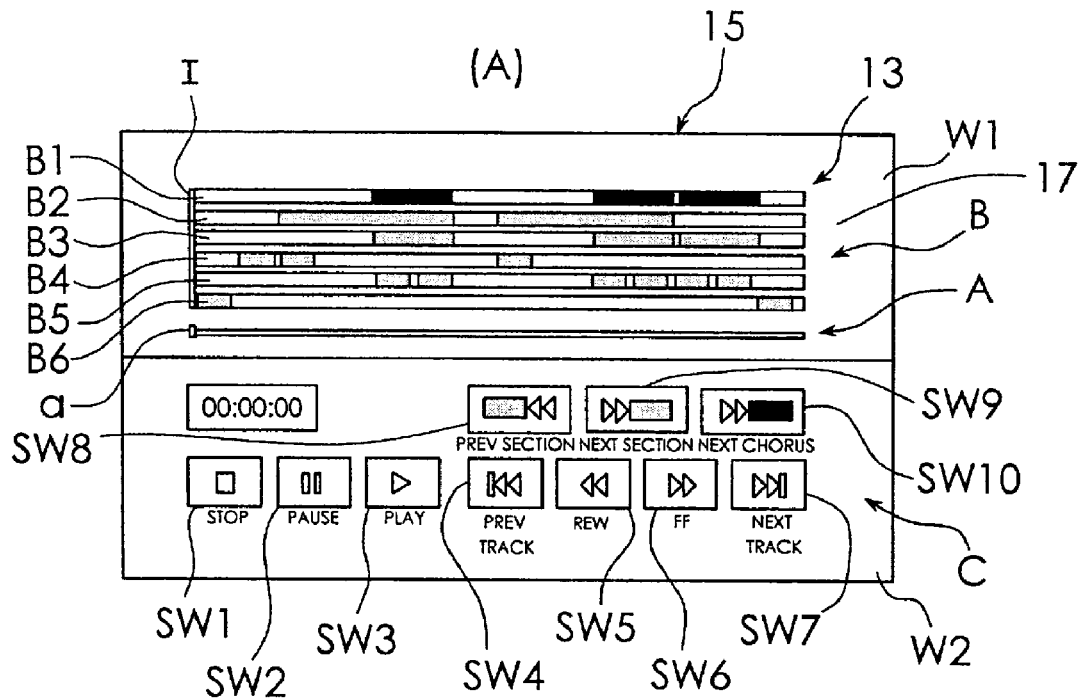
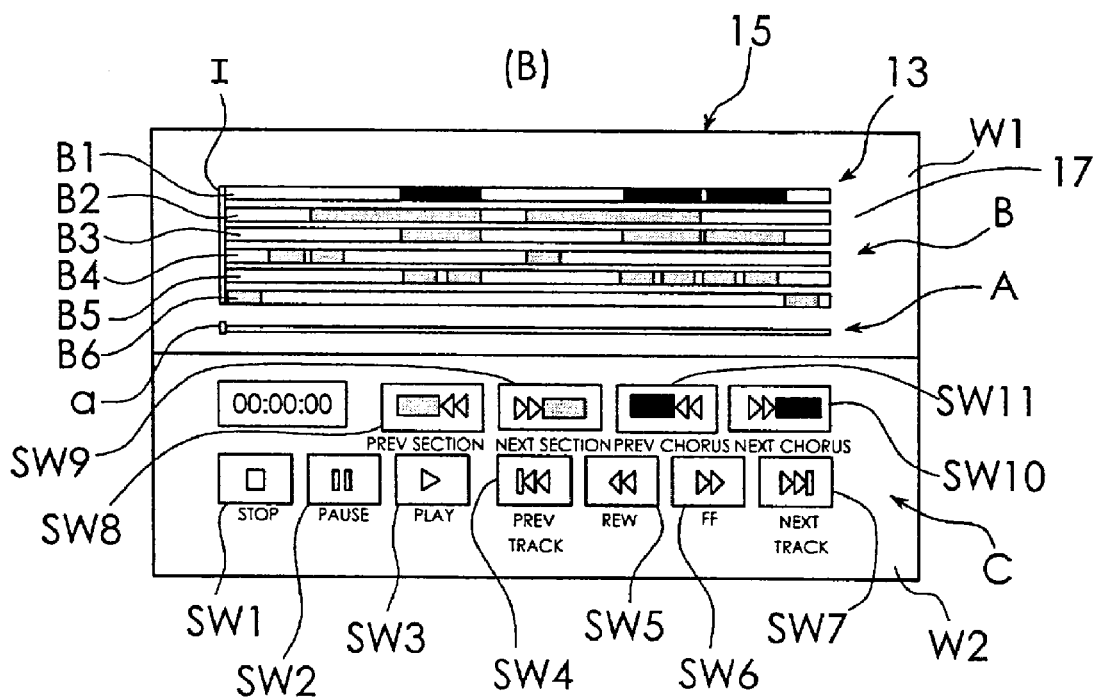

Fig.19
STFT power spectrum
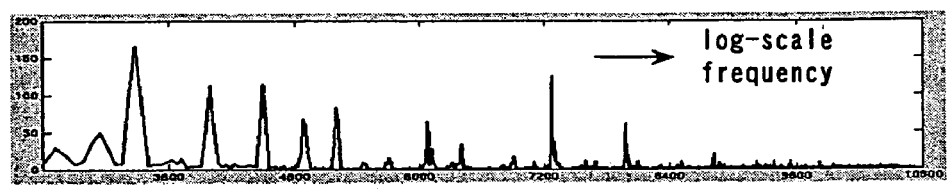
130 Hz 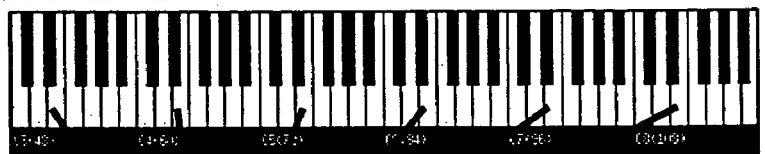 8k Hz
Summation over 6 octoves
Chroma vector
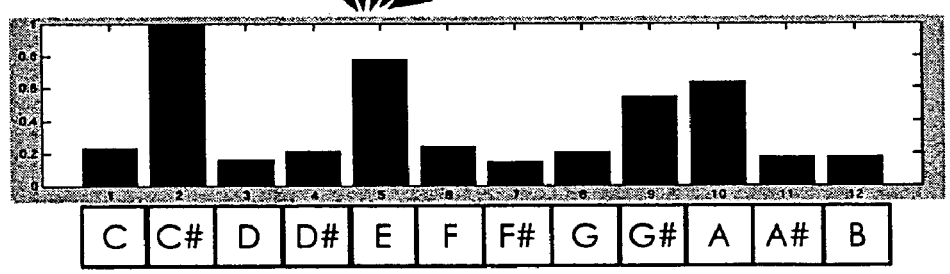
| C | C# | D | D# | E | F | F# | G | G# | A | A# | B |

Voting Space

Chroma vector of a chorus shifted up by a semitone

Modulation width 1: one shift

Modulation width 0
Modulation width 1
Modulation width 11

Integrate groups of similarity line segments.

MUSICAL COMPOSITION REPRODUCTION METHOD AND DEVICE, AND METHOD FOR DETECTING A REPRESENTATIVE MOTIF SECTION IN MUSICAL COMPOSITION DATA

FIELD OF THE INVENTION

This invention relates to a method and an apparatus for selectively playing back characteristic music structure sections such as chorus sections, in music. It also relates to a method for detecting the characteristic music structure sections (chorus sections).

BACKGROUND ART

Conventionally, in the research area of music information processing a number of research studies have been conducted on musical retrieval or music understanding. On the contrary, there have been no studies focusing on trial listening of music. At present, in "trial listening" to music prerecorded on compact discs (CDs), at a music store, a trial listener often picks out only those sections of interest while fast-forwarding the CD, and listens to them. This is because the main object of trial listening is to quickly determine whether a selection is the one piece of music the listener has been looking for, and whether or not he/she likes it. In the case of popular music, for example, customers often decide by trial listening to sections having some characteristic music structure (hereinafter referred to as characteristic music structure sections), such as chorus sections (i.e., chorus or refrain) that are the most representative, uplifting part of the music, or melody sections that are usually performed repeatedly. This produces a special way of listening in which the trial listener first listens briefly to the music's "intro", then skips middle parts of the music by pushing the fast-forward button repeatedly in search of characteristic music structure sections such as chorus or repeated sections, and eventually playing back the characteristic music structure section.

The functions provided by conventional listening stations for music CDs, however, do not support this unique way of trial listening. These listening stations are equipped with playback-operation buttons typical of an ordinary CD player, and among these, only the fast-forward and rewind buttons can be used to find the chorus section (of the music). On the other hand, digital listening stations that have recently come to be installed in CD stores enable playback of several hundred thousands of musical selections stored in MP3 or other compression formats from a hard disk or over the network. However, as only the beginning of each musical selection (an interval of about 45 seconds) is mechanically excerpted and stored, a trial listener may not necessarily hear the characteristic music structure part. Although recently music that begins with the chorus is on the increase in Japan's popular music world, according to the inventor's survey, only about 20% of the pieces of music on Japan's popular music hit chart (top 20 singles ranked weekly from January to December 2001) was featuring a chorus that begins within 40 seconds from the start of the music.

In one of the conventional chorus detection methods, one chorus section of a specified length is incompletely extracted as a representative part of audio signals of a piece of music. Logan, B. and Chu, S., Music Summarization Using Key Phrases, Proc. Of ICASSP 2000, II749–752 (2000), proposed a method of labeling a short extracted frame (1 second) based on acoustic features thereof, wherein a frame having the most frequent label is considered as a chorus. The labeling utilized clustering based on similarity in acoustic features among respective sections, or hidden Markov model. Bartsch, M. A. and Wakefield, G. H., To Catch A Chorus: Using Chroma-based Representations for Audio Thumbnailing, Proc. of WASPAA 2001, 15–18 (2001), proposed a method of dividing a piece of music into short frames for every beat based on the result of beat tracking, and extracting a part, as a chorus, which has the highest similarity of acoustic features thereof across sections of a certain specified length. Foote J., Automatic Audio Segmentation Using a Measure of Audio Novelty, Proc. of ICME 2000, I-452–455 (2000), pointed out a possibility that a chorus can be extracted, as an application of detecting a boundary based on similarity in the acoustic features among very short fragments (frames).

Although there are the prior art intended for expression equivalent to musical notes such as a standard MIDI file, etc. (e.g., Meek, C. and Birmingham, W. P., Thematic Extractor, Proc. of ISMIR 2001, 119–128 (2001); and Jun Muramatsu, Extraction of Features in Popular Songs Based on Musical Notation Information of "Chorus" —Case of Tetsuya Komuro, The special Interest Group Note of IPSJ, Music Information Science, 2000-MUS-35-1, 1–6 (2000)), this technology could not be directly applied to mixed sounds wherein it was difficult to separate sound sources. The conventional chorus section detecting method could simply extract and present sections of a certain specified length at any given time, and could not estimate where the chorus sections begin and end. Furthermore, no prior art have taken modulation into consideration.

An object of the present invention is to provide a method and a system capable of easily playing back characteristic music structure sections selected by an interface by using a musical audio data playback apparatus, and an interface and a program to be used for the system.

Another object of the present invention is to provide a music playback method and system capable of easily playing back particularly chorus sections in music by using a musical audio data playback apparatus, and an interface to be used for the system.

Further another object of the present invention is to provide a music playback method and system capable of reliably identifying chorus sections in music, and an interface to be used for the system.

Still another object of the present invention is to provide a music playback method and system capable of visually checking distribution of characteristic music structure sections and playback status of musical audio data, and an interface to be used for the system.

Yet another object of the present invention is to provide a music playback method and system capable of visually distinguishing the presence of chorus sections and repeated sections, and an interface to be used for the system.

Another object of the present invention is to provide a music playback method and system capable of selectively playing back characteristic music structure sections merely with an operator's manipulation of selection buttons, and an interface to be used for the system.

Further another object of the present invention is to provide a method for easily extracting characteristic music structure sections from statistical data.

Still another object of the present invention is to provide a method, a system, and a program for detecting a chorus section in music audio data, whereby problems with the prior art can be solved and all and any chorus sections appearing in music can be detected.

Yet another object of the present invention is to provide a method, a system, and a program for detecting a chorus section in musical audio data, whereby it can be detected where one chorus section begins and ends.

Another object of the present invention is to provide a method, a system, and a program for detecting a chorus section in musical audio data, whereby a modulated chorus section can be detected.

Further another object of the present invention is to provide an apparatus for detecting a chorus section in musical audio data, whereby not only chorus sections but also other repeated sections can be displayed onto a display means.

Still another object of the present invention is to provide an apparatus of detecting a chorus section in musical audio data, whereby not only chorus sections but also other repeated sections can be played back.

DISCLOSURE OF THE INVENTION

In an entire music structure of music, a chorus is the most representative, uplifting subject part. Usually, as a chorus is repeated most frequently in a piece of music and thus impresses listeners, even a music layman who has not been trained in music can easily determine where the chorus is when listening to music. In addition, results of chorus detection are useful in various applications. For instance, it would be convenient if a lead of the chorus could be briefly played back (previewed) (this can be considered as a musical version of thumbnail of images) when a listener browses a number of pieces of music or presents search results in a music search system. In addition, in the music search system that uses a singing voice as a search key, searching accuracy and efficiency will improve if a search is targeted only for chorus sections. Then, implementation of the chorus detection technology according to the present invention also enables automatic indexing of chorus sections.

A music playback method for playing back music audio data using a musical audio data playback apparatus for playing back music audio data according to the present invention executes a first step to a third step. The music audio data typically includes various types of audio data that can be played back, such as an analog audio signal, a digital audio signal and MIDI data (standard MIDI file) and may be either compressed or uncompressed. In addition, in the former case, data may be compressed in any compression format. "A plurality of characteristic music structure sections" as will be described later contain the above mentioned chorus section and/or repeated sections. Of course, "a plurality of characteristic music structure sections" may consist of the chorus sections or repeated sections only.

At the first step, a plurality of characteristic music structure section specifying data are prepared in advance to specify a plurality of characteristic music structure sections in respect of music audio data to be played back. A plurality of characteristic music structure section specifying data refers to data relating a beginning position and an end position of a characteristic music structure section. For instance, a beginning position and an end position of the characteristic music structure section can be expressed as positional data in the music audio data to be played back, or as positional data represented as the time needed to reach that position after performance has actually started. Although a plurality of characteristic music structure section specifying data may be combined with the music audio data, i.e., both may be combined into a set, it may be separate or independent from the music audio data. With this arrangement, one who has already obtained the music audio data can obtain a plurality of characteristic music structure section specifying data corresponding to the music later via a network. On the other hand, if a plurality of characteristic music structure section specifying data have been combined with the music audio data, the characteristic music structure section specifying data will be downloaded together with the music audio data when downloading the data, which is convenient because one does not need to consider correspondence between the both data.

A method of extracting a plurality of characteristic music structure sections may be optional. For instance, they may be automatically extracted from the music audio data by an arbitrary method. One may identify (label) a plurality of characteristic music structure sections while playing back the music audio data, and identify the plurality of characteristic music structure sections by using a labeling editor dedicated to that purpose. In addition, one may identify a plurality of characteristic music structure sections, and create a plurality of characteristic music structure section specifying data for specifying the identified plurality of characteristic music structure sections, based on statistical data on playback behaviors of trial listeners who have played back the music audio data. In this case, for instance, sections, for which the number of times more than one trial listener trial listened to or played back is large or sections that were trial listened to or played back for many times (more than a predetermined number of times) can be identified as characteristic music structure sections. In this case, data on sections that are played back many times by more than one trial listener may be collected from more than one music playback apparatuses for trial listening connected to a network. This enables easy acquisition of a vast amount of data. By making acquired data visually recognizable as a histogram, a plurality of characteristic music structure sections may be identified according to the histogram. This facilitates identification of characteristic music structure sections from statistical data. Thus, based on the above-mentioned trial listening by trial listeners, characteristic music structure sections or parts can be easily extracted even from music for which it seems difficult to detect a chorus part from the music structure.

At the second step, an interface for selecting an arbitrary characteristic music structure section from a plurality of characteristic music structure sections is provided. The interface connects an operator with an apparatus, and may be at least provided with a part to be selectively operated by the operator and a function of issuing the selection result. Therefore, the simplest interface may be constructed by selection buttons comprising analog or digital switches. If the interface is constructed only by the selection buttons, a listener has to manipulate the selection buttons while listening to the played back music. Only with the selection buttons, the listener cannot know how many characteristic music structure sections are present in what part of the music audio data. For this reason, the listener may manipulate the selection buttons more often than necessary. Furthermore, only with the selection buttons, the listener cannot purposefully trial listen to characteristic music structure sections of a same type if there is more than one type of characteristic music structure sections.

Now in order to solve such problems, the interface provided at the second step may have a graphic display portion for graphically displaying a length of the music audio data along a time axis, and also graphically displaying, along the time axis, a playback position of the music audio data which is being played back by the music audio data playback apparatus and the plurality of characteristic music structure sections. Use of such an interface enables a listener to visually recognize a positional or temporal relationship between a current playback position and more than one characteristic music structure section, by looking at what is displayed on the graphic display portion. Thus, the listener can now arbitrarily select a characteristic music structure section in any place while looking at the graphic display portion. If performance time is long, the entire performance time length may not be graphically displayed in one screen. In such a case, a part corresponding to some of the performance time length may be graphically displayed on the screen, and the screen may be scrolled as the time elapses.

When the interface is provided with a graphic display portion, if a plurality of characteristic music structure sections include a plurality of chorus sections indicative of chorus parts of a piece of music, and a plurality of repeated sections indicative of repeated parts of the music, the plurality of chorus sections and the plurality of repeated sections are preferably displayed distinctively on the graphic displayportion. This facilitates arbitrary selection of the chorus and repeated sections while looking at the graphic display.

The interface has one or more selection buttons to be manipulated by an operator for selecting an arbitrary characteristic music structure section from a plurality of characteristic music structure sections. The selection buttons typically include various types of selection buttons, such as an analog type selection button to be manually manipulated, a selection button of the type that determines the ON/OFF condition when the button displayed on the screen is clicked by the operator's finger or a cursor (graphic display button) and a selection button of the type that determines the selection through voice recognition. Particularly, it is preferable to construct the interface so that the one ore more selection buttons include one or more chorus section selection buttons for selecting only the chorus sections from the plurality of characteristic music structure sections. This arrangement of such dedicated selection buttons enables anyone without special knowledge to easily play back the chorus sections, thereby making the interface more fit for general purposes. Preferably, the one or more chorus section selection buttons include a first chorus section selection button for selecting a previous chorus section, and a second chorus section selection button for selecting a next chorus section. With this arrangement, the listener can more flexibly select a chorus section, and can repeatedly play back the chorus section. The one or more selection buttons may include a first repeated section selection button for selecting a previous repeated section when selecting the plurality of repeated sections and a second repeated section selection button for selecting a next repeated section when selecting the plurality of repeated sections. Also, in this case, the listener can more flexibly select a repeated section, and can repeatedly play back the repeated section.

At a third step, after playback of the music audio data using the music audio data playback apparatus has been started, a playback position of the music audio data by the music audio data playback apparatus is changed to an arbitrary characteristic music structure section, based on characteristic music structure section specifying data corresponding to the arbitrary characteristic music structure section which has been selected by the operator using the interface. In other words, even in the middle of musical performance, when the interface issues a command to change the playback position to a specific characteristic music structure section, the playback position will be accordingly changed based on the command.

Of course, the selected section may be played back only when the arbitrary characteristic music structure section is selected on the interface. In such a case, at the third step, the music audio data playback apparatus may be caused to play back the arbitrary characteristic music structure section, based on the characteristic music structure section specifying data corresponding to the arbitrary characteristic music structure section which an operator has selected by using the interface.

The music playback system for implementing the method according to the present invention has a music audio data playback apparatus for playing back music audio data and a function of playing back an arbitrary characteristic music structure section selected from a plurality of characteristic music structure sections in a piece of music. The music playback system according to the present invention further comprises an interface, a characteristic music structure section specifying data storage means, and a specifying data providing means. The interface has a function of selecting an arbitrary characteristic music structure section from the plurality of characteristic music structure sections. The characteristic music structure section specifying data storage means stores characteristic music structure section specifying data for specifying the plurality of characteristic music structure sections that have been predetermined corresponding to the music audio data to be played back. The specifying data providing means provides the music audio data playback apparatus with the characteristic music structure section specifying data for specifying the arbitrary characteristic music structure section selected by the interface. The music audio data playback apparatus is so constructed as to change a playback position to the characteristic music structure section specified by the characteristic music structure section specifying data which has been provided by the specifying data providing means. The apparatus according to the present invention can play back the arbitrary characteristic music structure section selected by the interface even during playback of the music. It can also play back the arbitrary characteristic music structure section selected by the interface even when the music is not being played back. If the characteristic music structure section specifying data accompanies the music audio data, the characteristic music structure section specifying data storage means may read and store the characteristic music structure section specifying data accompanying the music audio data.

The music playback system may further comprise a characteristic section specifying data generation means for automatically extracting from the music audio data the plurality of characteristic music structure sections in the music and generating the characteristic music structure section specifying data. With this arrangement, the present invention can easily be applied to playback of the existing music.

Further, the present invention can also be identified as a program for causing a computer to perform a function of playing back an arbitrary characteristic music structure section selected from a plurality of characteristic music structure sections in a piece of music by using a system including the computer, a display to be operated based on a command from the computer, and a music audio data playback apparatus for playing back music audio data according to a command from the computer. The program is so constructed as to cause the computer to perform a function of constructing on the display an interface for selecting an arbitrary characteristic music structure section from the plurality of characteristic music structure sections; a function of constructing a characteristic music structure section specifying data storage means for storing characteristic music structure section specifying data for specifying the plurality of characteristic music structure sections which have been predetermined corresponding to the music audio data to be played back; a function of constructing a specifying data providing means for providing the music audio playback apparatus with the characteristic music structure section specifying data for specifying the arbitrary characteristic music structure section selected by the interface; and a function of giving the music audio data playback apparatus a command to play back the characteristic music structure section specified by the characteristic music structure section specifying data which has been provided by the specifying data providing means.

Preferably, the function of constructing the interface on the display is capable of forming on the display one or more selection buttons including a chorus section selection button to be manipulated by an operator for selecting a chorus section included in the plurality of characteristic music structure sections.

According to the present invention, a music listening station, which incorporates a "chorus search" function (chorus section selection button), can be obtained. By simply pressing the chorus section selection button, a trial listener can jump playback to a lead of a chorus section (instantaneous fast-forwarding), which relieves the listener of cumbersome task of searching the chorus section. In addition, by estimating or searching in advance repeated sections other than the chorus section in the music, the trial listener can jump playback to the beginning of a repeated section of a next music structure.

A chorus section detection method of the present invention performs an acoustic feature extraction step, a similarity calculation step, a repeated section listing step, an integrated repeated section determination step, and a chorus section determination step, in order to detect a part corresponding to a chorus section in music audio data of a piece of music for the purpose of detecting repeated chorus sections in the music.

First, at the acoustic feature extraction step, acoustic features are sequentially extracted from the music audio data every predetermined time unit. In a specific embodiment, by using a sampling technology, such as Hanning Window, that carries out duplicated sampling of the music audio data being input, with a predetermined sampling width, sampling is carried out with the predetermined time unit (for instance, 80 ms). Then, acoustic features of the sampled data are extracted. A method of extracting acoustic features is optional. For instance, each of the acoustic features extracted at the acoustic feature extraction step is 12-dimensional chroma vectors obtained by respectively adding, over a plurality of octaves, a power at frequency of each of 12 pitch classes included in a range of one octave. The use of the 12-dimensional chroma vector as acoustic features enables not only extraction of acoustic features of the music over a plurality of octaves, but also the extraction of comparable acoustic features from the audio music data of modulated music.

Next, at the similarity calculation step, similarities between the acoustic features extracted from the music audio data are calculated. An arithmetic expression to be used in calculating similarities is optional and any of well-known equations for calculating similarities may be used. Then, at the repeated section listing step, a plurality of repeated sections repeatedly appearing in the music audio data are listed up, based on the similarities. If the similarity calculation step calculates the similarities between acoustic features newly extracted and all of the acoustic features previously extracted, real-time detection of chorus sections becomes possible.

More specifically, the similarity calculation step calculates the similarities between the 12-dimensional chroma vectors at time t and all of the 12-dimensional chroma vectors during a period from time t to time l lag earlier ($0 \leq l \leq t$) where l is a lowercase letter of L, an alphabetic letter. In this case, the repeated section listing step assumes one axis as a time axis and another axis as a lag axis, and lists up as the repeated section relative to the time axis a similarity line segment having a time length which corresponds to a length of a part where the similarity exceeds a predetermined threshold, when the similarity exceeds the predetermined threshold during a period of time longer than a predetermined time length. This maybe merely listing in calculation, and it does not have to be physical listing on the display means. Therefore, both the time axis and the lag axis may be a theoretical axis. Here, the concept of "similarity line segment" shall be defined in this specification. A similarity line segment is defined as a segment having a time length corresponding to a length of a part for which the similarity exceeds a predetermined threshold, when the similarity exceeds the predetermined threshold for a period of time longer than the predetermined time length. By timely or appropriately changing or adjusting the threshold, noise can be removed. Although threshold setting can remove noise, the similarity line segments, which should otherwise appear, might not appear in some cases. Even in such a case, however, since the repeated section listing step lists up similarity line segments between acoustic features newly extracted and all of the acoustic features previously extracted, it is possible to explore later that there are no similarity line segments that should have appeared, from the relationship with other similarity line segments. Thus, the precision of listing up does not degrade.

At the integrated repeated section determination step, an interrelationship among the plurality of repeated sections listed up are examined and one or more of the repeated sections, which fall within a common section on a time axis, into one integrated repeated section on the time axis, are integrated, and plurality of the integrated repeated sections thus obtained for each of the common sections are grouped into a plurality of types of integrated repeated section rows.

The similarity line segments falling within the common section on the time axis are integrated into the integrated repeated section for each of the common sections. Then, the plurality of the integrated repeated sections are grouped into the plurality of types of the integrated repeated section rows, based on positions and lengths of the common sections on the time axis, and positional relationships relative to the lag axis among the similarity line segments to be grouped. More specifically, the interrelationship among the plurality of listed repeated sections is defined as showing whether or not one or more repeated sections (similarity line segments) are present at earlier lag positions corresponding to a common section on the time axis and whether or not the repeated sections (similarity line segments) are present in the earlier time zone corresponding to those lag positions. Based on the relationship, when one or more repeated sections (similarity line segments) are present in the earlier lag positions corresponding to the common section, these repeated sections are determined as the integrated repeated sections assuming that there are the repeated sections (similarity line segments)

in the common section. Then, at the integrated repeated section determination step, the determined plurality of integrated repeated sections are grouped into the plurality of types of integrated repeated section rows. This grouping is based on commonality of length among the common sections, the positional relationship among the repeated sections (similarity line segments) present in the common section, and the numbers of such repeated sections. The grouping enables structuralization of the repeated sections of different types.

In this arrangement, the integrated repeated sections can be obtained, corresponding to the second and subsequent repeated sections, for all of which the similarities have been calculated. However, the first repeated section is not included in the integrated repeated section row. Then, at the integrated repeated section determination step, the integrated repeated section row may be created by complementing a first repeated section not included in the integrated repeated sections.

At the chorus section determination step, the repeated chorus sections are determined from the plurality of types of integrated repeated section rows. For example, the chorus section determination step evaluates chorus possibility for each of the integrated repeated sections included in each of the integrated repeated rows, based on a mean of the similarities of the integrated repeated sections included in each of the integrated repeated section rows and the number and length of the integrated repeated sections included in each of the integrated repeated section rows, and defines the integrated repeated sections, included in the integrated repeated section row, having the highest chorus possibility as the chorus sections. The method of defining the chorus possibility is not be limited to one method, and definition based on a better criterion of the chorus possibility will accordingly improve the detection accuracy.

When music involves modulations, the following steps will be performed. First, the acoustic feature extraction step obtains 12 types of the acoustic features having different modulation widths by shifting the acoustic features comprising the 12-dimensional chroma vectors, by one modulation width, 11 times. Next, the similarity calculation step calculates the similarities between the acoustic features newly extracted and all of the acoustic features of the 12 types previously obtained to define the similarities between the 12-dimensional chroma vectors indicative of the acoustic features newly extracted at time t and the 12-dimensional chroma vectors indicative of all of the acoustic features of the 12 types that have been obtained during a period from time t to time 1 lag earlier ($0 \leq 1 \leq t$). Then, the repeated section listing step assumes one axis as a time axis t and another axis as a lag axis l, and lists up the similarity line segments as the repeated sections relative to the time axis respectively for the 12 types of the acoustic features, wherein each of the similarity line segments has a time length corresponding to a length of a part where the similarity exceeds a predetermined threshold during a period of time longer than a predetermined time length.

The integrated repeated section determination step integrates the similarity line segments falling within the common section on the time axis into an integrated repeated section for each of the 12 types of the acoustic features. The step groups a plurality of the integrated repeated sections determined for the 12 types of the acoustic features into the plurality of types of integrated repeated section rows with consideration given to the plurality of types of modulations, based on positions and lengths of the common sections on the time axis, and positional relationships relative to the lag axis among the similarity line segments to be grouped. With this arrangement, even for music audio data that includes modulations, correct extraction of the acoustic features of the modulated part can be done, since the similarity of the acoustic features of the modulated part is determined by shifting them with the modulation widths of 11 steps. Consequently, even when the repeated sections are modulated, it is possible to determine with high accuracy whether or not they are repeated sections of the same feature (verse A, verse B, chorus).

A chorus section detection apparatus of the present invention detects a part corresponding to a chorus section in music audio data of a piece of music and displays the part on a display means in order to detect repeated chorus sections in the music. The chorus section detection apparatus comprises an acoustic feature extraction means for sequentially extracting acoustic features from the music audio data every predetermined time unit; a similarity calculation means for calculating similarities between the acoustic features extracted from the music audio data; a repeated section listing means for listing up a plurality of repeated sections repeatedly appearing in the music audio data, based on the similarities; an integrated repeated section determination means for examining an interrelationship among the plurality of repeated sections listed up, integrating one or more of the repeated sections, which fall within a common section on a time axis, into one integrated repeated section, and grouping a plurality of the integrated repeated sections thus obtained into a plurality of types of integrated repeated section rows; and a chorus section determination means for determining the chorus sections from the plurality of types of integrated repeated section rows. The integrated repeated section rows or a plurality of types of integrated repeated section rows are displayed on the display means. The integrated repeated section row including the chorus sections are displayed in a different manner from the other integrated repeated section rows. With this, the detected chorus sections can be distinctively displayed from other repeated sections.

Of course, without displaying the integrated repeated section rows on the display means, a music playback means may be provided to selectively play back the integrated repeated section rows containing the chorus section, or the other integrated repeated section row.

A program for a music playback system is intended for causing a computer to implement a method of detecting a part corresponding to a chorus section in music audio data of a piece of music in order to detect the repeated chorus sections in the music. The program is so constructed as to cause the computer to perform an acoustic feature extraction step of sequentially extracting acoustic features from the music audio data every predetermined time unit; a similarity calculation step of calculating similarities between the acoustic features extracted from the music audio data; a repeated section listing step of listing up a plurality of repeated sections repeatedly appearing in the music audio data, based on the similarity; an integrated repeated section determination step of examining an interrelationship among the plurality of repeated sections listed up, integrating one or more of the repeated sections, which fall within a common section on a time axis, into one integrated repeated section, and grouping a plurality of the integrated repeated sections thus obtained into a plurality of types of integrated repeated section rows; and a chorus section determination step of determining the repeated chorus sections from the plurality of types of integrated repeated section rows.

BRIEF DESCRIPTION OF THE DRAWINGS

FIGS. 5(A) and (B) show one example of the display screen of an interface.

FIG. 19 is a diagram to be used to describe a 12-dimensional chroma vector.

BEST MODE OF IMPLEMENTING THE INVENTION

Figure 1:
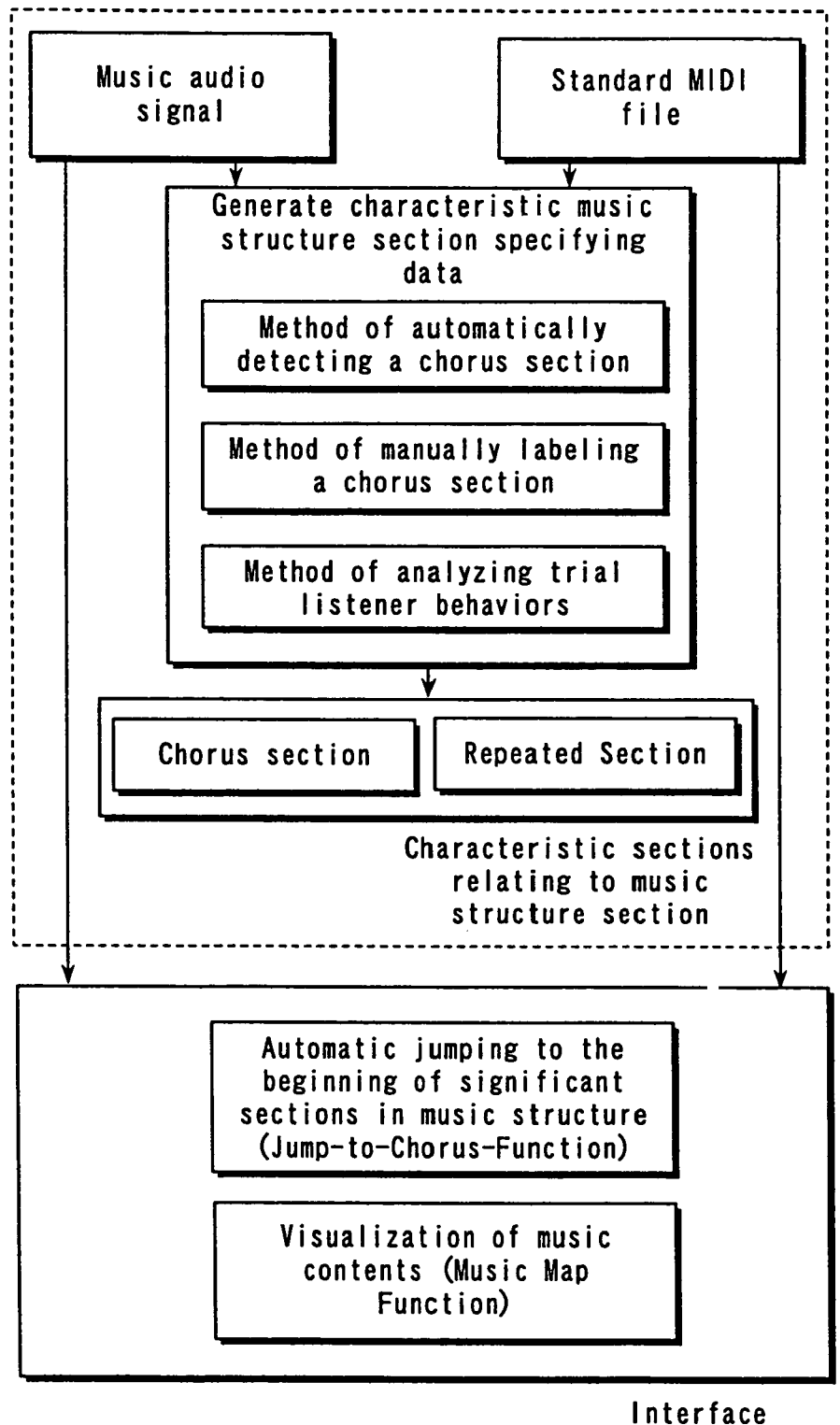
FIG. 1 is a conceptual block diagram of an embodiment of a music playback method according to the present invention.

In the following, embodiments of the present invention are described in detail. First, problems in detecting a chorus section are described. In order to detect a chorus section, the beginning and end positions of all chorus sections contained in audio signal data for one piece of music should be determined. An uplifting part of music is sometimes referred to as a chorus or refrain. A chorus refers to a part that represents a main subject (theme) of music structure. And a chorus sometimes involves varying accompaniments or melody variants and is repeated most frequently in music. For instance, a typical music structure of the popular music comprises;

{intro, chorus}((→a first introduction part (verse A)
[→a second introduction part (verse B)])×
n1→chorus)×n2[→interlude][→a first introduction part (verse A)][→a second introduction
part (verse B)]→chorus×n3
[→interlude→chorus×n4][→ending]

Thus, a chorus is repeated for more number of times than othermelodies. Herein, {a, b} are symbols signifying that either a or b can be omitted, and [a] signifies that a can be omitted. n1, n2, n3, and n4 are positive integers representative of the number of repetitions (in many cases, $1 \leq n1 \leq 2$, $1 \leq n2 \leq 4$, $n3 \geq 0$, $n4 \geq 0$). Intro (introduction) refers to a prelude, verse A and verse B refer to an introductory part.

In general, to detect chorus sections that are most frequently repeated in music, basically it is only necessary to detect a plurality of repetitions of sections contained in music (repeated sections), and decide on a section that appears most frequently as a chorus section. However, it is rare for repeated sections to be repeated with all the audio signals matching completely. Therefore it is difficult for a computer to judge a section to be a repetition even when a man can easily find it so. The major problems in this regard are summarized as follows:

Problem 1: Study Acoustic Features and Similarity

When an audio signal in a section does not completely match that of another section, that is considered a repeated section of the former, in order to judge whether the section is repeated or not, the mutual similarity must be determined between the acoustic features obtained from each section. In this respect, in order to be able to judge that there is a repetition, the similarity between the respective sections must be high even though the details of the audio signals of the sections vary somewhat (e.g., if a melody line changes, or if a bass or drum part, etc. is not performed in the accompaniment), every time the section is repeated. However, when power spectrums of each section are directly adopted as acoustic features, it is difficult to judge the similarity thereof.

Problem 2: Criterion of Repetition Judgment

The criterion of how high similarity must be for a section to be considered a repetition depends on music. For instance, in a piece of music in which similar accompaniments appear often, the similarity of many parts will be high in general. Thus, unless the similarity between respective sections to be compared is considerably high, it is better not to judge the sections as repeated sections associated with a chorus. To the contrary, in a piece of music in which the accompaniment significantly changes when a chorus is repeated, it is better to judge that the sections are repeated sections even though the similarity between respective sections to be compared is slightly low. Such a criterion can be easily set for specific pieces of music manually. In order to detect chorus sections automatically from a large set of music, however, it is necessary to change the criterion of detecting the chorus section automatically, depending on the piece of music currently being processed. This means that when the performance of a method of detecting a chorus section is to be evaluated, the method does not necessarily have generality even if it could detect chorus sections of a few sample pieces of music.

Problem 3: Estimating Both Ends (Beginning and End Positions) of Repeated Sections Since length of a chorus section (section length) differs for each piece of music, it is necessary to estimate where a chorus section begins and ends, together with each section length. As sections, right before and after the chorus, are repeated together in some cases, both ends should be estimated by integrating information on various parts of the music. For instance, if a repeated section is simply searched in a piece of music having a structure of (ABCBCC) (A, B, and C are verse A, verse B and a chorus section, respectively), (BC) will be detected as one block section. In this case, it is required to estimate the both ends of the section C in (BC), based on the repetition information on the last C.

Problem 4: Detecting Modulated Repetition

Because the acoustic features of a section generally undergo a significant change after modulation (key change), the similarity with the section before modulation becomes low, which makes it difficult to judge a repeated section. In particular modulation often occurs in chorus repetitions in the latter half of music, which makes the appropriate judgment of modulated repetition an important task for chorus detection.

Basically, the present invention detects sections repeated many times in music as a chorus, while solving the problems described above. In the following description of the embodiments, a monaural audio signal of music is addressed as an input, and no special limitation is given to the number or type of musical instruments in mixed sound. In the case of a stereo signal, it should be converted into a monaural signal by mixing the right and left parts of it. In the embodiment described below, the following is assumed.

Assumption 1: Tempo of performance may not necessarily be constant and may change. However, chorus sections have almost similar tempo and are performed repeatedly as a specific length of section. Although the section is desirably long, the section length has an appropriate, allowed range (7.7 to 40 sec in the current implementation).

Figure 39:
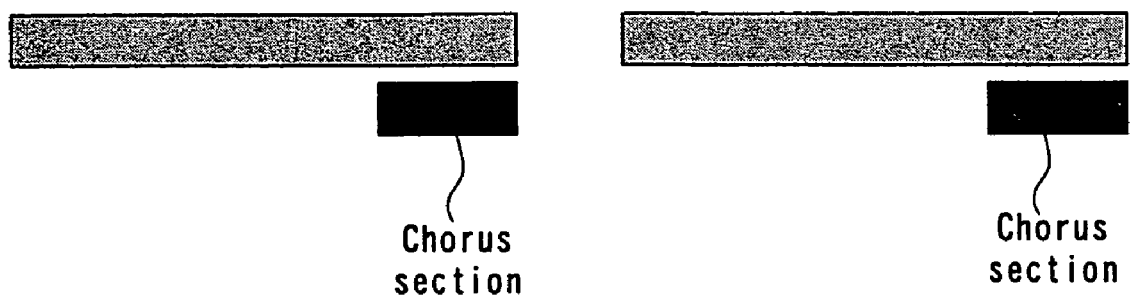
FIG. 39 is a diagram to be used to describe one example of assumption for selection of a chorus section.

Assumption 2: If there is a long repetition equivalent to;

$$((\rightarrow \text{verse A } [\rightarrow \text{verse B}]) \times n1 \rightarrow \text{chorus}) \times n2$$

of the example of the above mentioned music structure, it is most likely that the end of the part is the chorus (See FIG. 39).

Figure 40:
FIG. 40 is a diagram to be used to describe one example of assumption for selection of a chorus section.

Assumption 3: In chorus sections, short sections, almost half of the chorus section length, are often repeated. Thus, if a repeated section further contains a repetition of shorter sections, it is most likely that the repeated section is the chorus (See FIG. 40). What has been discussed so far is a reasonable assumption that can apply to many pieces of popular music. This embodiment is premised on the above problems and assumptions. In the following description, the embodiments of music playback method of the present invention are described first, followed by the embodiments of a chorus section detecting method of the present invention.

FIG. 1 is a block diagram showing the concept of the embodiment of music playback method of the present invention. In the embodiment, a playback position of music is automatically jumped to the beginning of sections having significance in music structure (chorus sections and repeated sections). Basically, the method provides a function to automatically jump a part being performed to a part that is of interest to a trial listener (user) (a chorus part, a repeatedly performed part), i.e., characteristic music structure section, which is preceded by analyzing in advance the music structure of music audio data such as an audio signal of music or a standard MIDI file, etc. The music audio data may be prepared on a local electronics computer (server), etc., or a music playback instrument such as a CD player, etc., or may be downloaded from a network.

[Description of a First Step]

Specifically, for music audio data to be played back, multiple characteristic music structure section specifying data should be prepared in advance for specifying characteristic music structure sections in music (a first step). To be simplest, a plurality of characteristic music structure sections are manually identified, while playing back music audio data, and multiple characteristic music structure section specifying data for specifying the plurality of characteristic music structure sections are created based on the result of identification. The task is manually done and thus time consuming. However, since a person (for example, not only an ordinary person but also a specialist with deep understanding of music or a music producer) judges and identifies characteristic music structure sections, necessary characteristic music structure section specifying data can be obtained even for a piece of music of which a chorus section is difficult to be identified. In the present embodiment, respective beginning and end positions of a plurality of characteristic music structure sections are represented as positional data expressed in time, which has been taken before reaching the position after the performance actually starts. Also in the present embodiment, multiple characteristic music structure section specifying data is combined with music audio data into one set.

In the embodiment of FIG. 1, characteristic music structure section is identified by using either of a method of automatically detecting chorus section, a method of manually labeling chorus section, or a trial listener action analysis method. Each method is described below.

[Method of Automatically Detecting Chorus Section]

This method automatically detects a list of beginning and end positions of a chorus section or a repeated section in a piece of music. Since the method does not involve manual task, it is applicable to a number of pieces of music. Although results of automatic detection may contain an error, practically, despite of their non perfect accuracy, they can help a trial listener in finding a playback position, which is more convenient than a conventional music listening station. Details of the method for this purpose will be detailed below.

[Method of Manually Labeling Chorus Section]

Figure 2:
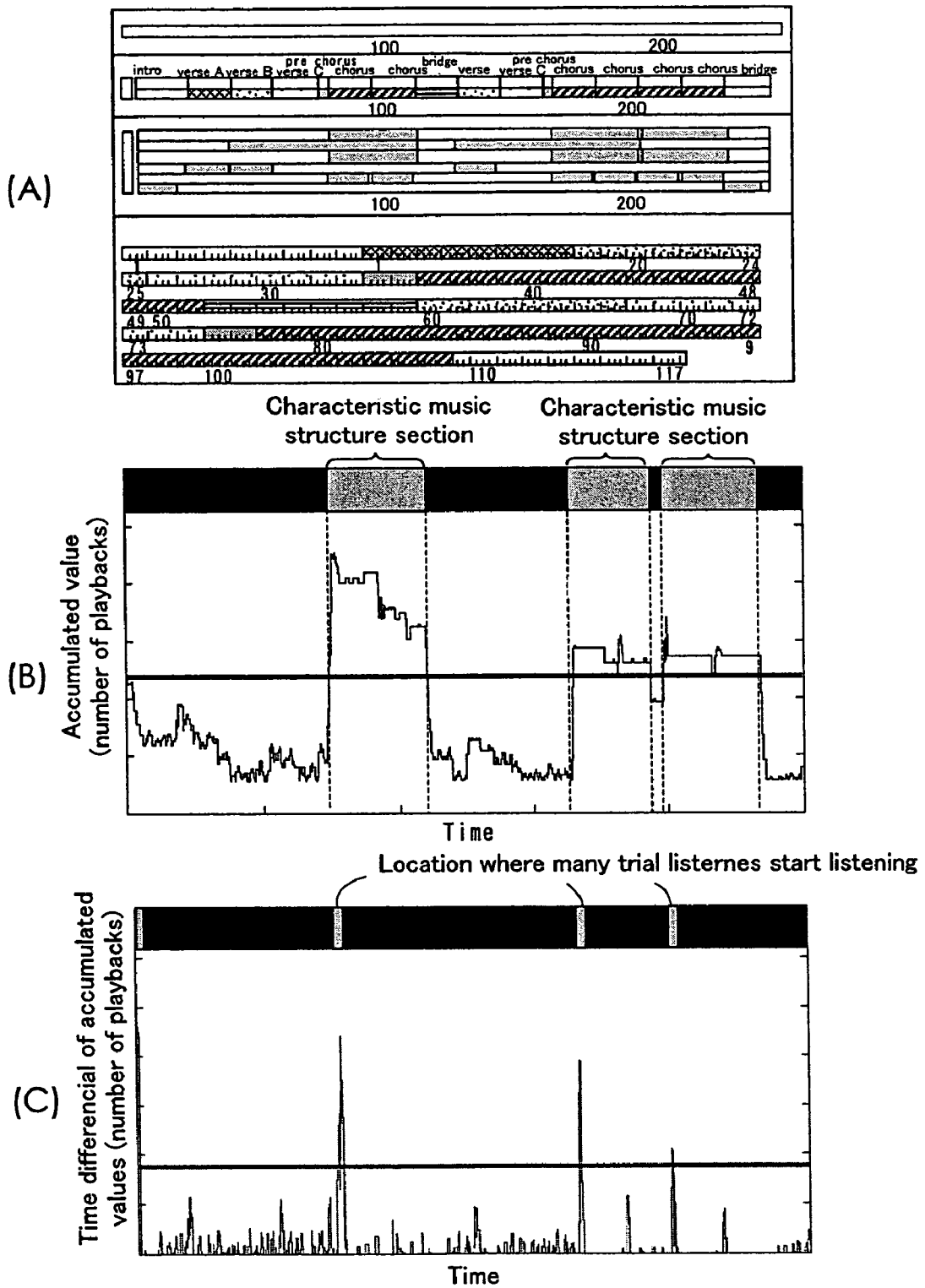
FIG. 2(A) is a screen display of a manual chorus section labeling editor, and FIGS. 2(B) and (C) show examples of histogram obtained with a trial listener behavior analysis method.

A chorus section is manually specified on an editor that can label a chorus or music structure, while music is being listened to. Although it can offer high accuracy, it needs labor and time. This manual labeling is also useful for music or a music genre for which automatic detection is difficult to apply. In addition, results of automatic chorus section detection can be utilized, and manually modified on the editor. As an editor for this purpose, the inventor has developed a music structure labeling editor that can divide a piece of music into sections, and label each section a chorus, a first melody (verse A), a second memory (verse B), introduction, interlude, ending, etc. FIG. 2(A) shows the screen of the editor. The horizontal axis shown in the upper half of the figure represents the time axis (sec) and indicates an entire piece of music. The highest mini-window shows power variations; the second mini-window shows results of labeling of respective parts in the piece of music; the top column of the third mini-window is a list of chorus sections, and the following 5 lower columns represent repetition structures. The lower half displays the labeling result of respective parts of the music, which is shown, enlarged, by dividing the time axis covering the entire piece of music.

On this editor, the user edits information on cursor positions expressed by a vertical bar representation. He/she can freely control playback/stopping of music, and the cursor shows a playback position of the music. While moving the cursor freely, and repeatedly listening to the sounds before and after the cursor, the user can place separators in appropriate places of respective sections of the music. And then, he/she labels the sections between the separators. In addition, the editor provides an efficient working environment, wherein, the unit of beat or bar has been labeled in advance, and by shifting the cursor by the unit of beat or bar, the user can perform labeling quickly. As a result of editing on this editor, a list of the beginning and end positions of the chorus or the repeated section in the piece of music can be obtained.

[Trial Listener Behavior Analysis Method]

In this method, parts to which a number of trial listeners listened in the past are recorded, and sections to which trial listeners listened often are analyzed. Estimation is made by assuming that the sections thus determined are chorus sections (sections in which the trial listeners have interest). As the sections listened to many times are often the sections that typical trial listeners wish to listen to, even in other genres of music than popular music, the method is useful to a wide range of music genres. Although the method can only provide the function that is almost same as that of the conventional music listening station until it is repeatedly used, it has an advantage that no advance analysis of music contents or labeling is required. In addition, the above 2 methods can be combined. Specifically, they can be combined as follows. Basically, a chorus section is estimated by creating a histogram of the number of playback of respective parts in a piece of music, and determining from the histogram a part that has been played back many times. FIGS. 2(B) and (C) show examples of the histograms. First, a trial listener starts in a condition that there is no description, and listens by using a typical playback button as usual (pressing the fast-forwarding button many times and skipping middle parts of the music), and gropingly finding a chorus section, etc. Separate the entire piece of music, here, into very short sections (for instance, 10 msec) and count the number of playback for each section (creates a histogram). Usually, when a beginning of a chorus is found, trial listeners listen till the playback of the entire chorus is completed. Thus, if a number of listeners do this, sections that many trial listeners have interest in and have played back can be determined as sections of high frequency (sections that have been played back many times) across a long section on the histogram. In addition, as enhancement, when the number of playback is counted, weight is added depending on the length of sections that are continuously played back without manipulation of buttons, so that, the longer they are played back, the higher value will be added to the histogram. Consequently, since only a short section is played back during the search of a chorus, a small value is added to the histogram, while a large value is added to the histogram as longer sections are played back when a chorus is found. This increases the value of the chorus section in the histogram further, enabling the chorus section to be determined more appropriately.

Not only the above process is executed on a stand-alone music listening station, but also music listening stations can be connected to a wide network such as Internet, etc., which enables collecting, for a same piece of music, the histograms of how trial listeners (users) worldwide manipulate and listen. By doing this, behavior analysis results of more trial listeners can be reflected in the histograms, thereby improving the accuracy of determining a chorus section. In addition, in the case of the trial listener behavior analysis method, visualization of histograms is effective; which allows the users to manipulate, while visually looking at what parts the previous trial listeners listened to often.

In order to use the result of the trial listener behavior analysis method, as shown in FIG. 2(B), it is convenient to explicitly display values exceeding a given threshold on the histogram, as a chorus section (a section in which a typical trial listener has interest), above or below the histogram. Application of the present invention using the sections thus defined as characteristic music structure sections enables the users to jump the playback position according to the selections by an interface, just as the characteristic music structure sections determined by using other methods. Or, as shown in FIG. 2(C), as another display method replacing sections like these, by determining a smoothed function by leveling the histograms, line segments (which exist in plural) may be displayed at the times when a function (a derivative) obtained by first deriving the smoothed function in the time axis direction exceeds a certain threshold. The line segments represents a part where the histograms rapidly rise, showing the part where a number of trial listeners start to listen (starting time of the section in which typical trial listeners have interest). Also in this case, by selecting line segments with the interface, the users can jump to play back the positions corresponding to the time of the line segments.

[Description of the Second and Third Steps]

Next, in the method of the embodiment, an interface for selecting an arbitrary characteristic music structure section from a plurality of characteristic music structure sections is provided (the second step). The interface shall be described in details later. When an operator selects an arbitrary characteristic music structure section by using the interface after playback of music audio data has started using a music audio data playback apparatus, the playback position of the music audio data by the music audio data playback apparatus is changed to the arbitrary characteristic music structure section, based on the characteristic music structure section specifying data corresponding to the selected arbitrary characteristic music structure section (the third step). The change of the playback position corresponds to so-called a jump to the beginning of a characteristic music structure section. In the embodiment of FIG. 1, the interface is provided with a graphic display portion, in which characteristic music structure sections can be visually seen while reflecting the content of the piece of music. The visualization shall be also described in detail later. According to the embodiment, specifically "jump to the beginning of chorus section", "jump to previous music structure section (repeated section)", and "jump to next music structure section" become enabled, so that a trial listener can listen to a chorus part only or jump to the beginning of a previous/next music structure to listen.

Figure 3:
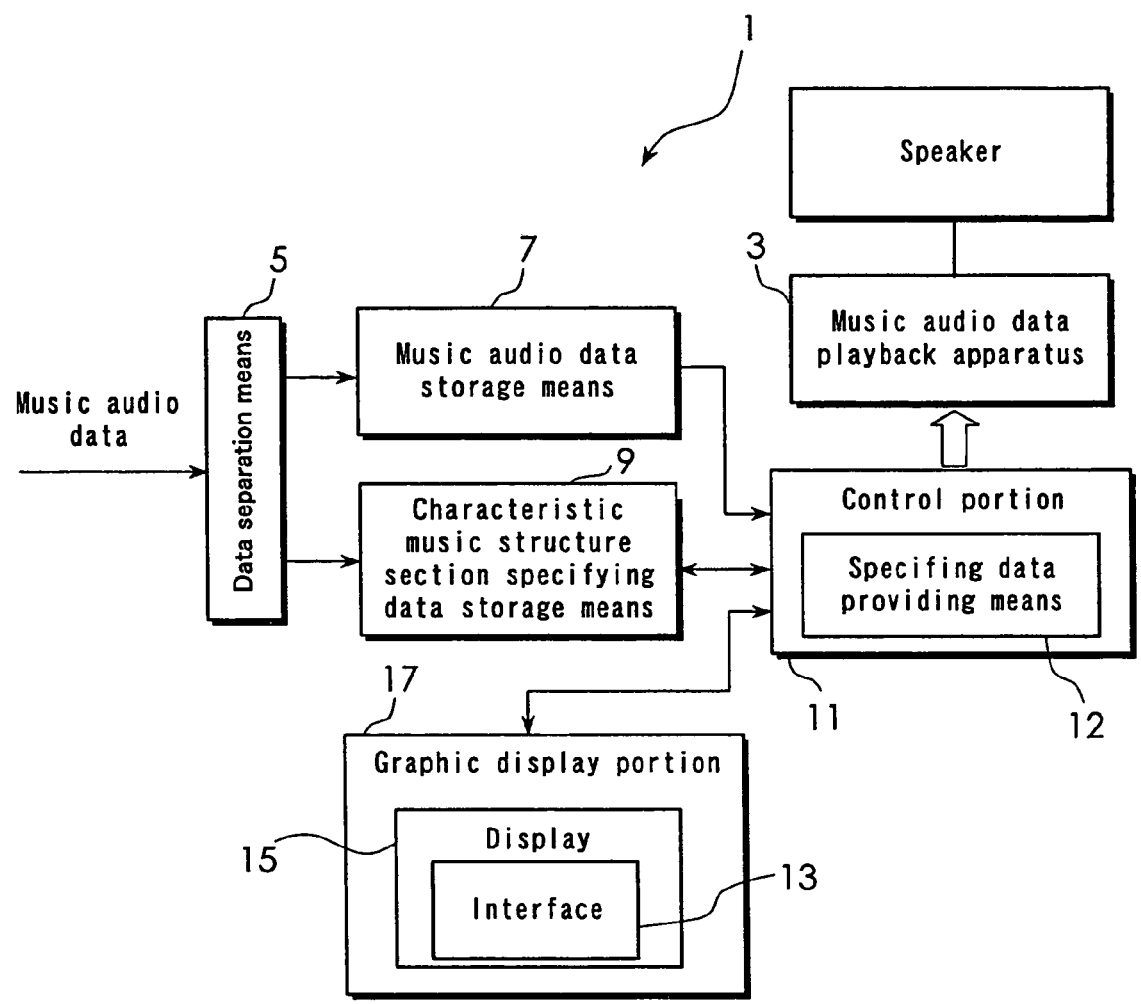
FIG. 3 is a block diagram showing the configuration of one embodiment of a music playback apparatus of the present invention.

FIG. 3 is a block diagram showing the configuration of an embodiment of a music playback system implementing the method according to the present invention. Provided with a music audio data playback apparatus 3 that plays back music audio data, the music playback system 1 has a function of playing back an arbitrary characteristic music structure section selected from a plurality of characteristic music structure sections in a piece of music. In this example, music audio data with characteristic music structure section specifying data transmitted by way of a network, for instance, is input to a data separation means 5. The data separation means 5 separates the music audio data and the characteristic music structure section specifying data from the music audio data with the characteristic music structure section specifying data, and stores the music audio data in a music audio data storage means 7 and the characteristic music structure section specifying data in a characteristic music structure section specifying data storage means 9. A control unit 11 has a built-in music audio data playback apparatus 3 and an interface 13, and controls an image display unit 17 provided with a display 15. Inside the control unit 11 is included a specifying data providing means 12. A major components of the music audio data playback apparatus 3, the control unit 11, the specifying data providing means 12, the interface 13, and the graphic display portion 17 are implemented by a computer (not shown) that becomes operative by a program.

The characteristic music structure section specifying data storage means 9 stores characteristic music structure section specifying data for specifying a plurality of characteristic music structure sections that are predetermined corresponding to music audio data to be played back. The interface 13, as described in details later, has a function of selecting an arbitrary characteristic music structure section from a plurality of characteristic music structure sections. The specifying data providing means 12 reads out the characteristic music structure section specifying data for specifying the arbitrary characteristic music structure section selected by the interface 13 from the characteristic music structure section specifying data storage means 9, and gives it to the music audio data playback apparatus 3. The music audio data playback apparatus 3 operates following a command from the interface 13, and changes the playback position to the characteristic music structure section specified by the specifying data, in particular, when it is given characteristic music structure section specifying data by the specifying data providing means 12. In the music playback apparatus 1, an arbitrary characteristic music structure section selected by the interface 13 can be played back even during the playback of a piece of music. It is needless to say that the music audio data playback apparatus 3 may be so configured as to play back an arbitrary characteristic music structure section selected by the interface even when the music is not being played back.

Figure 4:
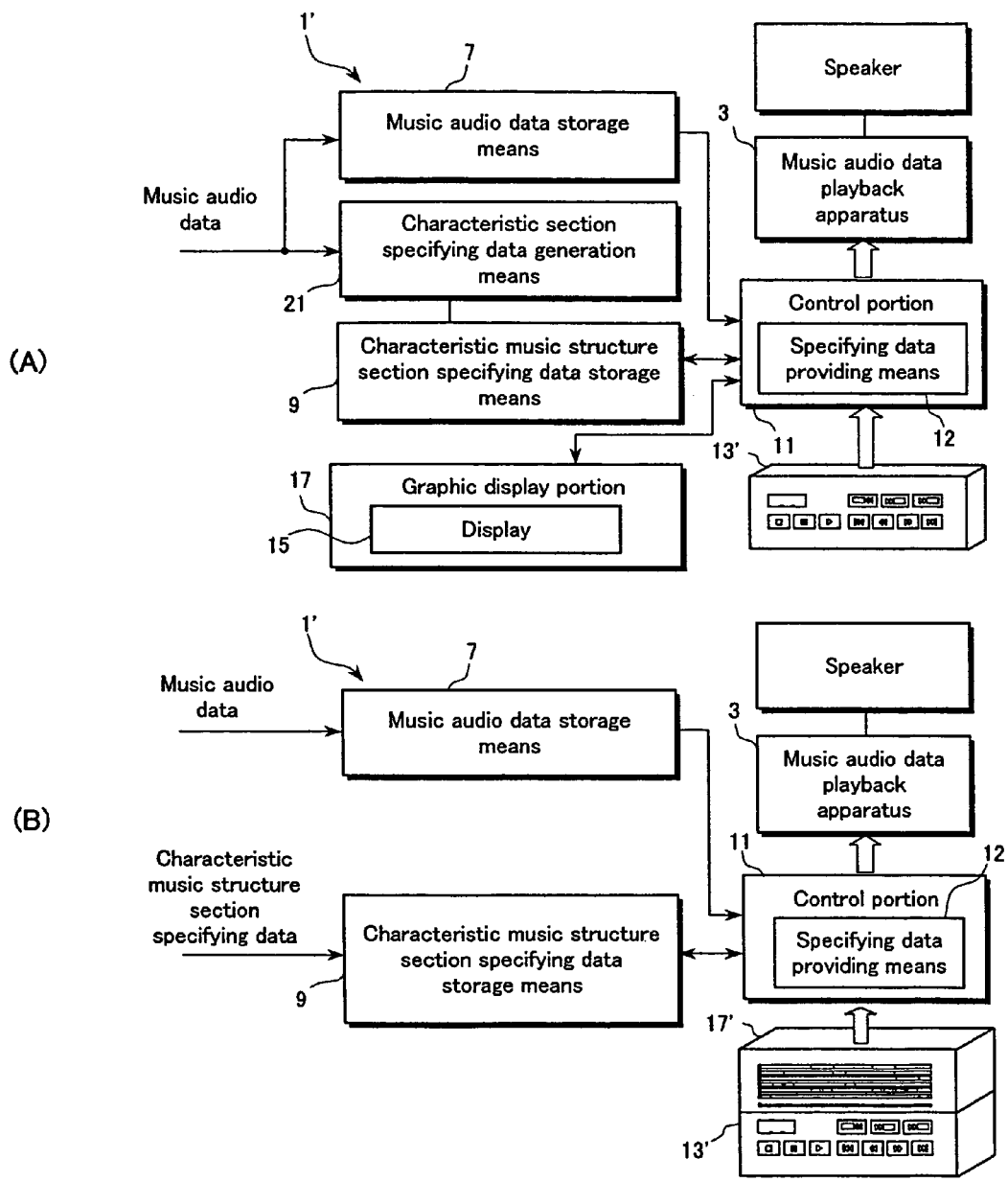
FIGS. 4(A) and (B) are respectively a block diagram showing a variant example of the music playback apparatus of the present invention that comprises a means of automatically extracting a plurality of characteristic music structure sections in a piece of music from the music audio data and generating characteristic music structure specifying data.

FIG. 4(A) shows an example of a variant of the music playback system 1' of the present invention, provided with a characteristic section specifying data generation means 21 for automatically extracting a plurality of characteristic music structure sections in a piece of music from music audio data and creating characteristic music structure section specifying data, and also provided with an interface 13' standing independently. Provision of the characteristic section specifying data generation means 21 facilitate the application of the present invention even when an existing piece of music is to be played back. In addition, the characteristic section specifying data generation means 21 may be configured to implement the automatic chorus section detecting method mentioned earlier. In the embodiment of FIG. 4(A), the interface 13' with one or more selection buttons is prepared as an independent unit. In the interface 13', the selection buttons are comprised of so-called manual switches that are to be physically manipulated by fingers. The structure of the selection buttons may be optional; they may be displayed on the screen of a touch panel to be manipulated by clicking with a finger or a pen, or by clicking with a mouse. They may also be a type to be manipulated by a pen, the structure thereof may be optional.

As shown in FIG. 4(B), it is needless to say that a graphic display portion 17' including the interface 13' may be configured as an independent apparatus. In this example, it is so configured that the music audio data and the characteristic music structure section specifying data are separately downloaded, and are stored in the music audio data storage means 7 and the characteristic music structure section specifying data storage means 9, respectively.

In the case of the embodiments of FIG. 3 described above have such configuration that a manipulating unit and a display unit of the interface 13 are displayed on the display 15. A means of controlling operations of the interface is built in the graphic display portion 17. FIG. 5(A) shows an example of configuration of the manipulating unit and the display unit of the interface 13 appearing on the display 15. In this example, in the upper part of the window W1, the length of the music audio data is shown by the graphic display A using a time axis, together with the graphic display B showing, using the time axis, the playback position of the music audio data being played back by the music audio data playback apparatus 3 as well as a plurality of characteristic music structure sections. In the lower part of the window W2, the graphic display portion 17 also displays, by the graphic display C, various types of selection buttons SW1 to SW10 on the display 15.

In the lower part of the window W2 are sequentially arranged, from left to right, a stop selection button SW1, a pause selection button SW2, a play selection button SW3, a 'jump to the beginning of a previous music piece of music' selection button SW4, fast review selection button SW5, a fast forward selection button SW6, and 'jump to the beginning of a next piece of music' selection button SW7, on which customary symbols are marked. The selection buttons are identical to those used in the existing interfaces. Elapsed time from the beginning of the music is displayed above the stop selection button SW1.

The interface to be used in the embodiment is further provided with 3 selection buttons SW8 to SW10, called automatic jump buttons, within the window W2. They are, from left to right, a first repeated section selection button for "jumping to the beginning of a previous music structure section" SW8, a second repeated section selection button for "jumping to a next music structure section" SW9, and a chorus section selection button for "jumping to the beginning of a chorus section" SW10.

Pressing the chorus section selection button SW10 causes a search for a next chorus section coming after the present playback position (returning to the first one if none remains) and jump the position to the beginning position of that chorus section. A chorus is generally repeated several times in a piece of music, and every time this button SW10 is pressed, it is possible to jump among the chorus sections one after another.

Pressing the other two buttons SW 8 and SW 9 causes a search for the immediately following section or immediately preceding section with respect to the present playback position and to jump the position to the beginning of that section. While searching, section-end positions are ignored.

The construction of the upper window WI (music structure display window) will be discussed in the following. A display bar B1 representing chorus sections in the top row, together with display bars B2 to B6 representing repeated sections in the five lower rows, are displayed so that they can be recognized visually. Although five rows of display bars are used for repeated sections in this example, the number of the display bars is optional and should not be limited to this embodiment. The mark on the chorus section selection button SW10 is displayed in the same color as that of the display bar B1 displaying the chorus section, while the marks on the two buttons SW8 and SW9 are displayed in the same color as those of the display bars B2 to B6 displaying the sections. This prevents an operator from misidentifying the buttons when selecting them. The example shows that five types of sections are repeatedly performed. A thin horizontal bar display A in the lowest row is a playback slider whose position corresponds to the elapsed time in the piece of music. In addition, in the example a vertical display bar I is provided, which intersects the six display bars B1 to B6. The vertical display bar I is displaced in synchronization with the display mark 'a' of the playback slider A and indicates the current playback position. When such a display is used, it is possible to play back music audio data by clicking (touching in the case of a touch panel) directly on a section and also it is possible to change the playback position by clicking the playback slider. The above interface and functions enable trial listeners to listen to the chorus with just a push of a button after listening to the intro of a piece of music for just a short time. Furthermore, two selection buttons, namely, a first chorus section selection button for "jumping to the beginning of a next chorus section" and a second chorus section selection button for "jumping to the beginning of a previous chorus section" may be provided in the window W2. In this embodiment only one button is provided for the following reasons: (1) Pushing the present chorus section selection button SW10 for "jumping to the beginning of a chorus section" repeatedly loops back to the first section after going through all chorus sections, thus enabling to move to a desired section quickly. (2) If the listener needs to return to a previous chorus section in a moment, a means of directly clicking on the section on the music structure display window W1 is provided. The listener can also selectively trial listen to various parts of the piece of music while visually understanding the entire music structure.

If the structures of chorus sections and repeated sections in a piece of music (or those of either ones) are visualized, as shown in the example, from the visualized display screen, a trial listener can often understand the mutual positional relationships of an introduction, a first type of verse (verse A), a second type of verse (verse B), a chorus section, an interlude, etc.

FIG. 5(B) shows other types of embodiments of the interface display. The interface of FIG. 5(B) is provided with a second chorus section selection button SW11 for jumping to a previous chorus section, in addition to the first chorus section selection button SW10 which is used for jumping to a next chorus section. Other details are similar to the interface of FIG. 5(A).

Figure 6:
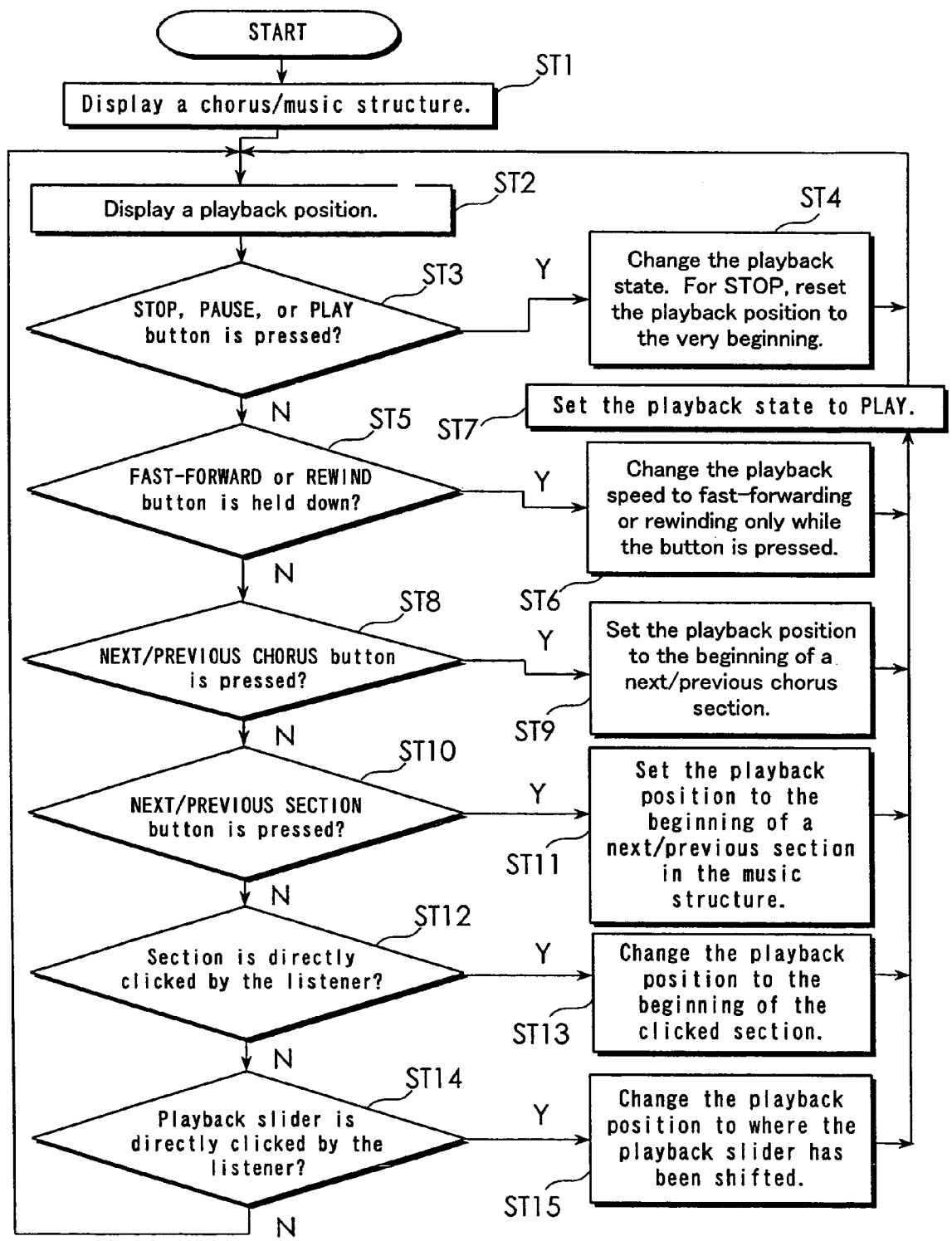
FIG. 6 is a flowchart showing algorithm of a program for implementing the interface.

FIG. 6 is a block diagram showing a program algorithm to be employed in the implementation of the interface 13 used in the above embodiment. The algorithm of FIG. 6 corresponds to the example of FIG. 5(B). In other words, it is assumed that a second chorus section selection button for jumping to a previous chorus section is provided, separately from a first chorus selection button that is used for jumping to a next chorus section.

First in step ST1, the chorus sections and the repeated sections are visualized as display bars B1 to B6. Then, in step ST2, the playback position is displayed by the vertical display bar I and the display mark 'a'. When the display of these is finished, it is judged in step ST3, whether any of the stop selection button SW1, the pause selection button SW2, and the play selection button SW3 has been pressed (clicked or selected). Then, if the stop selection button SW1 has been pressed, the playback condition is set to stop, while the playback position of the music audio data is set to the beginning of the data. If the pause selection button SW2 has been pressed, playback is set to pause. Furthermore, if the play selection button SW3 has been pressed, playback condition is set to playback. (Note that the playback speed here is normal.) When the step ST4 is finished, step ST2 is resumed, where locations of the vertical display bar I and the display mark 'a' are modified according to the playback position. If none of the selection buttons has been pressed, it goes to step ST5. In step ST5 it is judged whether the fast forward selection button SW6 or the fast review selection button SW5 is pressed. If either of the fast forward selection button SW6 and the fast review selection button SW5 is pressed, the next step is step ST6, where the playback speed is changed to fast forwarding or fast rewinding only while the button is being pressed, and then in step ST7, the playback condition is set to playback. As a result, either fast forwarding or fast rewinding is performed during the playback. The change of the playback position in accordance with that of the playback speed is displayed in step ST2, and the traveling speed of the vertical display bar I and the display mark 'a' is also changed.

If neither of the fast forward selection button SW6 or the fast review selection button SW5 has been pressed, the next step is step ST8. In step ST8, it is judged whether a first or a second chorus section selection buttons SW10 or SW11 has been pressed for jumping to the beginning of a next chorus section. If either of the first and the second chorus selection buttons SW10 or SW11 has been pressed, to the next step is step ST9. In step ST9, the playback position is set, or displacement of the playback position is set to the beginning of the next chorus section. Then step ST2 is resumed by way of step ST7, and a jumped position or displacement of the vertical display bar I and the display mark 'a' are displayed. If it is confirmed in step ST8 that neither of the selection buttons SW10 or SW11 has been pressed, it goes to step ST10. In step ST10, it is judged whether the first and the second repeated section selection buttons SW8 or SW9 for jumping to the beginning of a previous repeated section or a next repeated section has been pressed. If either of the first and the next repeated section selection buttons SW8 or SW9 has been pressed, to the next step is step ST11. In step ST11, the playback position is changed or displaced from the current or a playback position to either of the beginning of a next or a previous repeated section. Then, it goes to step ST7, where the playback condition is set to playback, and in step ST2, the display of the playback position is modified. In step ST10, if neither of the repeated section selection buttons SW8 or SW9 has been pressed, it goes to step ST12.

Step ST12 is to be provided for a case in which the indication of each section on the display 15 is so configured as to be directly used as a selection button. Also in this case, when each section is directly clicked (touched), the playback position is shifted to the beginning of the section clicked (touched). And then the step proceeds to step ST7, where the playback condition is set to playback, and then to step ST2, where the change of the playback position is displayed.

If no selection buttons have been clicked in step ST12, it goes to step ST14. In step ST14, it is judged whether or not an operation has been performed giving instructions to move the mark 'a' by clicking (touching) the mark 'a' of the playback slider. If selection buttons have been clicked in step ST12, it goes to step ST13. In step ST14, the playback position is changed to the beginning of the clicked section. If the operation has been performed, it goes to the step ST15, where the playback position is set to the position where the mark 'a' of the slider has moved, and then it returns to step ST2, after setting the playback condition to playback in step ST7.

Figure 7:
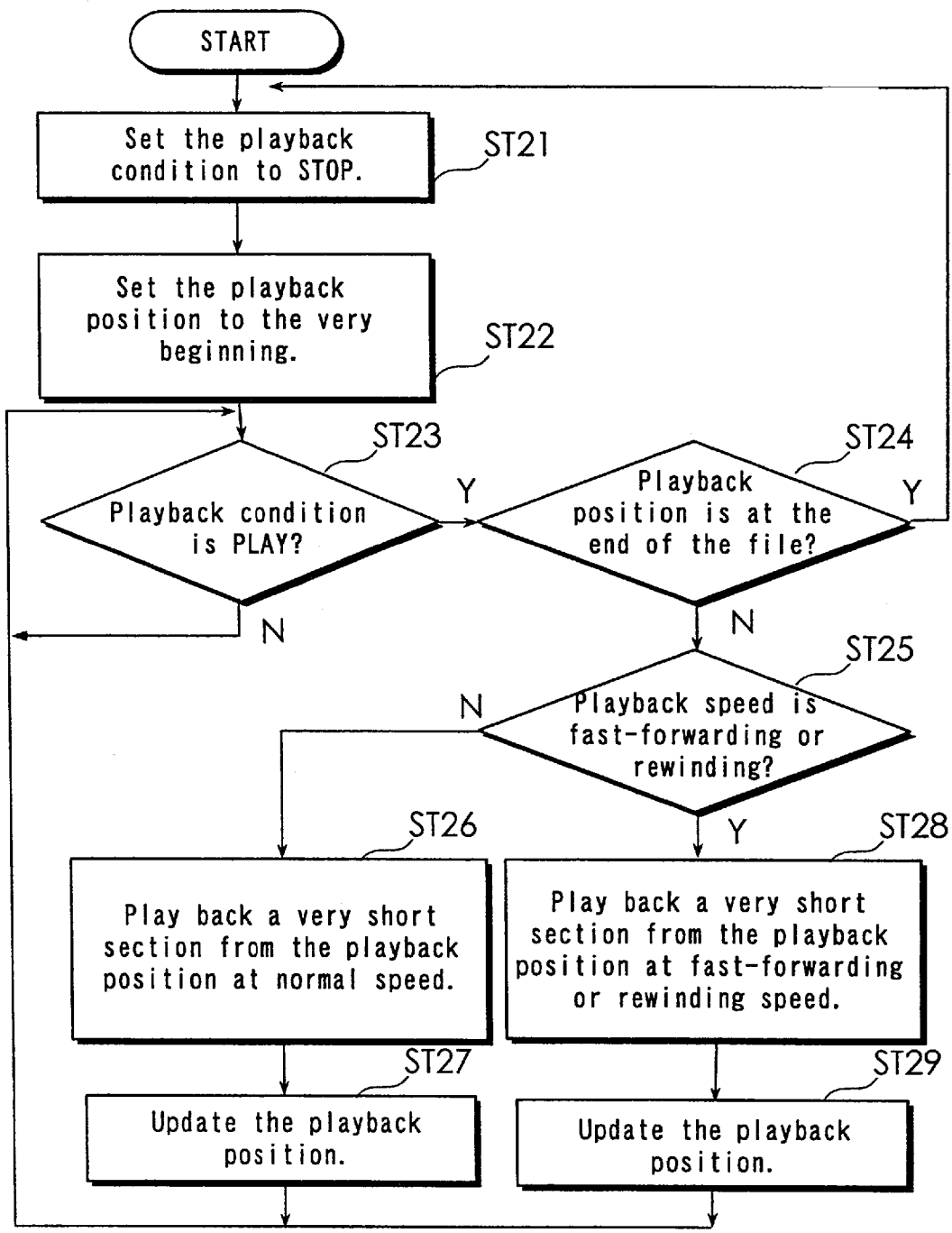
FIG. 7 is a flowchart showing operational algorithm of the interface when it carries out normal playback operation.

FIG. 7 is the flowchart showing the algorithm of a case when a user manipulates by using the selection buttons SW1 to SW7. The operations according to the algorithm shown in FIG. 6 and those according to the algorithm of FIG. 7 are progressing concurrently. Unless the selection buttons SW8 to SW11 are pressed, playback is performed in accordance with FIG. 6. If the selection buttons SW8 to SW11, etc. are pressed in the course of the playback, the prescribed steps according to the algorithm of FIG. 6 are performed.

In FIG. 6 and FIG. 7, the "playback condition" includes stopped, paused, and playing conditions; the "playback position" refers to the elapsed time from the beginning of the file of the piece of music; and the "playback speed" includes normal playback speed, fast forward playback speed, and fast reverse playback speed. In FIG. 7, in step ST21, the playback condition has been set to STOP. Then, in step ST22, the playback position has been set to the very beginning. And then, the step proceeds to step ST23, where the playback condition has been not PLAY, it returns to step ST23, where the playback condition has been PLAY, the step proceeds to step ST24. In step ST24, it is judged whether or not the playback position has been at the end of the file. If the playback position has been at the end of the file, it returns to step ST21. If not, it goes to step ST25. In step ST25, it is judged whether or not the playback speed is fast-forwarding or rewinding. If the playback speed has been fast-forwarding or rewinding, it goes to step ST28. If not, it goes to step ST26. In step ST26, a very short section from the playback position is played back at normal speed. Then, the playback position is updated in step ST27 and then it returns to step ST23. And, in step ST28, the very short section from the playback position is played back at fast-forwarding or rewinding speed. Then, the playback position is updated in step ST29 and then it returns to step ST23.

Figure 8:
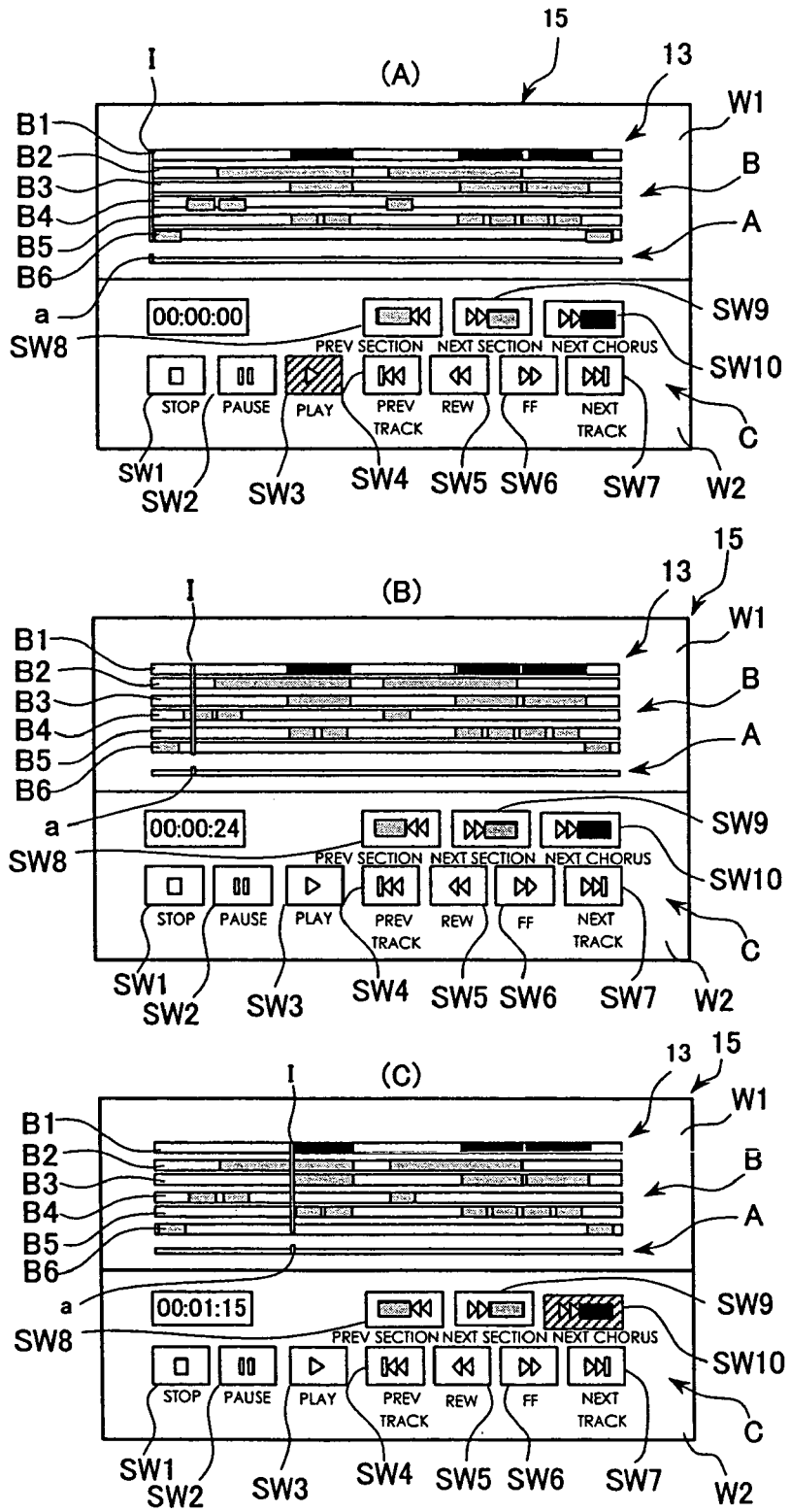
FIGS. 8(A) to (C) are diagrams to be used to describe selection of a chorus section.
Figure 9:
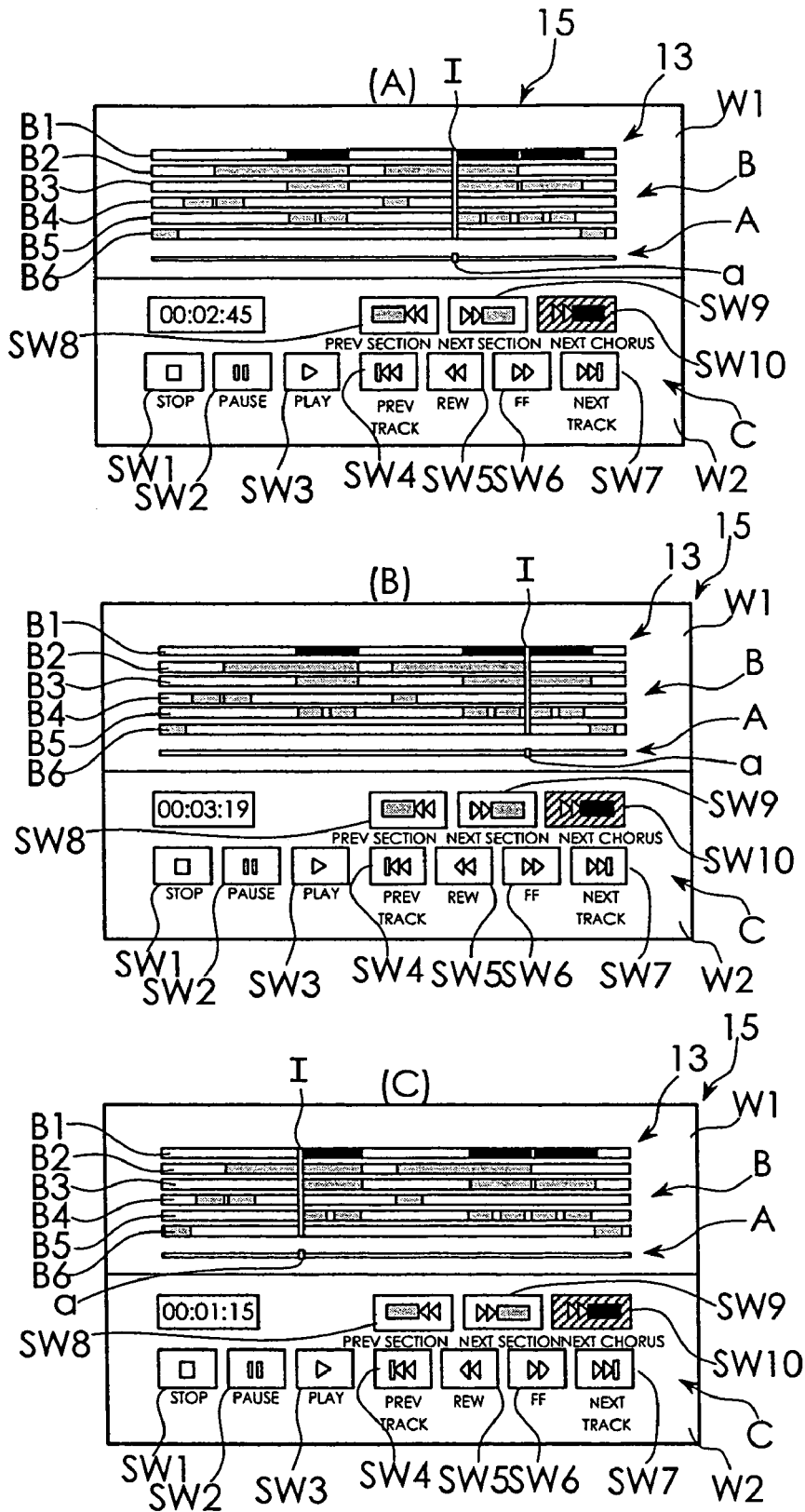
FIGS. 9(A) to (C) are diagrams to be used to describe selection of a chorus section.

Now the operational state of the interface 13 is described with reference to FIG. 8 to FIG. 13. In the display bars B1 to B6, black and gray parts indicate characteristic music structure sections of chorus sections and repeated sections. In addition, in the figures, the selection buttons in pressed state are hatched to facilitate understanding. First, the operation for accessing to the beginning of a chorus section is described with reference to FIG. 8(A) to (C) and FIG. 9(A) to (C). FIG. 8(A) shows the state immediately after the play selection button SW 3 has been pressed and playback of a certain music audio data has started. In this state, the vertical display bar I and the display mark 'a' are at the beginning of the playback position. FIG. 8(B) shows the state in which the playback is being continued. When the chorus selection button SW10 is pressed once in this state, it changes to FIG. 8(C). In this state, the vertical display bar I and the display mark 'a' jump to the beginning of a next following chorus section displayed and the playback position also shifts to the beginning of the first chorus section. When the chorus selection button SW10 is pressed once again after the playback condition has lasted for a while, as shown in FIG. 9(A), the vertical display bar I and the display mark 'a' further move or jump to the beginning of the display of a second chorus section, and the playback position also shifts to the beginning of the second chorus section. When the chorus selection button SW 10 is further pressed, as shown in FIG. 9(B), the vertical display bar I and the display mark 'a' move or jump to the beginning of a third chorus section displayed, and the playback position also shifts to the beginning of the third chorus section. When the chorus selection button SW10 is pressed further, as shown in FIG. 9(C), the vertical display bar I and the display mark 'a' move or jump to the beginning of the first chorus section, and the playback position also shifts to the beginning of the first chorus section since no further chorus section remains.

Figure 10:
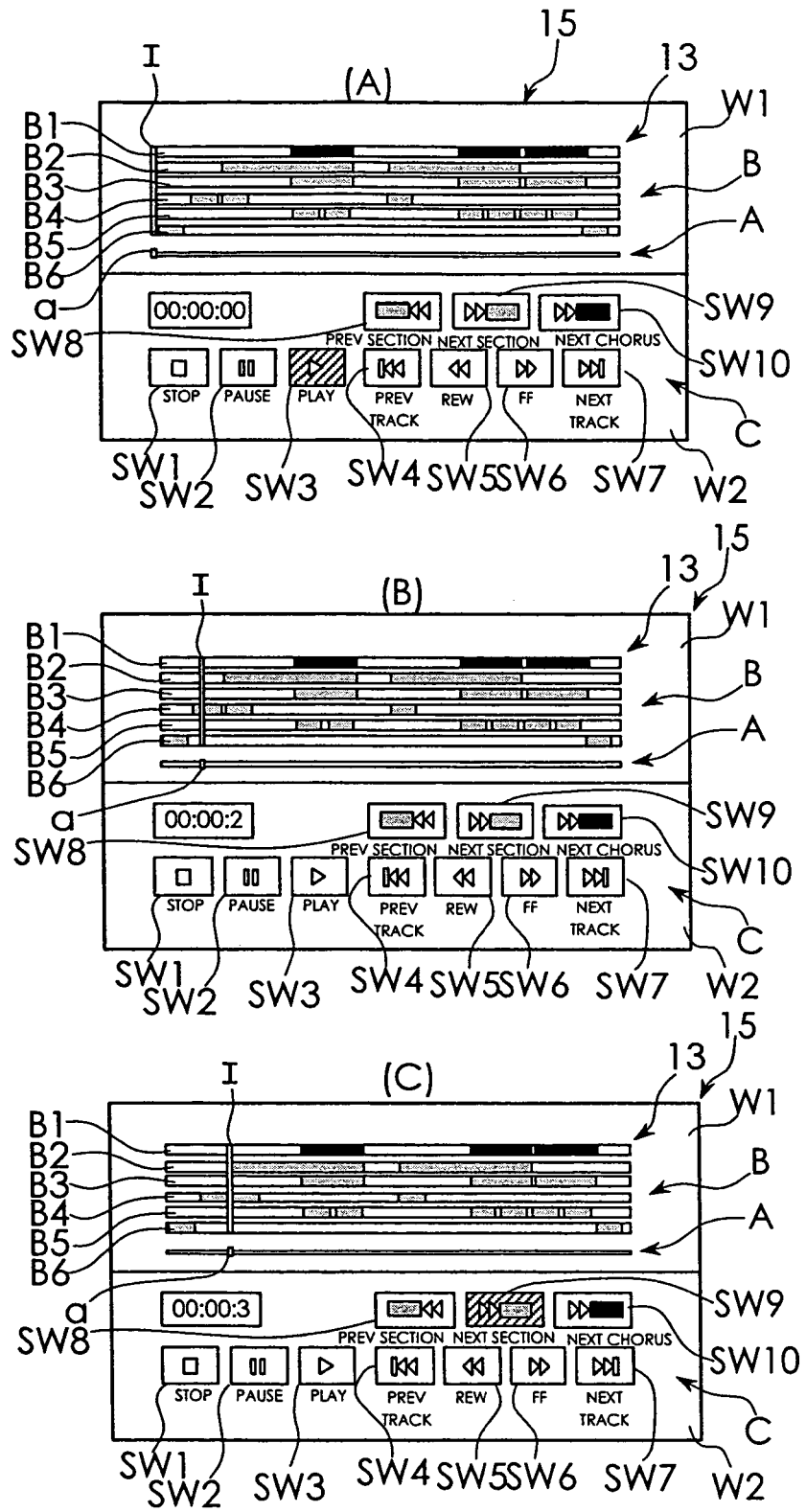
FIGS. 10(A) to (C) are diagrams to be used to describe selection of a repeated section.
Figure 11:
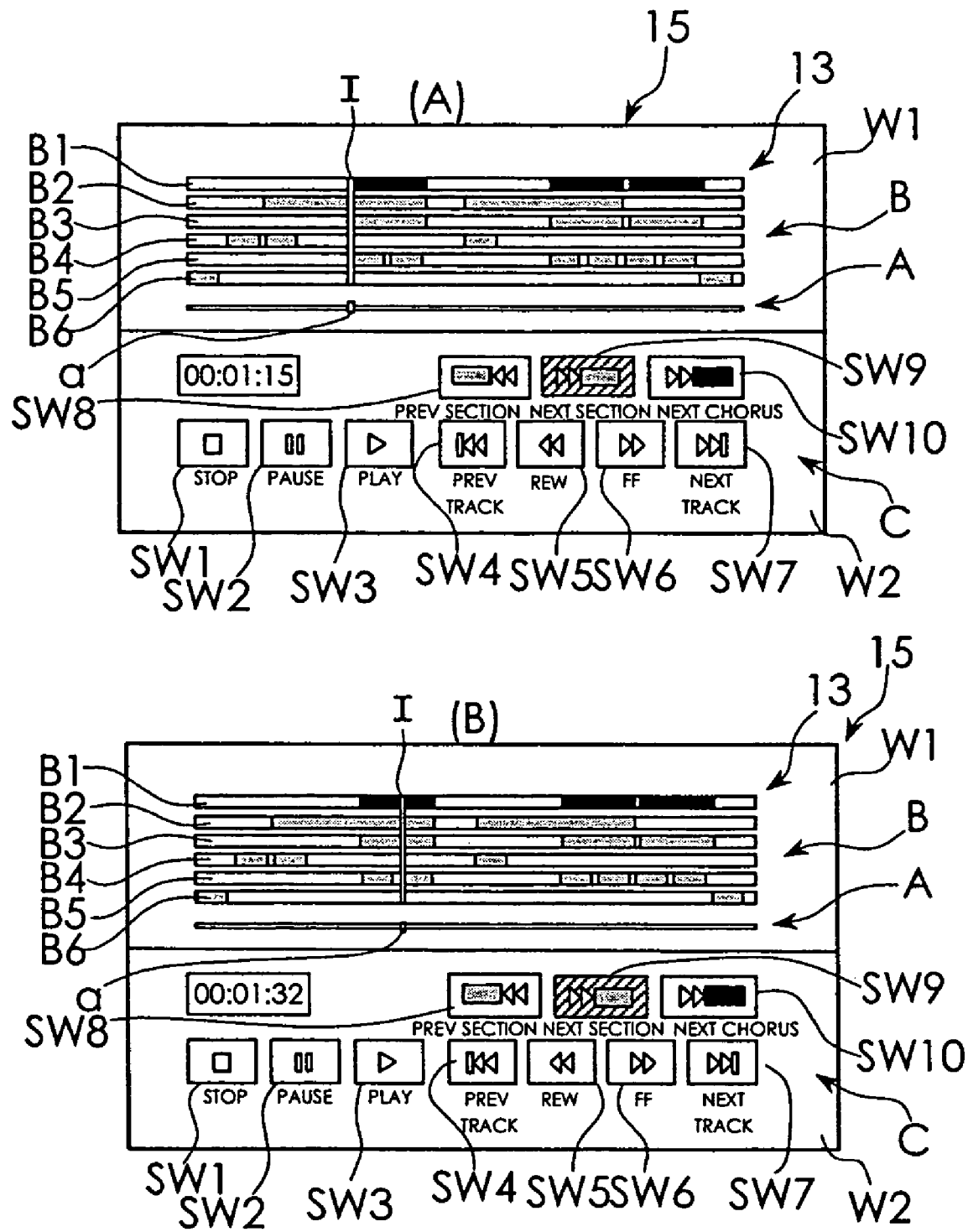
FIGS. 11(A) and (B) are diagrams to be used to describe selection of a repeated sections.

In the following, the operation of jumping to repeated sections is described with reference to FIG. 10 and FIG. 11. FIG. 10(A) shows the state immediately after the play selection button SW3 has been pressed and playback of a certain music audio data has started. In this state, the vertical display bar I and the display mark 'a' are at the beginning of the original playback position. FIG. 10(B) shows the state in which the playback is being continued. When the second repeated section selection button SW9 is pressed once in this state, it changes to FIG. 10(C). In this state, the vertical display bar I and the display mark 'a' jump to the beginning of the display of [the second repeated section of the display bar B4], the closest next repeated section, and the playback position also shifts to the start of [the second repeated section of the display bar B4], the closest next repeated section. When the second repeated section selection button SW9 is pressed once after the playback condition has lasted for a while, as shown in FIG. 11(A), the vertical display bar I and the display mark 'a' jump to the beginning of the display of [the first repeated section of the display bar B5], the closest next repeated section in this state, and the playback position also shifts to the beginning of [the first repeated section of the display bar B5], the closest next repeated section. When the second repeated section selection button SW9 is further pressed, as shown in FIG. 11(B), the vertical display bar I and the display mark 'a' jump to the beginning of the display of [the second repeated section of the display bar B5], the closest next repeated section in this state, and the playback position also shifts to the beginning of [the second repeated section of the display bar B5], the closest next repeated section.

Figure 12:
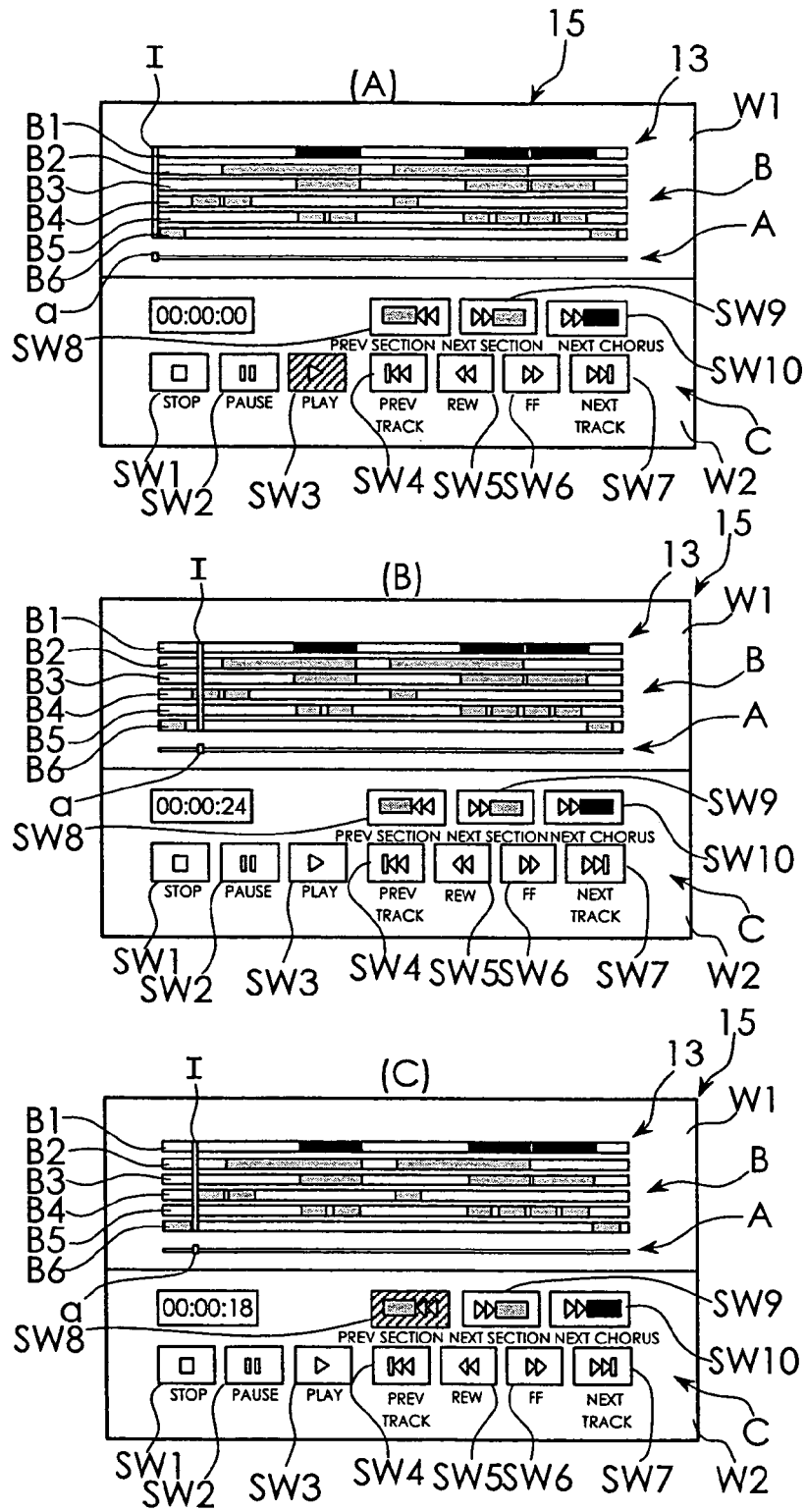
FIGS. 12(A) to (C) are diagrams to be used to describe selection of a repetition sections.
Figure 13:
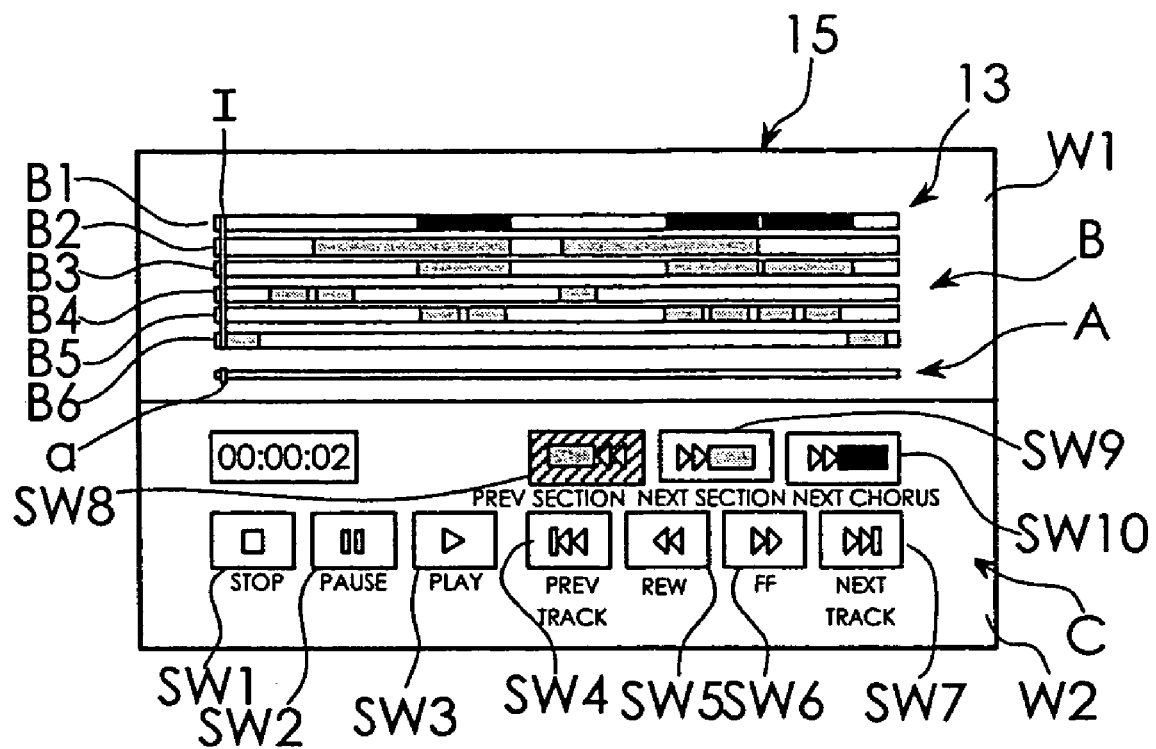
FIG. 13 is a diagram to be used to describe selection of a repeated section.

In the following, the operation of jumping to previous repeated sections is described with reference to FIG. 12 and FIG. 13. FIG. 12(A) shows the state immediately after the play selection button SW3 has been pressed and playback of a certain music audio data has started. In this state, the vertical display bar I and the display mark 'a' are at the beginning of the original playback position. FIG. 12 (B) shows the state in which the playback is being continued. When the first repeated section selection button SW8 is pressed once in this state, it changes to FIG. 12(C). In this state, the vertical display bar I and the display mark 'a' jump to the beginning of the display of [the first repeated section of the display bar B4], the closest previous repeated section, and the playback position also shifts to the beginning of [the first repeated section of the display bar B4], the closest previous repeated section. When the first repeated section selection button SW8 is pressed once again in this state, as shown in FIG. 13, the vertical display bar I and the display mark 'a' jump to the beginning of the display of [the first repeated section of the display bar B6], the closest previous repeated section in this state, and the playback position also shifts to the beginning of [the first repeated section of the display bar B6], the closest previous repeated section.

Thus arbitrarily selecting the selection buttons SW8 to SW10 enables playback of an arbitrary characteristic music structure section selected by the interface 13.

Figure 14:
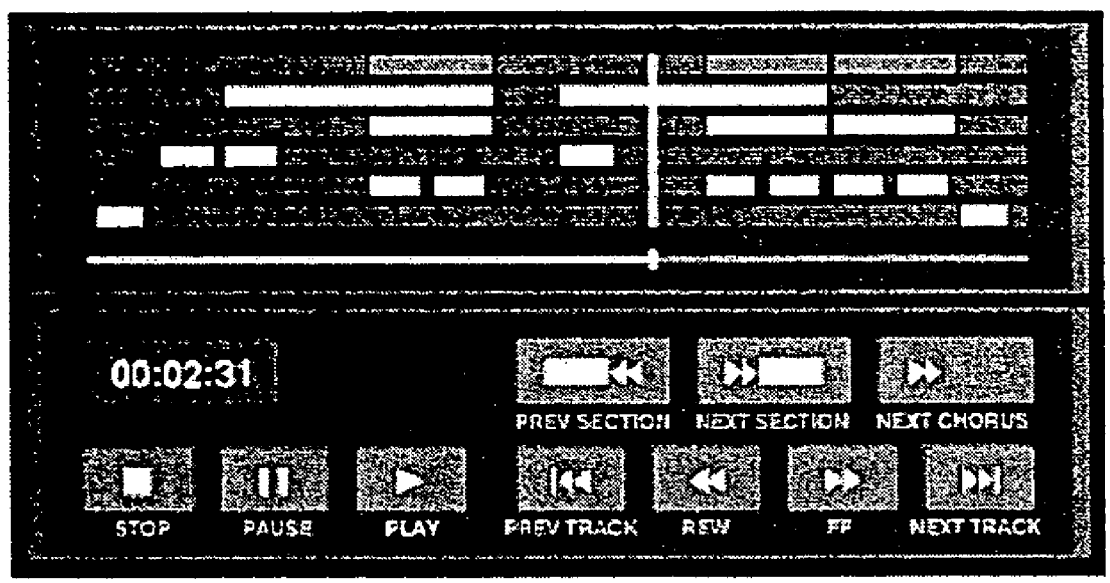
FIG. 14 is a diagram showing a screen of the interface that has been actually created.

FIG. 14 shows an example of the screen of the interface that the inventor actually created.

In the following, the actual machine in which the present invention was implemented more specifically, and the results are described.

The interface of the actual machine operates by using a file including descriptions of chorus sections and repetition structures which were obtained by using the chorus section detecting method.

To improve extensibility, the GUI module, the engine of the music audio playback apparatus, and the audio output device control module of the actual machine have been implemented as separate processes to be operated in a distributed environment. A network protocol RACP (Remote Audio Control Protocol) enabling efficient sharing of audio signals or various types of control information over a network was designed and the implementation was made based on that. RACP is an extension of RMCP (Remote Music Control Protocol) for the purpose of transmitting audio signals.

The actual machine was run under the four conditions, depending on the presence or absence of the two proposed functions (the selection buttons SW8 to SW10 for jumping and music structure display). As targeted pieces of music for trial listening, pieces of music that the trial listeners have never listened to before were selected from among 100 pieces of music of "RWC Music Database: Popular Music" (RWC-MDB-P-2001 No. 1 to No. 100). And the characteristic music structure section specifying data was used, which was correctly obtained by the automatic chorus section detecting method (80 out of the 100 pieces of music were correctly detected by the automatic chorus section detecting method). For your reference, it took about 100 hours for a person (a graduate of a music college) to manually label the 100 pieces of music by using a chorus section manual labeling editor developed, starting from the state in which separators for beats or measures were labeled in advance. In the following, the 4 conditions and the operation results thereof are described. For the comparison of the conditions, we did not use the function that allows the listener to click directly on a visualized section of the music structure to play back.

[Condition 1] None of the Proposed Functions Provided (Equivalent to the Prior Art).

If the chorus was not found at the beginning of the piece of music, the trial listener would push the fast-forward button and then listen for a while, repeating this 5 to 10 times until the chorus appeared. This fast-forward type of operation while briefly listening to the music is time consuming and troublesome but nevertheless useful when one wants to catch the mood of a piece of music.

[Condition 2] No Selection Buttons SW8 to SW10 but Music-Structure Display Provided Listeners found this setup to be more convenient than that of Condition 1 since the music structure display provided good feedback as to how far one should fast-forward for playback. On the other hand, as positions beyond the current playback position were displayed, listeners often felt frustrated that they could not jump directly to those positions.

[Condition 3] The Selection Buttons SW8 to SW10 Provided but no Music Structure Display After listening to the intro of the music, the tendency here was to push the chorus section selection button SW10 directly and listen, or to push the second repeated section selection button SW9 for "jumping to the beginning of a next music structure section" and listen briefly, repeating this until the chorus appeared and then listening carefully. Listeners felt that listening while jumping was efficient and preferred this setup to that of Condition 2.

[Condition 4] All Proposed Functions Provided (Corresponding to the Embodiment)

This setup combined the advantages of the setups under Conditions 2 and 3 and was consequently evaluated as most convenient by listeners. Furthermore, in addition to the manner of listening under Condition 3, there was a strong tendency to listen while moving back and forth as desired on the music structure. For example, a listener listened to the first instance of the chorus and then returned to verse A, and then jumped to a repeated chorus section in the latter half of the music.

Condition 3, which corresponds to the addition of the three selection buttons SW8 to SW10 to an ordinary media player, was found to be more convenient than such a player despite the absence of a music structure display. The results of Condition 4, moreover, revealed that visualization of music structure facilitated jump operations and the listening to various parts of music. In general, listeners who had received no explanation about button functions or display windows were nevertheless able to surmise their purpose in a short time of use.

The above results demonstrate that the proposed interface works practically and that pushing the selection buttons SW8 to SW10 for jumping while receiving visual assistance from the music structure display enables listeners to play back music in an interactive manner.

Although the above embodiment provides the manipulation unit of the interface formed on the display, it is needless to say that the interface may comprise actual switches such as analog switches, etc.

The above embodiment is implemented through installation of a program into a so-called personal computer. It is needless to say, however, that the present invention is also applicable to various types of so-called music audio players, for example, such as radio cassette players, CD players, DVD players, etc.

The interface to be used in the embodiment is useful as a general interface for music playback, wherein an operation system is added for targeting the sections in a music structure as its operational units, whereas the conventional operation system targets only pieces of music as its operational units. In the conventional interface, although pieces of music of no interest to the listener could easily be skipped, skipping sections of no interest within a particular piece of music was not as easy. An outstanding advantage of the interface according to the invention is the ability to "listen to any part of a piece of music whenever one likes" without having to follow the timeline of the original piece of music. As a random play (shuffle play) function is possible in the unit of piece of music, so a random play function is feasible in the unit of musical section. In addition, for situations that permit long-term listening as opposed to trial listening, listeners tend to listen to music in a more analytical fashion compared to past forms of music appreciation, when they can interactively change the playback position while viewing the structure of a piece of music. For example, listeners have been observed to check the kind of structure possessed by an entire piece, to listen to each section in that structure, and to compare sections that repeat. Also it is interesting and useful to see the visualized results of music structure, while listening to music.

Furthermore, in addition to jumping a playback position to the beginning of repeated sections in a piece of music, if non-repeated sections (e.g., interludes, guitar solos, etc.) have been labeled in advance it is also possible to jump the playback position to the beginning of those sections.

Figure 15:
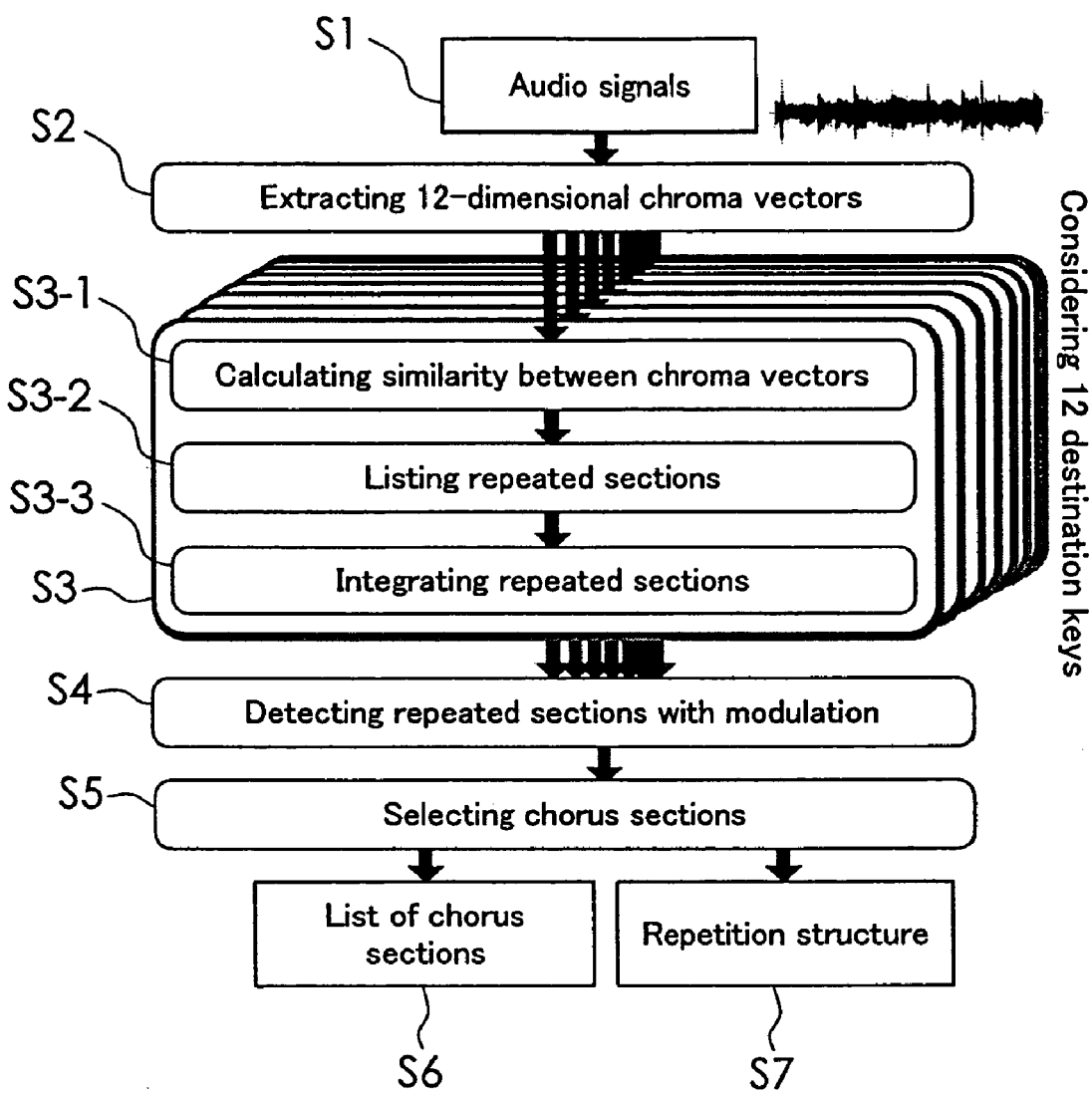
FIG. 15 is a flowchart showing process steps of a chorus section detection method for detection the chorus section including modulation in music of one embodiment of the present invention.

In the following, the embodiment of a method of detecting a chorus section to be used in the automatic chorus section detecting method is described in detail. FIG. 15 is a flow chart illustrating process steps in a method of detecting a chorus section in a modulated piece of music.

(1) In this embodiment, first, an audio signal (audio signal data) is obtained (step S1).

(2) Then, 12-dimensional acoustic features (12-dimensional chroma vectors obtained by adding, over a plurality of octaves, power spectrum of frequencies of respective 12 pitch classes) that are not susceptible to deformations of details, are extracted from each frame of the input audio signal (step S2).

(3) The similarities between the acoustic features of the extracted 12-dimensional chroma vectors and that of all previous frames are calculated (solution to Problem 1) (Step S3-1). Then, pairs of repeated sections are listed while automatically changing the repetition judgment criterion for every piece of music, by adopting the Automatic Threshold Selection Method (Norivuki Otsu, Automatic Threshold Selection Method Based on Discrimination and Least Square Criterion, Journal of Institute of Electronics, Information and Communication Engineers (D) J63-D, 4, 349–356 (1980)) based on the judgment criterion (solution to Problem 2) (Step S3-2). Then, create a group of repeated groups by integrating those pairs over the entire piece of music, and also determine respective end positions appropriately (solution to Problem 3) (Step S3-3).

(4) Now, if modulation is considered, since each dimension of chroma vectors corresponds to a pitch class, a value of a chroma vector modulated by shifting values between dimensions according to the modulation widths and that of a chroma vector before being modulated will be close. For this reason, the similarities of the chroma vectors before and after modulation are calculated, by thus considering the 12 types of modulation destinations. Starting with that, detection of the above-mentioned repeated sections is also performed for each of 12 types, and then all the repeated sections are integrated (solution to Problem 4) (Step S4).

(5) Lastly, the chorus possibility of the respective obtained sections is evaluated based on the above assumptions (Step S5).

(6) A list of the sections having the highest chorus possibility is output (Step S6).

(7) Simultaneously, the repetition structures obtained as intermediate results are to be output (Step S7).

Figure 16:
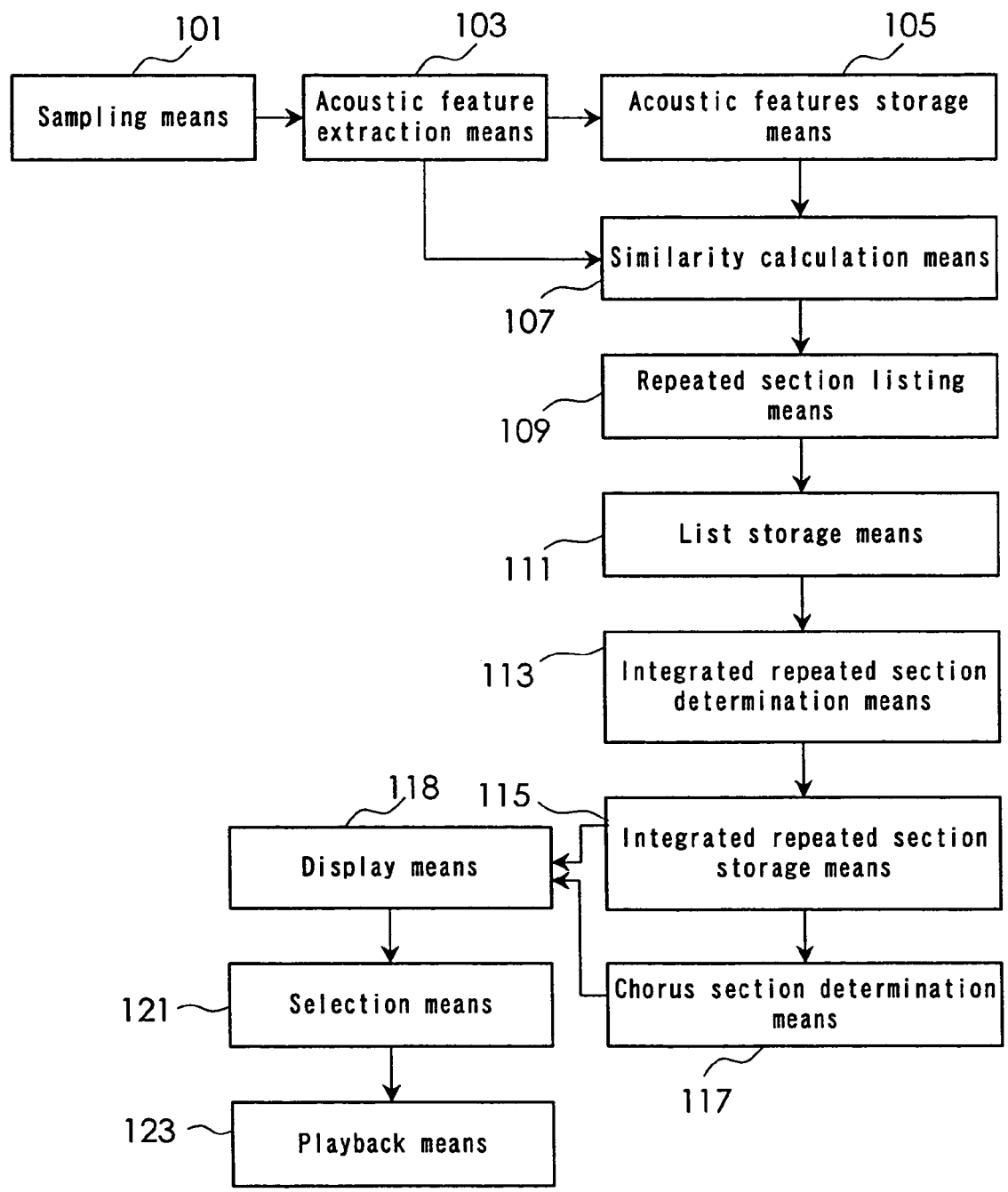
FIG. 16 is a block diagram outlining the configuration of one embodiment of a chorus section detection apparatus of the present invention.
Figure 17:
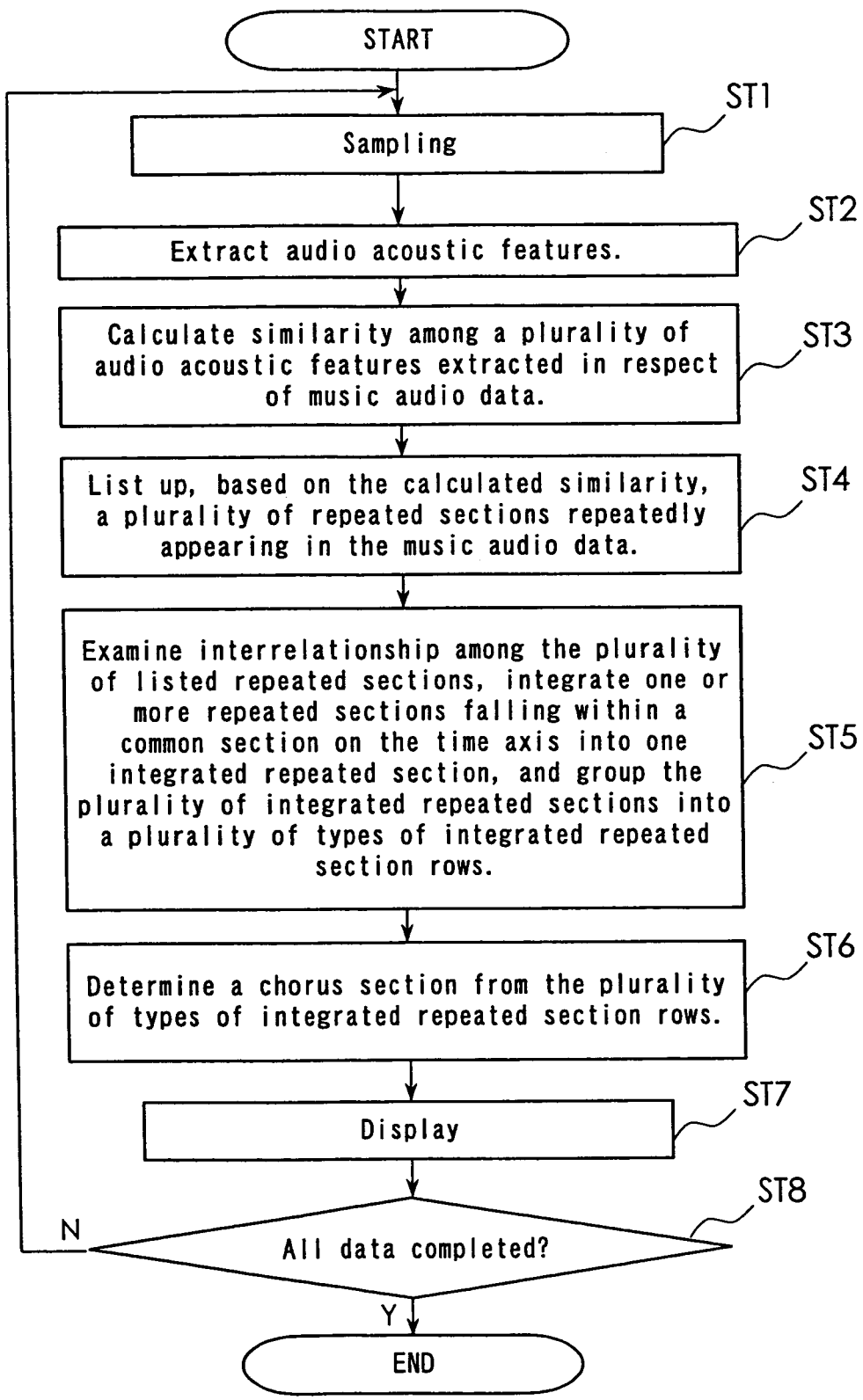
FIG. 17 is a flowchart showing one example of algorithm of a program to be used for implementing an apparatus of FIG. 16 by using a computer.

FIG. 16 is a block diagram outlining the configuration of an example of the embodiment of an apparatus for detecting a chorus section according to the present invention. Needless to say, the method described in FIG. 15 is also feasible in the apparatus. FIG. 17 is a flow chart illustrating an example of the program algorithm to be used when implementing the apparatus of FIG. 16 by using a computer. Now, the steps in the flow charts of FIGS. 15 and 17 are described, while explaining the configuration of the apparatus of FIG. 16.

First, a sampling means 101 samples music audio data being input, for a predetermined time unit (for instance, 80 ms), by using such a sampling technique as Hanning window, etc., that carries out sampling of data while duplicating with predetermined sampling width (sampling step ST1 of FIG. 17). If the data is audio signals, the data to be sampled will be very short fragments (frames) of audio signals.

The acoustic features extraction means 103 determines acoustic features of the data sampled in time unit by the sampling means 101 (Step ST2 of extracting acoustic features in FIG. 17). A method of determining acoustic features to be adopted by the acoustic features extraction means 103 is optional. In the embodiment, as the acoustic features determined by the acoustic features extraction step, the 12-dimensional chroma vectors are used, which are obtained by adding, over a plurality of octaves, power spectrum of frequencies of respective 12 pitch classes contained in a range of one octave.

Figure 18:
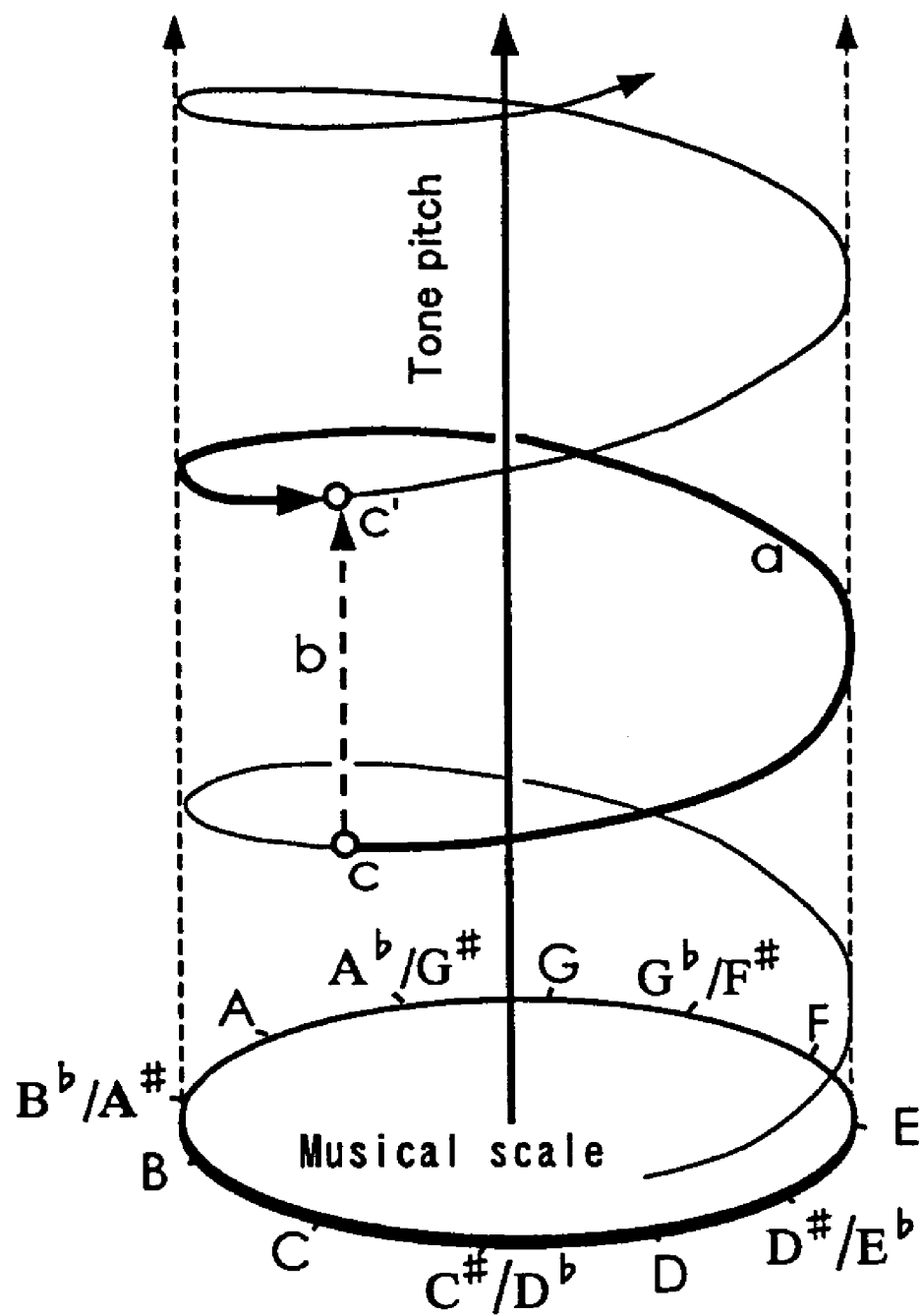
FIG. 18 is a diagram for describing helical pitch perception.

Now a 12-dimensional chroma vector is described with reference to FIGS. 18 and 19. A chroma vector is an acoustic feature representative of power distribution, with a chroma (pitch class, chroma) disclosed in Shepard, R. N., Circularity in Judgments of Relative Pitch, J. Acoust. Soc. Am., 36, 12, 2346–2353 (1964), as a frequency axis. A chroma vector here is close to what results from scattering the chroma axis of the chroma spectrum shown in the prior art 8 into 12 pitch classes. As shown in FIG. 18, perception of musical pitches (musical height and pitch height) according to Shepard has an ascending helical structure. And the perception of musical pitches can be expressed in two dimensions: a chroma on the circumference when the helix is viewed from above, and longitudinal height (an octave position, height) when it is viewed from the side. For a chroma vector, considering that the frequency axis of the power spectrum runs along the helical structure, and by crushing the helix into a circle in the direction of height axis, the frequency spectrum is expressed only by the chroma axis on the circumference (one perimeter constitutes one octave). In other words, powers of positions under a same pitch class over different octaves are added to make the power of the position of the pitch class on the chroma axis.

In the embodiment, as shown in FIG. 19, the chroma vectors are expressed by 12 dimensions and a value of the chroma vector of each dimension represents the power of a pitch class of different equal temperaments. FIG. 19 shows how powers of positions under a same pitch class are added, for 6 octaves, to be made into the power of position of that pitch class on the chroma axis. In order to obtain the 12-dimensional chroma vector, first, Short-term Fourier transform (STFT) for the input audio signal at time t is calculated. Then, the power spectrum $\Psi_p(f,t)$ is determined from the operation result of the Short-term Fourier Transform (STFT), by way of converting the frequency axis of to frequency f of log-scale. The frequency of the log-scale is expressed in the unit of cent, and the frequency fHz expressed in the unit of Hz is converted into the frequency fcent expressed in cent, as shown below:

$$f\text{cent} = 1200 \log_2 [fHz/(440 \times 2^{3/12-5})] \quad (1)$$

A semitone of the equal temperament corresponds to 100 cent, and one octave corresponds to 1200 cent. Thus, the pitch class c (c is an integer of $1 \leq c \leq 12$ and corresponds to a chroma), and the frequency $F_{c,h}$ cent at the octave position h (corresponding to height) can be expressed as:

$$F_{c,h} = 1200h + 100(c-1) \quad (2)$$

From the power spectrum $\psi_p(f,t)$ on the log-scale axis, each dimension $v_c(t)$ of the 12-dimensional chroma vectors is determined with the following expression (3), by adding the powers of the positions under the pitch class c over the octave range from $\text{Oct}_L$ to $\text{Oct}_H$ (in the present implementation, 3 to 8):

$$v_c(t) = \sum_{h=Oct_L}^{Oct_H} \int_{-\infty}^{\infty} BPF_{c,h}(f)\psi_p(f,t)df \quad (3)$$

wherein $BPF_{c,h}(f)$ is a bandpass filter that passes the power of pitch class c and of the octave position h, and is defined in the form of Hanning window, as shown by the following expression (4):

$$BPF_{c,h}(f) = \frac{1}{2}\left(1 - \cos\frac{2\pi(f - (F_{c,h} - 100))}{200}\right) \quad (4)$$

If the chroma vectors thus obtained is used as acoustic features, when the sound of an entire repeated section (composition of pitch classes sounding simultaneously) is similar, the section can be detected as a repeated section, even if a verse or accompaniment of the repeated section slightly varies every time the repetition takes place. Furthermore, as discussed later, contrivance on the similarity will also enable detection of modulated repetitions.

In the current implementation, the audio signal is A/D converted at the sampling frequency of 16 kHz and at the number of quantization bits of 16 bits. And the Short-term Fourier Transform (STFT) with a Hanning window having the window width of 4096-sample as the window function h(t) is calculated by Fast Fourier Transform (FFT). The Fast Fourier Transform (FFT) frame is shifted by 1280 samples, and the time unit (1 frame shift) for all the processes is set 80 ms.

Going back to FIG. 16, the acoustic features obtained as described above is stored in the acoustic features storage means 105. Then, similarity calculation means 107 determines mutual similarities among a plurality of acoustic features determined for music audio data that has been entered so far (the similarity calculation step ST3 of FIG. 17). An arithmetic expression to be used in determining similarity is optional, and any of well-known arithmetic expressions for similarity may be used. Then, the repeated section listing means 109 lists a plurality of repeated sections that repeatedly appear in the music audio data based on the similarity (the repeated section listing step ST4 of FIG. 17).

Figure 20:
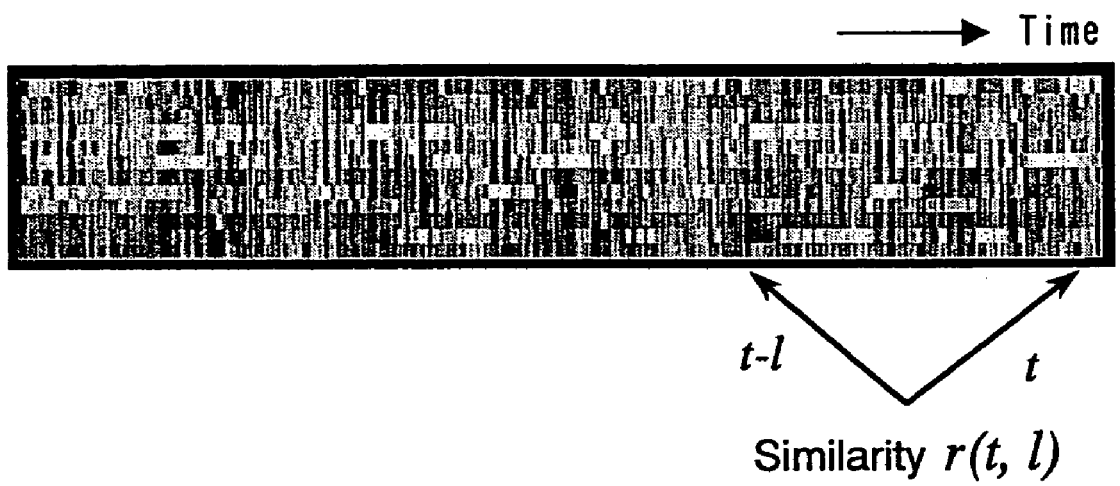
FIG. 20 is a diagram to be used to describe an idea of calculating similarity.
Figure 21:
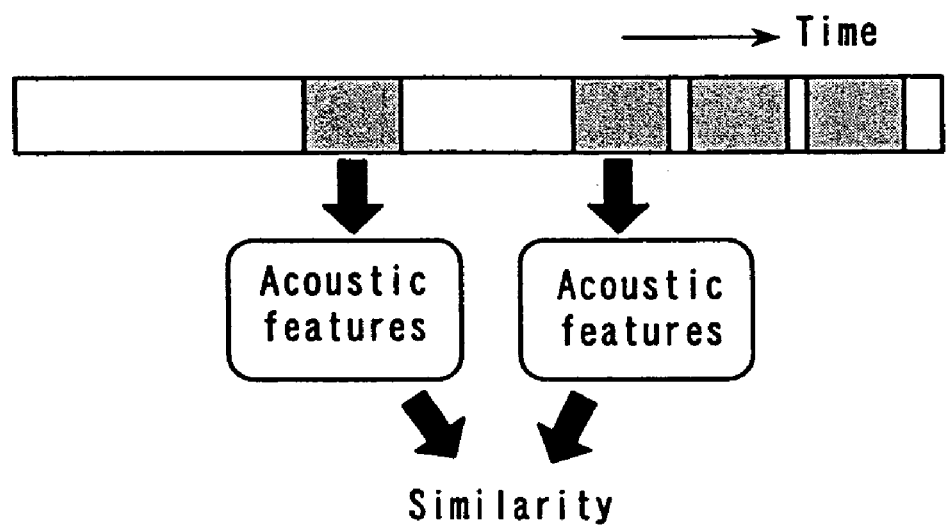
FIG. 21 is a diagram to be used to describe an idea of calculating similarity.

The similarity calculation means 107 determines similarities between the acoustic features determined this time and all the acoustic features determined previously. This enables real-time detection of a chorus section. In the specific similarity calculation means 107, as shown in FIGS. 20 and 21, similarities between 12-dimensional chroma vectors (acoustic features) at time t and all the 12-dimensional chroma vectors that are l-lag ($0 \leq l \leq t$) (l is a lower-case character of alphabet L) earlier than those will be determined. Calculation of the similarities between the 12-dimensional chroma vectors (steps ST3 of FIG. 17) is now described.

The similarity r(t,l) between the 12-dimensional chroma vector v(t) (v here represents a vector) and the 12-dimensional chroma vector v(t-l) (v here represents a vector), which is l-lag ($0 \leq l \leq t$) earlier, is determined based on the following expression (5):

$$r(t,l) = 1 - \frac{\left|\frac{\vec{v}(t)}{\max_c v_c(t)} - \frac{\vec{v}(t-l)}{\max_c v_c(t-l)}\right|}{\sqrt{12}} \quad (5)$$

In the above expression (5), the denominator $(12)^{1/2}$ signifies the length of the diagonal line of the 12-dimensional hypercube with side length of lag l. The following expression (6) in the numerator of the above expression (5) is always located on a plane that does not contain the origin of the hypercube, so r(t,l) satisfies $0 \leq r(t,l) \leq 1$.

$$\frac{\vec{v}(t)}{\max_c v_c(t)} \quad (6)$$

In other words, the similarity r(t,l) is a value obtained by normalizing the chroma vector at each time t with the maximum element, calculating the chroma vector that is only l lag earlier and Euclidean distance, and subtracting the calculation result thereof from 1.

Figure 22:
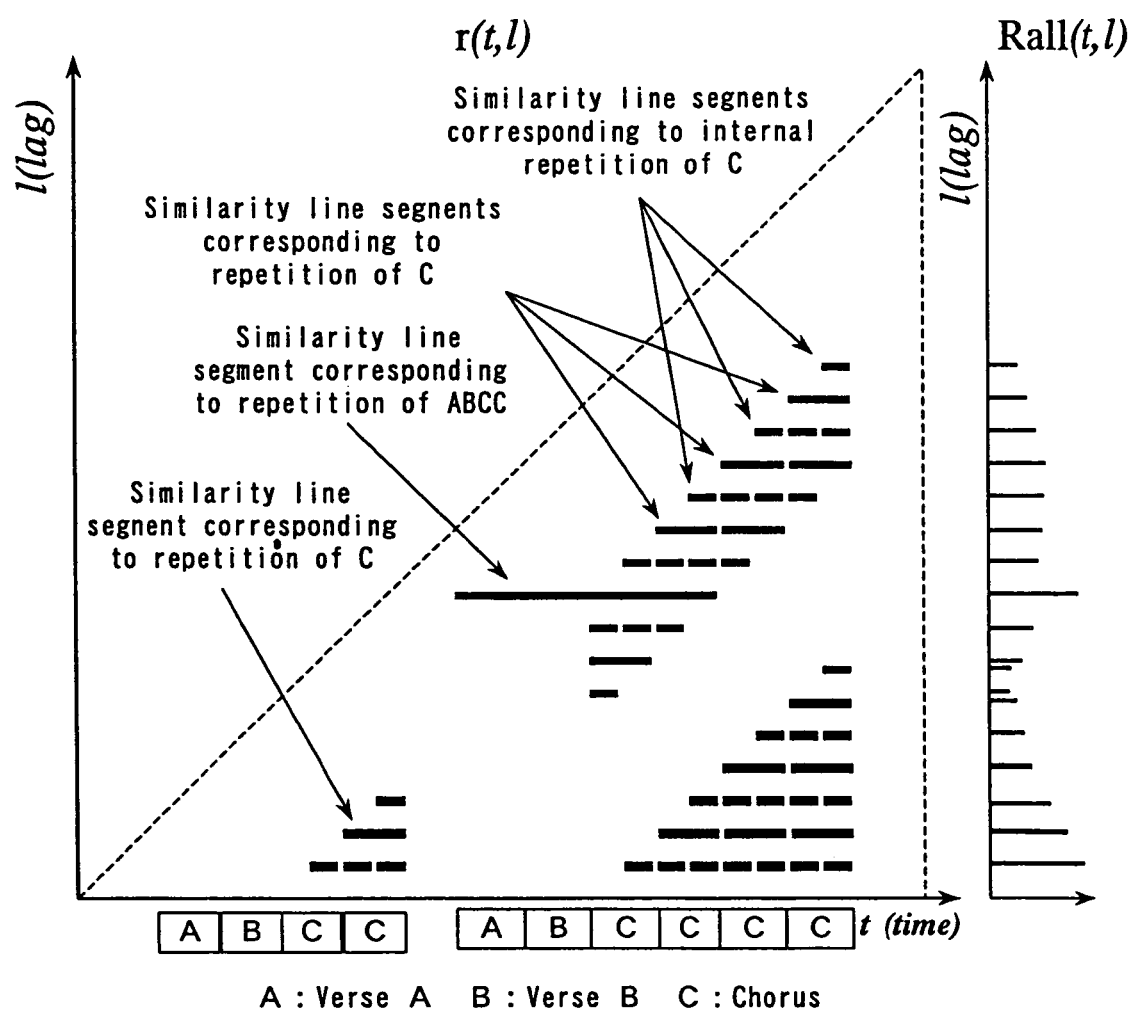
FIG. 22 is a conceptual diagram of similarity line segments, similarity r(t,l), and parameter space $R_{all}(t,l)$ for a particular piece of music.

Next, listing of repeated sections by the repeated section listing means 109 (step ST4 of FIG. 17) is described. FIG. 22 is a conceptual diagram showing similarity line segments, the similarity r(t,l), and parameter space $R_{all}(t,l)$ for a piece of music, which are to be discussed later. In the repeated section listing means 109, as shown in FIG. 22, one axis is considered a time axis and the other as a lag axis, and when the similarity exceeds a predetermined threshold during a period of time longer than a predetermined time length, the similarity line segment is listed up as a repeated section relative to the time axis.

In FIG. 22, the similarity line segments are displayed in parallel with the time axis. In addition, listing here needs only be listing in calculation, and there is no need of actual listing on the display means. Therefore, both the time axis and the lag axis may be theoretical. Here the concept of "similarity line segment" shall be defined in this specification. A "similarity line segment" is defined as a segment having time length corresponding to a length of a part where the similarity exceeds the threshold, when the similarity exceeds a predetermined threshold during a period of time longer than a predetermined time length. In addition, magnitude of similarity does not manifest ina similarity line segment. Noise can be removed by changing or adjusting the threshold appropriately.

Figure 23:
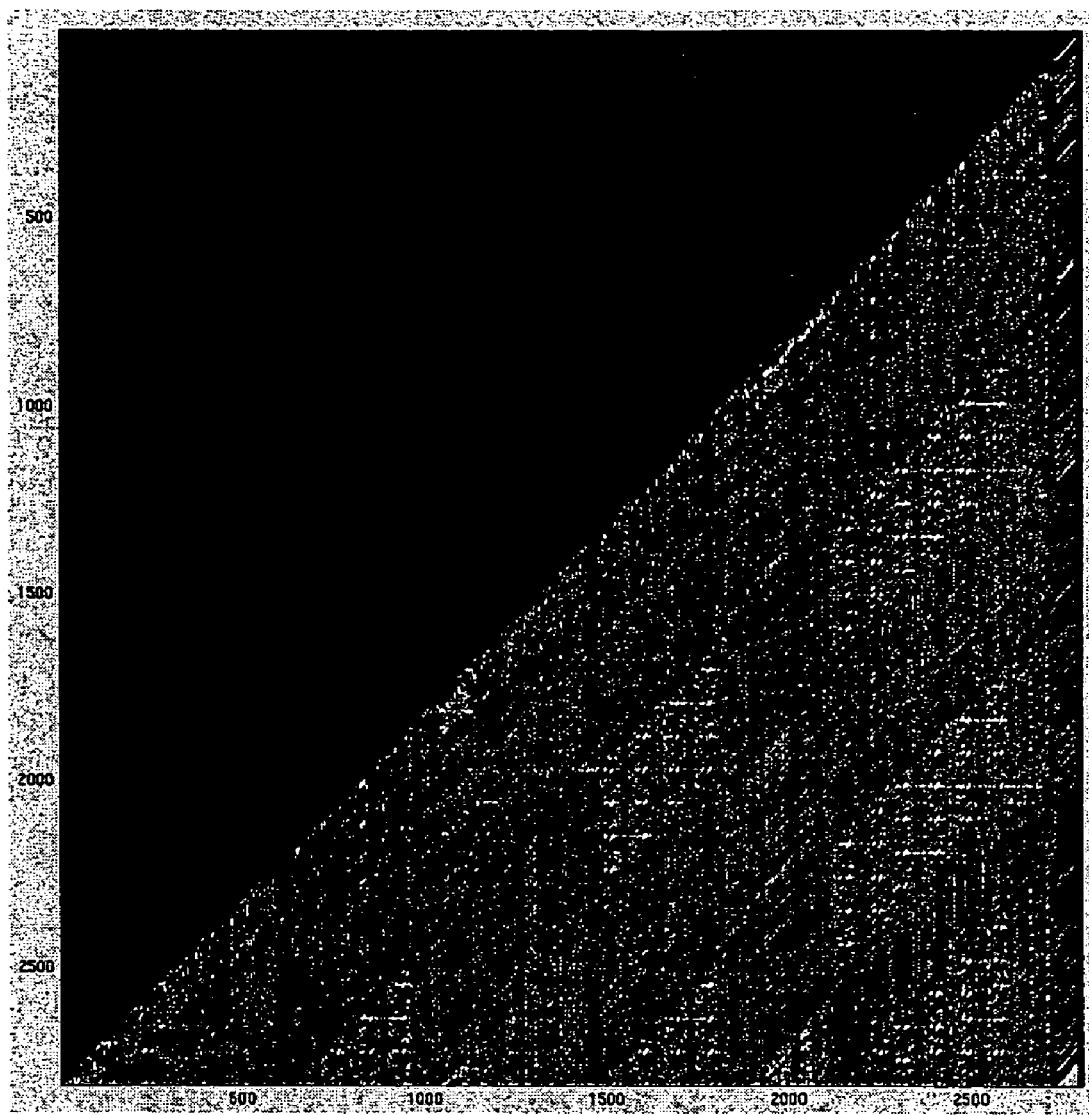
FIG. 23 shows one example of similarity line segments that has been actually obtained.

In FIG. 22, the similarity r(t,l) is defined in the right-angled triangle in the lower right-hand corner. As shown in FIG. 23, the actual r(t,l) is noisy and ambiguous, and often contains many line segments irrelevant to chorus sections.

For listing, based on the similarity r(t,l), what section is repeated is checked. When the similarity r (t,l) is drawn, as shown in FIG. 22, on the plane t-l, in which the horizontal axis is the time axis t and the vertical axis is the lag axis l, line segments (regions where the similarities are consecutively high) parallel to the time axis appear, corresponding to the repeated sections. Then, the segment having high similarity at the position of the lag axis L1 across the section between the time T1 and T2 (hereafter denoted as [T1, T2]) is called as a similarity line segment and denoted as [t=[T1, T2], l=L1]. This means that [T1, T2] and [T1-L1, T2-L1] are the repeated sections. Thus, if all the similarity line segments in r(t,l) are detected, a list of repeated sections will be obtained.

Figure 24:
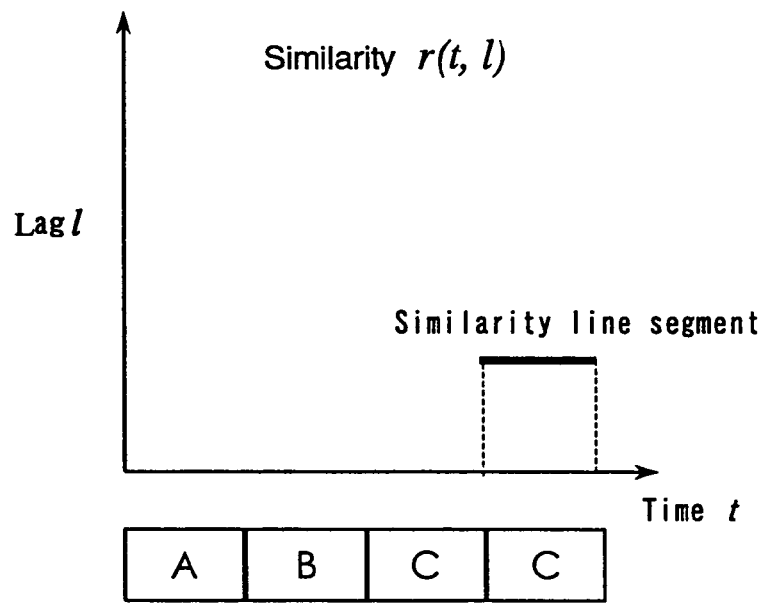
FIG. 24 is a diagram to be used to describe an idea of similarity line segments.
Figure 25:
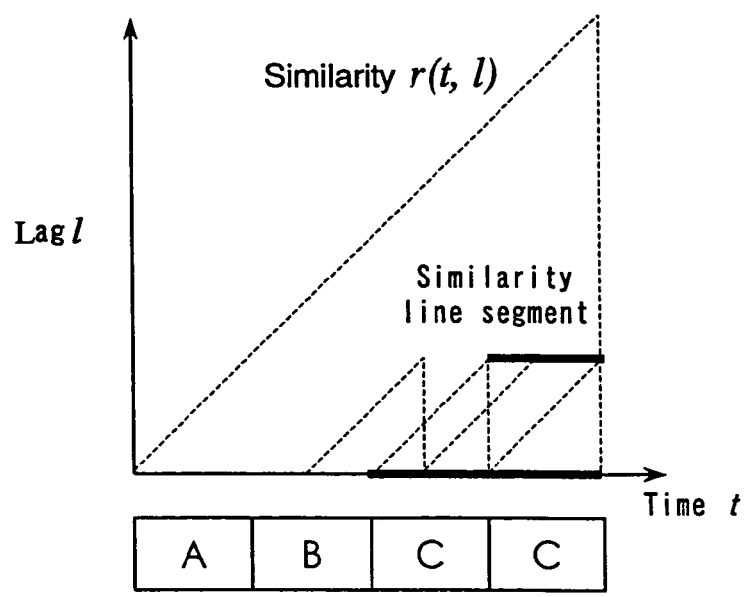
FIG. 25 is a diagram to be used to describe an idea of similarity line segments.
Figure 26:
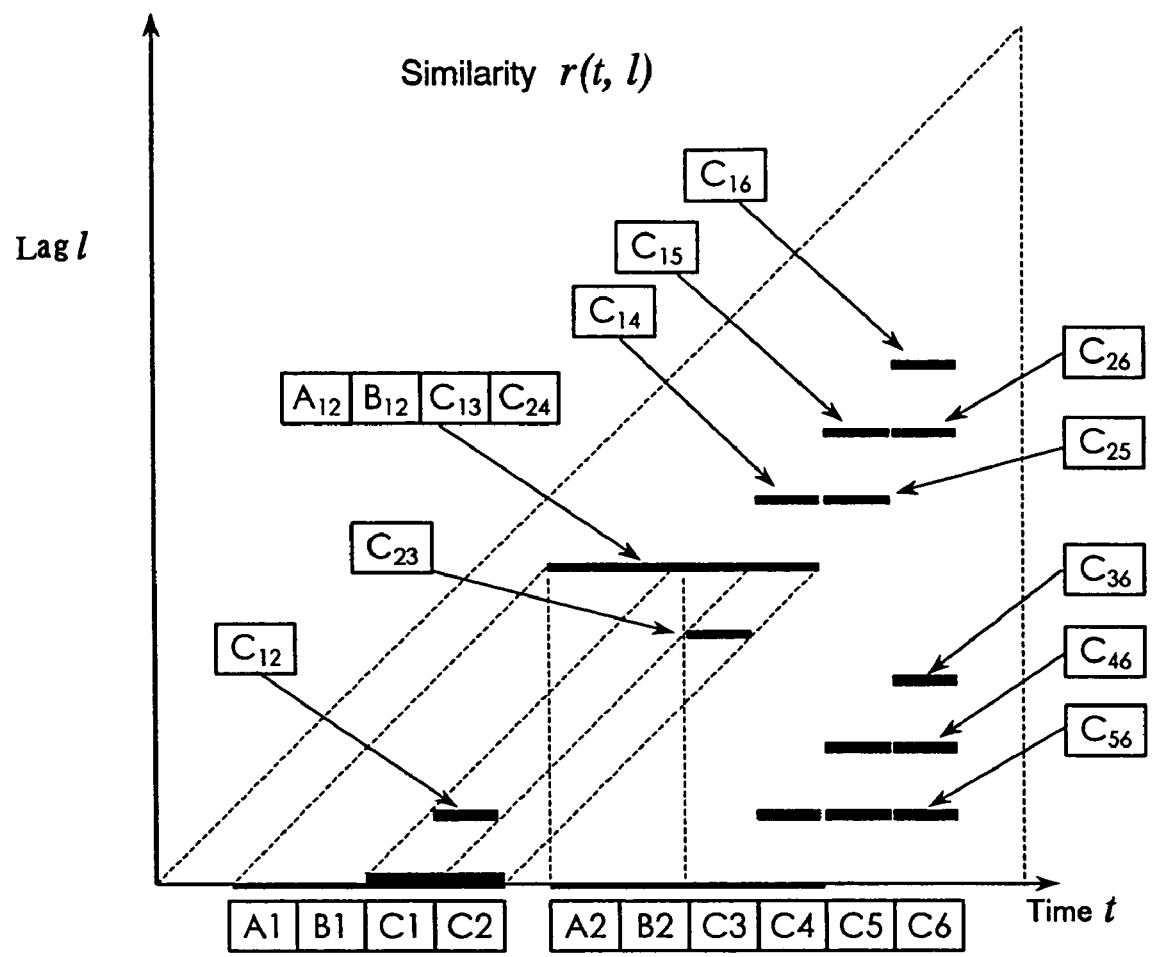
FIG. 26 is a diagram to be used to describe an idea of similarity line segments.
Figure 27:
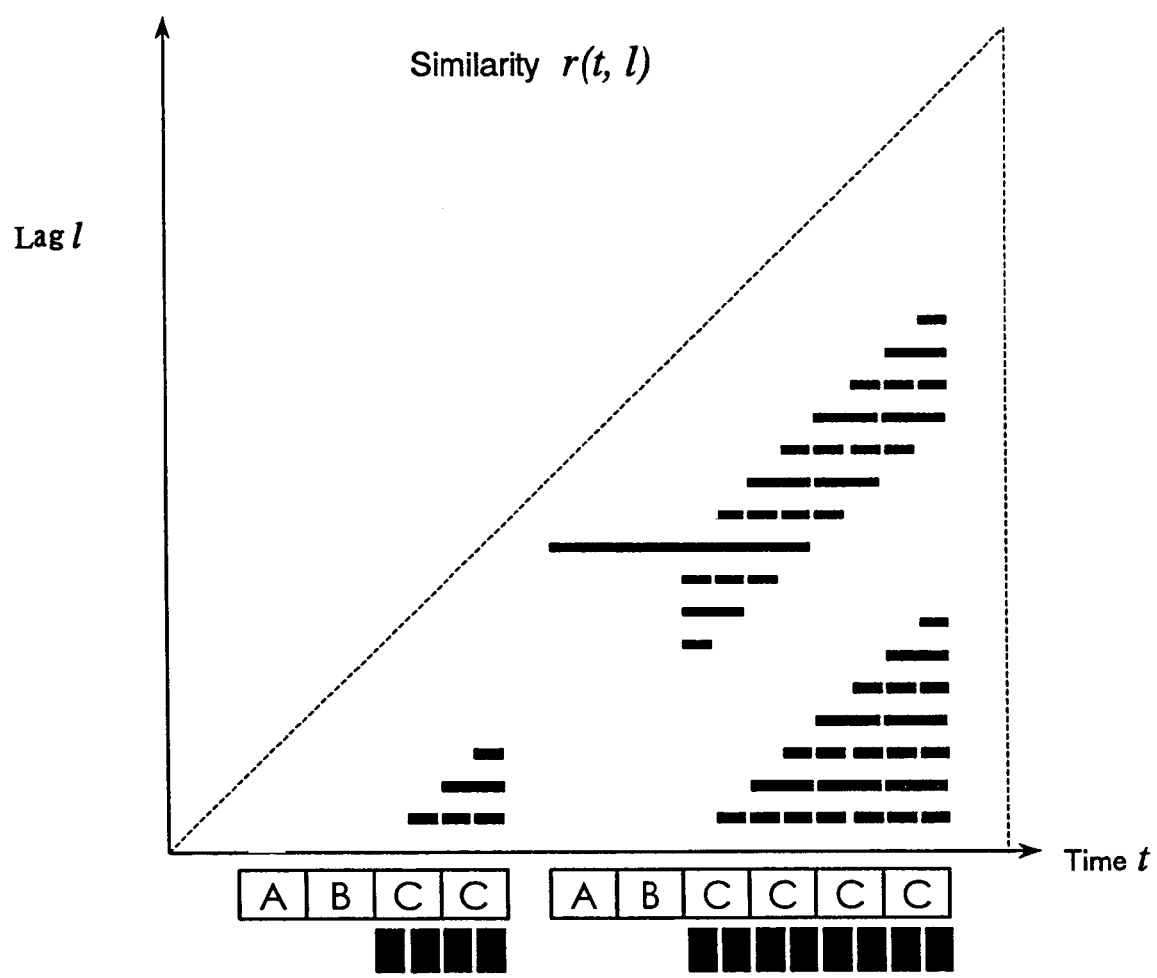
FIG. 27 is a diagram to be used to describe an idea of similarity line segments.

Now the idea of similarity line segments is described briefly. For instance, consider the case in which a similarity line segment indicating a repeated section appears on the plane t-l, as shown in FIG. 24. The alphabet notation shown below the horizontal axis of FIG. 24 indicates that audio signals that have been input so far are verse A→ verse B→ chorus (C)→ chorus (C). Such a similarity line segment has appeared because the chorus C continues twice. In other words, as shown in FIG. 25, since the similarity between the earlier chorus section C and the later chorus section C is higher than the similarity between the last chorus section C and the first 2 sections (A, B) the similarity line segment having the same time length as the chorus C appears at the time position corresponding to the last chorus C and in the position lag l of which corresponds to the earlier chorus C. Furthermore, suppose that the time has elapsed and the state has changed to FIG. 26. In FIG. 26, for easy understanding, sections of which the acoustic features are to be compared are denoted by numbers shown in the lower right part of the respective alphabets of A, B, C. For instance, the notation "$A_{12}$" indicates that the similarity of acoustic features of verse A of the section A1 and verse A of the section A2 has been calculated, and that the similarity line segment has appeared since the similarity is high. Similarly, "$C_{36}$" indicates that the similarity of acoustic features of a chorus section in the section C3 and that in the section C6 has been calculated, and that the similarity line segment has appeared since the similarity is high. In addition, when a chorus is repeated twice in one chorus section, similarity line segments will appear as shown in FIG. 27.

In order to perform detection of line segments parallel to the time axis through calculation by using a computer, for every pixel (T,L) on the t-l plane, intensity of the pixel is accumulated in the one-dimensional parameter space l (lag) corresponding to the position L. It is then considered that a line segment exists in the lag position where the accumulated value in the parameter space l is high.

To be specific, the parameter space $R_{all}(t,l)$ at time t can be determined with the following expression (7):

$$R_{all}(t, l) = \int_{l}^{t} \frac{r(\tau, l)}{t - l} d\tau \qquad (7)$$

As shown in FIG. 22, it is most likely that the similarity line segment exists at the position 1 where the above-mentioned $R_{all}(t,l)$ has a high value.

The distance from chroma vectors due to broadband noise, etc., of which the components are almost the same, to other chroma vectors tends to be relatively short, and this may appear as straight lines having high similarities (hereafter referred to as noise lines) in r(t,l). In the t-l plane, the noise lines appear in perpendicular direction (up/down) in relative to the time axis, or in obliquely upper right/lower left direction. Hence, as preprocessing, the noise lines are curbed before calculation of the above-mentioned expression (7). First, for each r(t,l), the mean values of the neighboring sections are calculated in the six directions, namely, right, left, up, down, upper right and lower left, and the maximum and the minimum values thereof are determined. Then, if the mean value of the neighboring section in the right or the left direction is the maximum, it is considered a part of a similarity line segment, and the minimum value is subtracted from r(t,l) for emphasizing. When the mean value of the neighboring section in other directions is the maximum, it is considered a part of a noise line, and the maximum value is subtracted from r(t,l) for control. $R_{all}(t,l)$ thus determined makes a diagram as shown in the right of FIG. 28.

Detection of similarity line segments after $R_{all}(t,l)$ has been determined as discussed above, is performed with the following procedure 1 and 2.

Procedure 1: Detection of Line Segment Candidate Peaks

Figure 28:
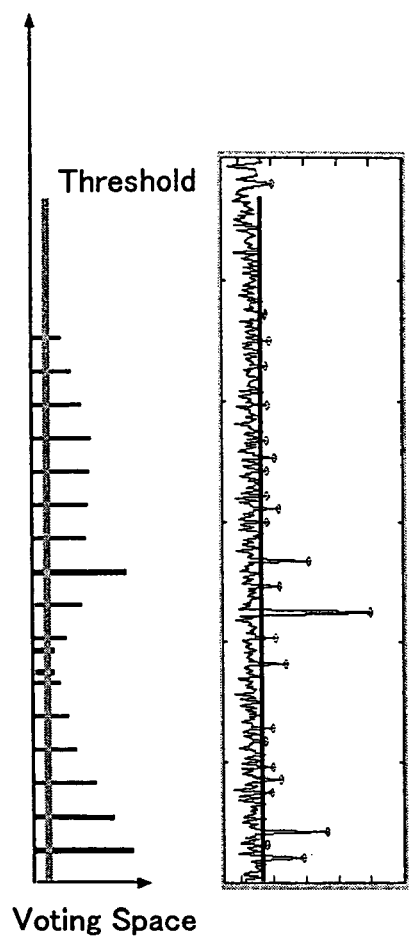
FIG. 28 is a diagram to be used to describe how to define a threshold in obtaining similarity line segments.

An adequately high peak sin $R_{all}(t,\mathbf{1})$ as shown in the diagram on the right side of FIG. 28 are detected as a line segment candidate peaks. First, peaks of $R_{all}(t,l)$ relative to the lag axis are determined by the peak detection using smoothing differentiation through matching of quadratic polynomials Savitzky, A. and Golay M. J., Smoothing and Differentiation of Data by Simplified Least Squares Procedures, Analytical Chemistry, 36, 8, 1627–1639 (1964)). Specifically, a location where the smoothing differentiation of $R_{all}(t,l)$ determined by the following equation (8) changes from positive to negative shall be considered a peak ($K_{Size}=0.32_{sec}$).

$$\sum_{w=-KSize}^{KSize} wR_{all}(t, l+w) \qquad (8)$$

However, before this peak detection, the global variations in r(t,l) due to the accumulation of noise components, etc. are removed by subtracting what results from smoothing $R_{all}(t,l)$ in the direction of the lag axis by a moving mean whose weight function is the second-order cardinal B-spline [which corresponds to high pass filtering $R_{all}(t,l)$].

Figure 29:
FIG. 29 is a diagram to be used to describe how to define a threshold in obtaining similarity line segments.

Next, from a collection of thus obtained peaks, only peaks that are higher than a certain threshold are selected as line segment candidate peaks. As discussed in the Problem 2 mentioned earlier, the threshold should be automatically changed based on a piece of music because an appropriate value differs for every piece of music. Thus, when the peak heights of $R_{all}(t,l)$ are dichotomized into 2 classes by a threshold, the automatic threshold selection method (Noriyuki Otsu, Automatic Threshold Selection Method Based on Discrimination and Least Square Criterion, Journal of Institute of Electronics, Information and Communication Engineers (D) J63-D, 4, 349–356 (1980)) is used based on the discrimination criterion providing a maximum degree of class separation. As shown in FIG. 29, the automatic threshold selection method has adopted the idea of dichotomizing the peak heights into two classes by a threshold. Here, as the degree of class separation, a threshold that maximizes inter-class distribution is determined;

$$\sigma_B^2 = \omega_1 \omega_2 (\mu_1 - \mu_2)^2 \quad (9)$$

$\omega_1$ and $\omega_2$ are probabilities of occurrence (the number of the peaks in each class/the total number of the peaks) of 2 classes divided by the threshold, and $\mu_1$ and $\mu_2$ are the means of peak heights in each class.

Procedure 2: Searching Similarity Line Segments

Figure 30:
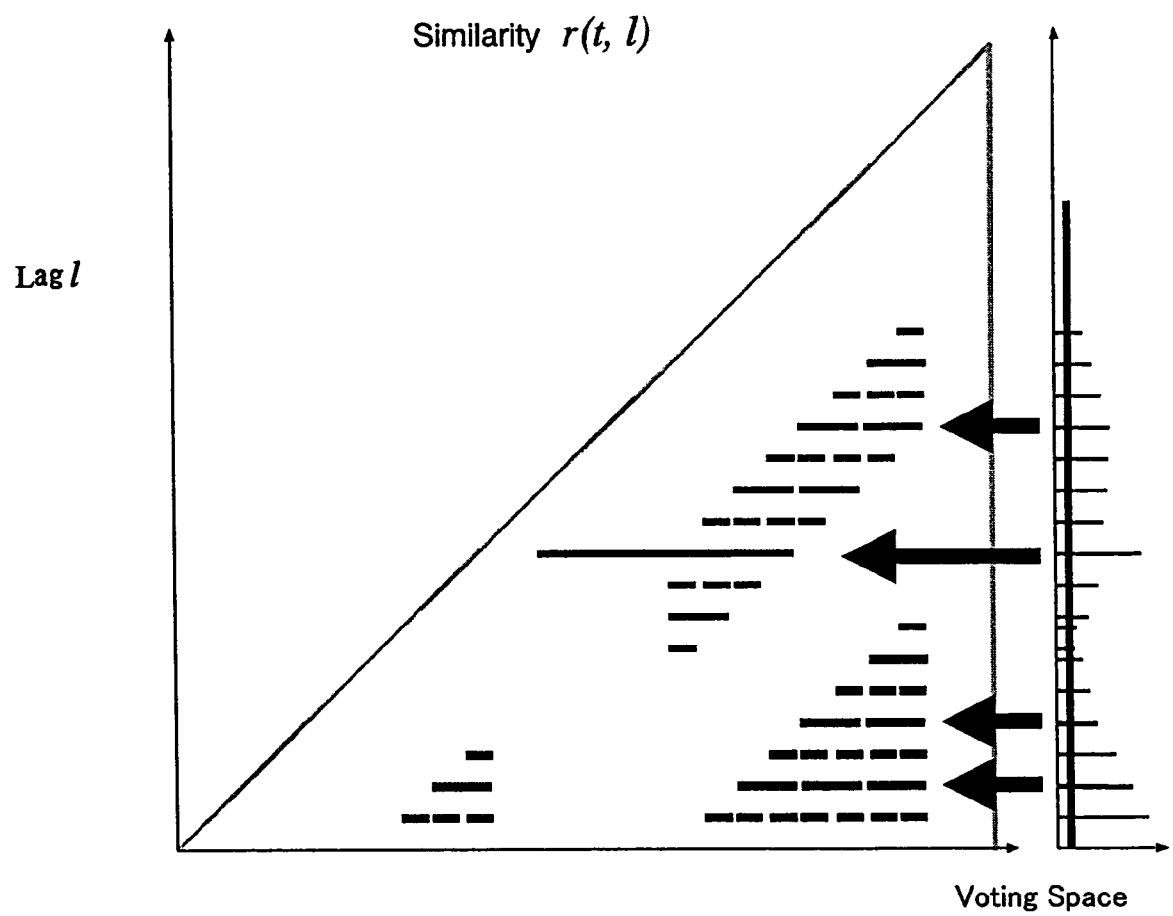
FIG. 30 is a diagram to be used to describe a method of extracting similarity line segments.

As shown in FIG. 30, it is assumed that, at a position 1 on the lag axis of each line segment candidate peak, the time axis direction of the similarity $r(t,l)$ is a one-dimensional function, and search for a section where the value is adequately high continuously, regarding the section a similarity line segment.

First, $r_{smooth}(t,l)$ is determined by smoothing $r(t,l)$ in the direction of the time axis, by a moving mean whose weight function is the second-order cardinal B-spline. Next, from among all sections where $r_{smooth}(t,l)$ continuously exceed a certain threshold, sections that are longer than a certain length (6.4 sec) are determined as similarity line segments. This threshold is also defined by the automatic threshold selection method based on the above discrimination criteria. However, at this time, instead of treating the peak heights, top five line segment candidate peaks having high peak heights are selected, and the values of their $r_{smooth}(\tau,l)$ ($1 \leq \tau \leq t$) at the lag l position are classified into two classes.

The lists of repeated sections that has been listed as described above is stored in the lists storage means 111 as shown in FIG. 16. The integrated repeated section determination means 113 determines an integrated repeated section by checking mutual relationship of a plurality of repeated sections from the lists stored in the lists storage means 111, and integrating one or more repeated sections present in a common section relative to the time axis. The integrated repeated section determination means 113 further classifies the determined plurality of integrated repeated sections into multiple types of integrated repeated section rows.

Figure 31:
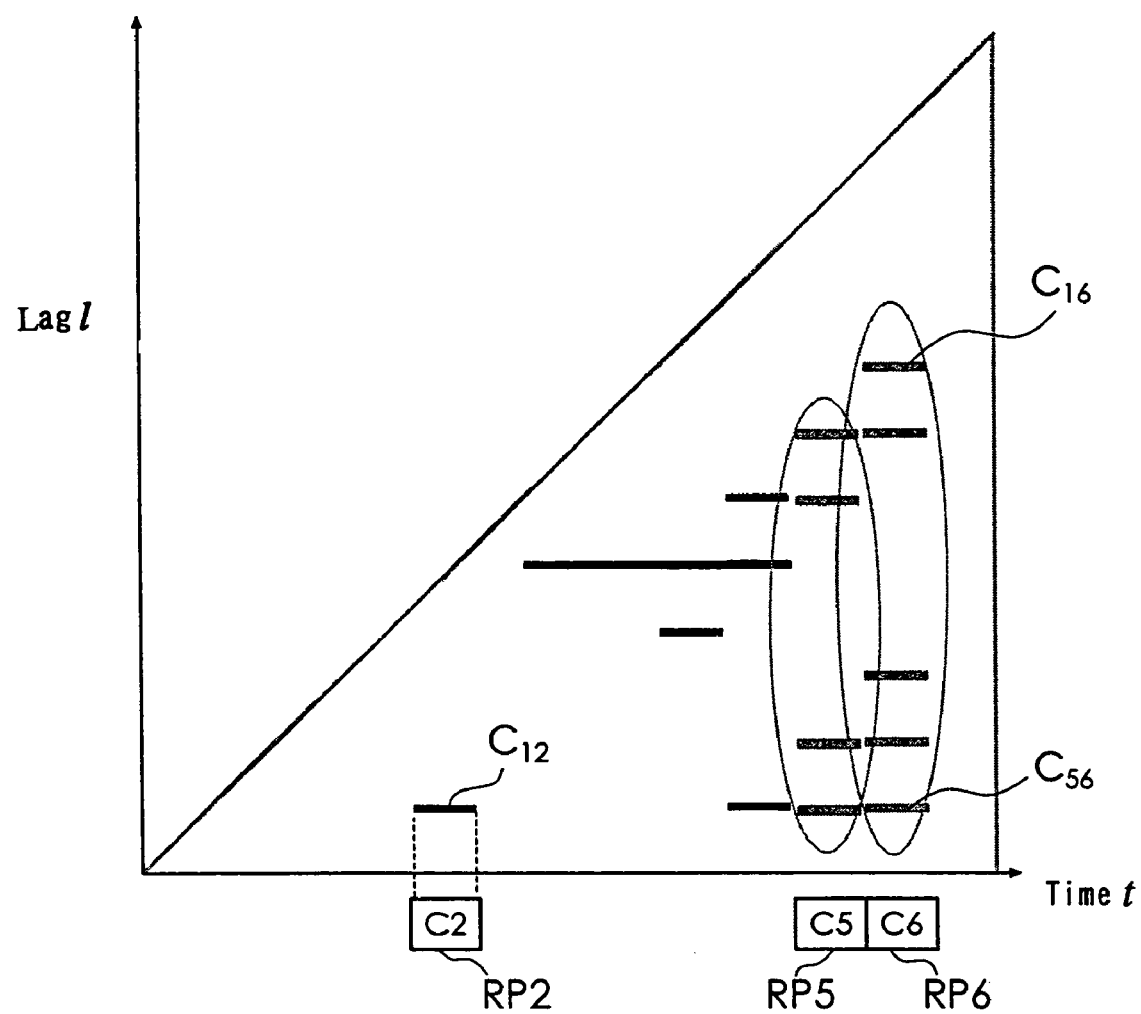
FIG. 31 is a diagram to be used to describe integration of repeated sections.

In the integrated repeated section determination step (ST5 of FIG. 17), as shown in FIG. 31, listed respective similarity line segments present in a common section relative to the time axis in the above-mentioned t-l plane are integrated by grouping to be defined as integrated repeated sections RP. Then, the plurality of the integrated repeated sections RP are classified into multiple types of integrated repeated section rows based on the position and the length of the common section, and the positional relationship, relative to the lag axis, of the similarity line segments to be grouped.

Figure 32:
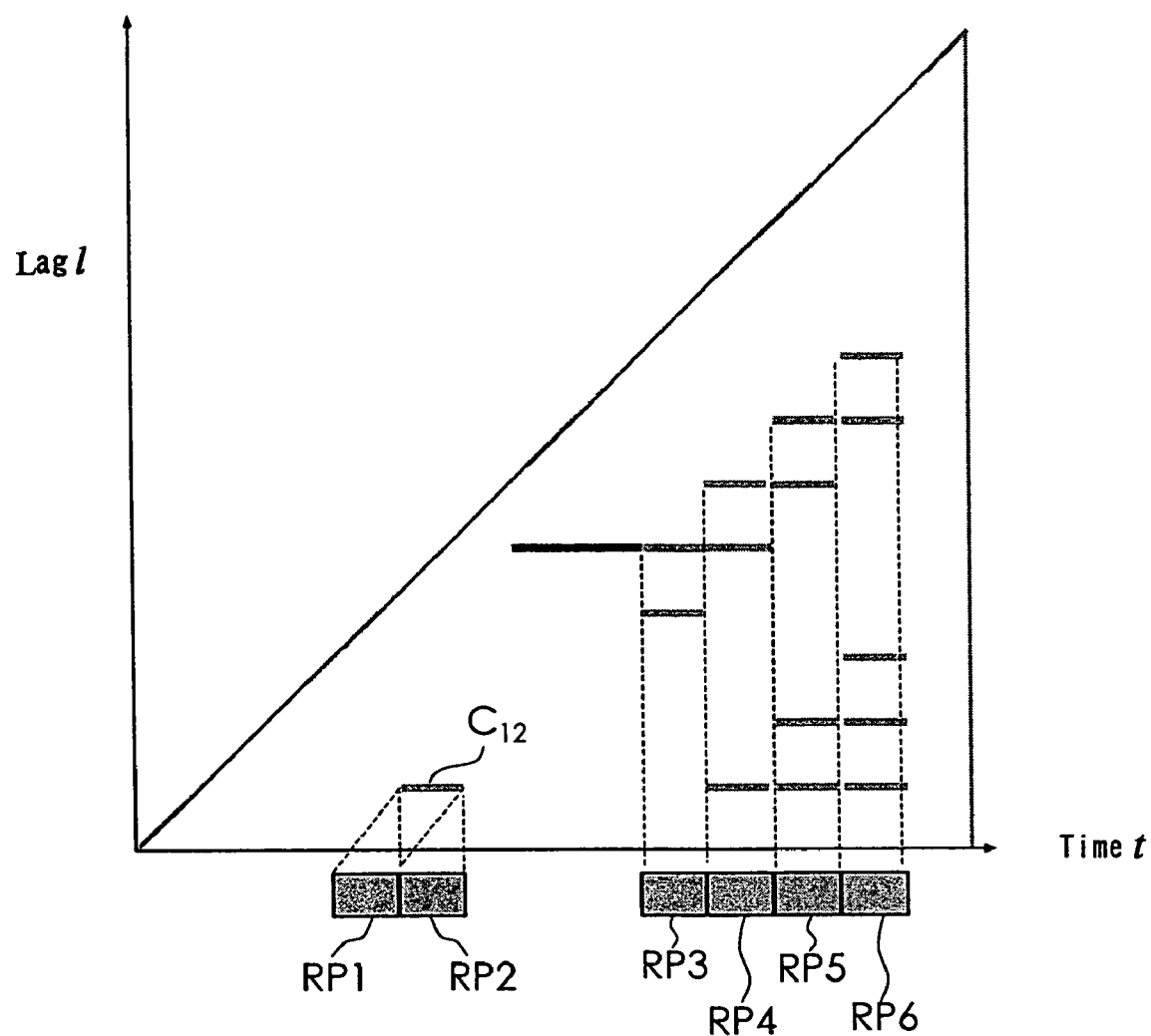
FIG. 32 is a diagram to be used to describe integration of repeated sections.

More specifically, as shown in FIG. 31, the mutual relationship among a plurality of listed repeated sections $C_{12}$ to $C_{56}$ (similarity line segments) is that of whether or not one or more repeated sections $C_{12}$ to $C_{56}$ (similarity line segments) exist on a previous lag position corresponding to a common section relative to the time axis, and that of whether or not repeated sections (similarity line segments) exist in the previous time zone corresponding to the lag position. For instance, the relationship is such; that if there is a similarity line segment $C_{16}$ indicating a repeated section in the common section of C6, there is also the similarity line segment $C_{12}$ at a previous lag position corresponding to the lag position of the repeated section. Based on these relationships, in this step, when there are one or more repeated sections (similarity line segments) at a previous lag position corresponding to a common section, those sections are grouped, and it is determined that there are repeated sections (similarity line segments) in the common section; denoting the repeated sections as integrated repeated sections RP2, RP5, RP6, etc. As shown in FIG. 32, however, there is no similarity line segment in the previous time zone corresponding to the first repeated section which exists inherently. For this reason, the integrated repeated section RP1 corresponding to the first repeated section is complemented based on the first integrated repeated section RP2 and the similarity line segment $C_{12}$ present in the common section thereof. This complementing can be easily implemented through programming. Thus, one type of integrated repeated section row is created.

Figure 33:
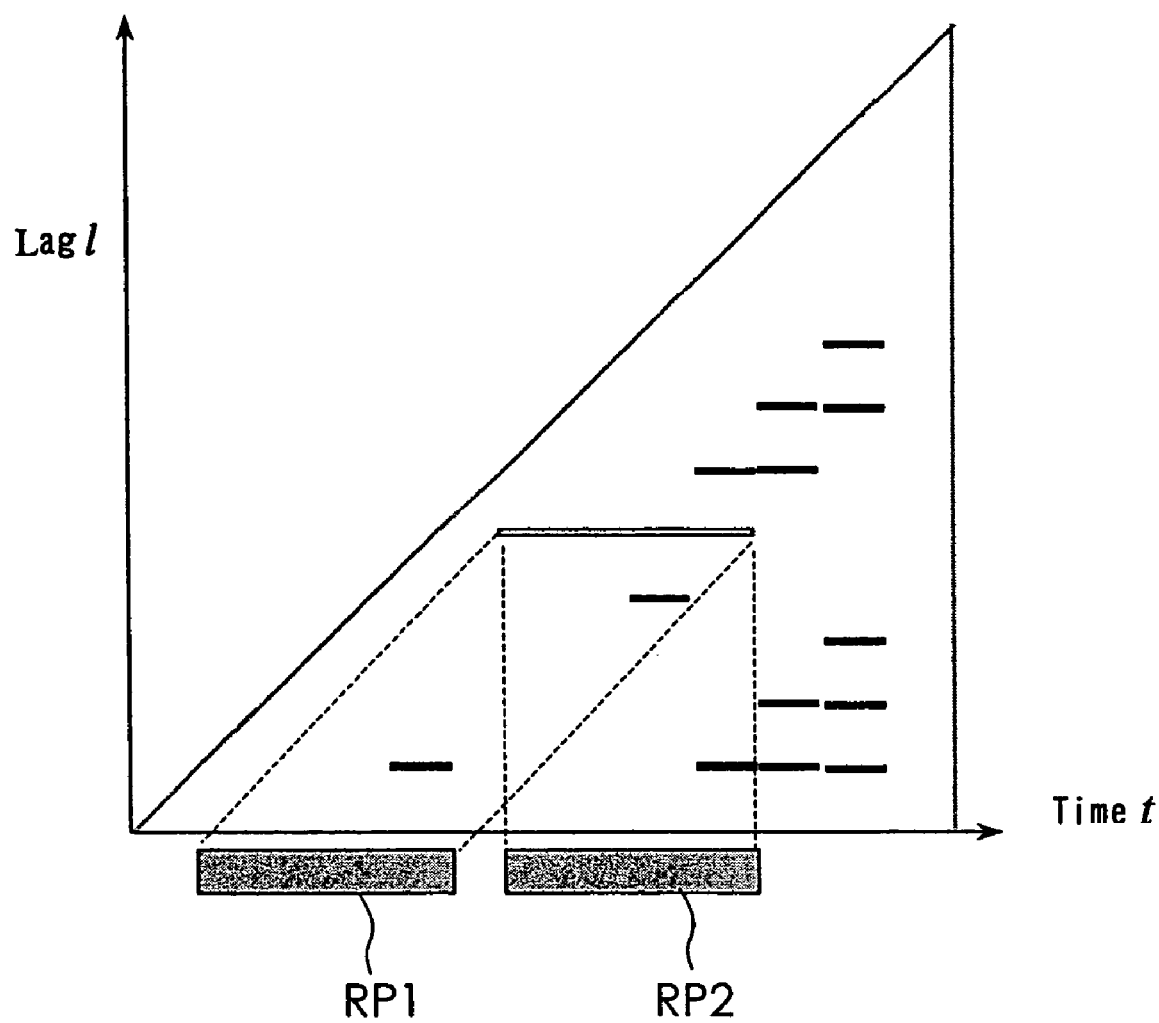
FIG. 33 shows an example of integration of repeated sections.
Figure 34:
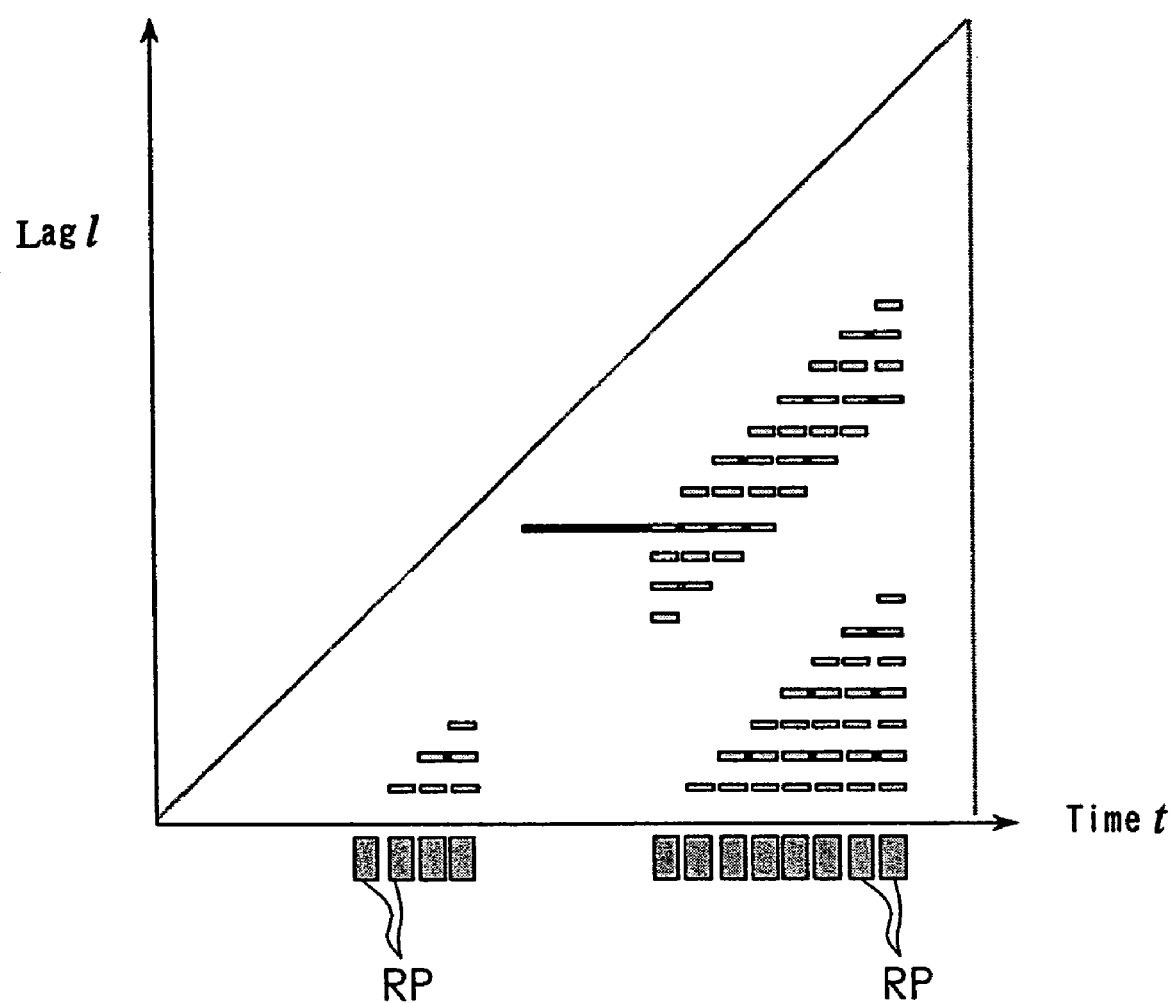
FIG. 34 shows an example of integration of repeated sections.

FIG. 33 shows a state to create the rows of the integrated repeated sections RP1 and RP2 when the length of the common sections is long. FIG. 34 shows a state in which the length of the common section of the integrated repeated section RP is one half (½) of those comprising the integrated repeated section rows of FIGS. 31 and 32, since there are two repetitions in the chorus section as shown in FIG. 27. As such, the integrated repeated section determination step classifies the plurality of determined integrated repeated sections into multiple types of integrated repeated section rows. The classification is made based on the commonality of the length of the common sections, and the positional relationship and the number of repeated sections (similarity line segments) present in the common section.

Figure 35:
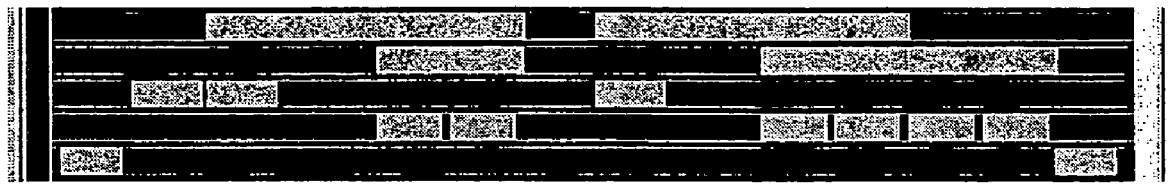
FIG. 35 shows a display example of an integrated repeated section row.

The integrated repeated sections determined by the integrated repeated section determination means 113 are stored in the integrated repeated section storing means 115 as integrated repeated section rows. FIG. 35 shows an example in which the integrated repeated section rows are displayed in a display means 118 shown in FIG. 16.

Now more specific procedure is described for performing the integration process that is performed in the above-mentioned integrated repeated section determination means 113, by using a computer and with higher accuracy. Since each of the above-mentioned similarity line segments only indicates that a certain section has been repeated twice, when the pairs of A and A' and A' and A", for instance, are respectively detected as repeated sections, they should be integrated as a group of repeated sections. Now provided that every such section that is repeated n times (n≧3) is to be detected, n (n−1) /2 similarity line segments will be detected. Then, similarity line segments indicative of the repetition of a same section are grouped and the repeated sections are integrated. Furthermore, detection of any missing similarity line segment or verification on whether the similarity line segments obtained are appropriate shall be performed.

The integration process is implemented with the following procedures:

Procedure 1: Grouping of Similarity Line Segments

Similarity line segments in almost a same section are integrated into one group. Each group $\phi_i=[[Ts_i, Te_i], \gamma_i]$ is expressed by the section $[Tsi, Tei]$ and a set $\gamma_i\{v_{ij}|j=1,2,\ldots M_i\}$ ($M_i$ denotes the number of peaks) of lag values $v_{ij}$ of the similarity line segments (corresponding to a line segment candidate peak if the section is determined). A set of this similarity line segment group $\phi_i$ is defined as $\Phi=\{\phi_i|i=1,2,\ldots N\}$ (N is the number of groups).

Procedure 2: Re-detecting a Line Segment Candidate Peaks

For every group $\phi_i$, a similarity line segment is re-determined based on the similarity $r(t,l)$ in the section $[Ts_i, Te_i]$. This enables to detect any missing similarity line segment. For instance, in FIG. 22, even though the 2 similarity line segments corresponding to the repetition of C have not been obtained on the long similarity line segment corresponding to the repetition of ABCC, it is expected that this process can detect them.

First, a parameter space $R_{[Tsi,Tei]}(l)$ ($0 \leq l \leq Ts_i$) is created with the following expression (10) by restricting within $[Ts_i, Te_i]$.

$$R_{[Ts_i,Te_i]}(l) = \int_{Ts_i}^{Te_i} \frac{r(r, l)}{Te_i - Ts_i} dr \tag{10}$$

Then, similar to the detection of the line segment candidate peak described above, the peak detection is performed using smoothing differentiation ($Ks_{ize}=2.8_{sec}$), and $\gamma_i$ is defined as a set of lag values $v_{ij}$ of the line candidate peaks that exceed the threshold determined by the automatic threshold selection method.

In the automatic threshold selection method, the peak values of $R_{[Tsi, Tei]}(l)$ in the sections of all the groups of $\Phi$ are classified into 2 classes.

Procedure 3: Verification of the Appropriateness of Similarity Line Segments 1

A group $\phi_i$ comprised of line segments irrelevant to a chorus, or a peak which is considered to be irrelevant line segment in $\gamma_i$ is removed.

In a piece of music in which repetitions of similar accompaniments are often used, many line candidate peaks irrelevant to a chorus tend to appear at regular intervals in $R_{[Tsi, Tei]}(l)$.

Thus, the peak detection is performed using smoothing differentiation to $R_{[Tsi, Tei]}(l)$. When the number of high peaks consecutively appearing at regular intervals (intervals are optional) is greater than 10, it is determined that the group is comprised of similarity line segments irrelevant to the chorus, and then the group is removed from $\Phi$.

When the number of low peaks consecutively appearing at regular intervals is greater than 5, it is determined that the line candidate peaks are irrelevant to the chorus. Then, the series of peaks are removed from γi.

Procedure 4: Verification of the Appropriateness of Similarity Line Segments 2

$\gamma_i$ may contain peaks of which the similarities are high only in a part of the section $[Ts_i, Te_i]$. Then, such peak showing substantial fluctuation of similarity is removed. Then, standard deviation of $r_{smooth}(\tau,l)$ in the section concerned is determined, and peaks greater than a threshold are removed from $\gamma_i$. Assuming that line segment candidate peaks corresponding to the similarity line segments determined above are reliable in $\phi_i$, the threshold is determined by multiplying the maximum value of the above standard deviation for the peaks by a constant (1.4 times).

Procedure 5: Consideration of Similarity Line Segment Intervals

In order to ensure that repeated sections may not overlap, intervals of adjacent similarity line segments (line segment candidate peaks) on the lag axis should be greater than the length of the line segment $Te_i-Ts_i$. Therefore, any one of the 2 peaks having an interval shorter than the length of the line segment is removed so that a set of high peaks remains as a whole and all the intervals are greater than the length of the similarity line segment.

Procedure 6: Integration of Groups Having a Common Section

As to each peak in $\gamma_i$, a search is done to find a group of the previous sections with the lag value of $v_{ij}$ only, $[Ts_i-Te_{ij}, Te_i-v_{ij}]$. If any, groups are integrated. In the integration process, the line segment candidate peaks is added into $\gamma_i$, so that all the peaks in the group found are positioned at those positions e corresponding to the lag value. The group itself being found is removed.

Then, a search is also done to fid a group $\gamma_k$ (the group section itself being different) having the identified line segment candidate peak in the section $[Ts_i-v_{ij}, Te_i-v_{ij}]$. If any, it is determined whether or not to integrate it. In this case, if a majority of peaks in $\gamma_k$ are included in $\gamma_i$, the integration process similar to the above is performed. If not, the peaks in $\gamma_i$ and $\gamma_k$ that indicates the same section are compared to remove whichever is lower. If the integration is actually performed in the above, the process of the procedure 5 is re-performed as post processing.

Figure 36:
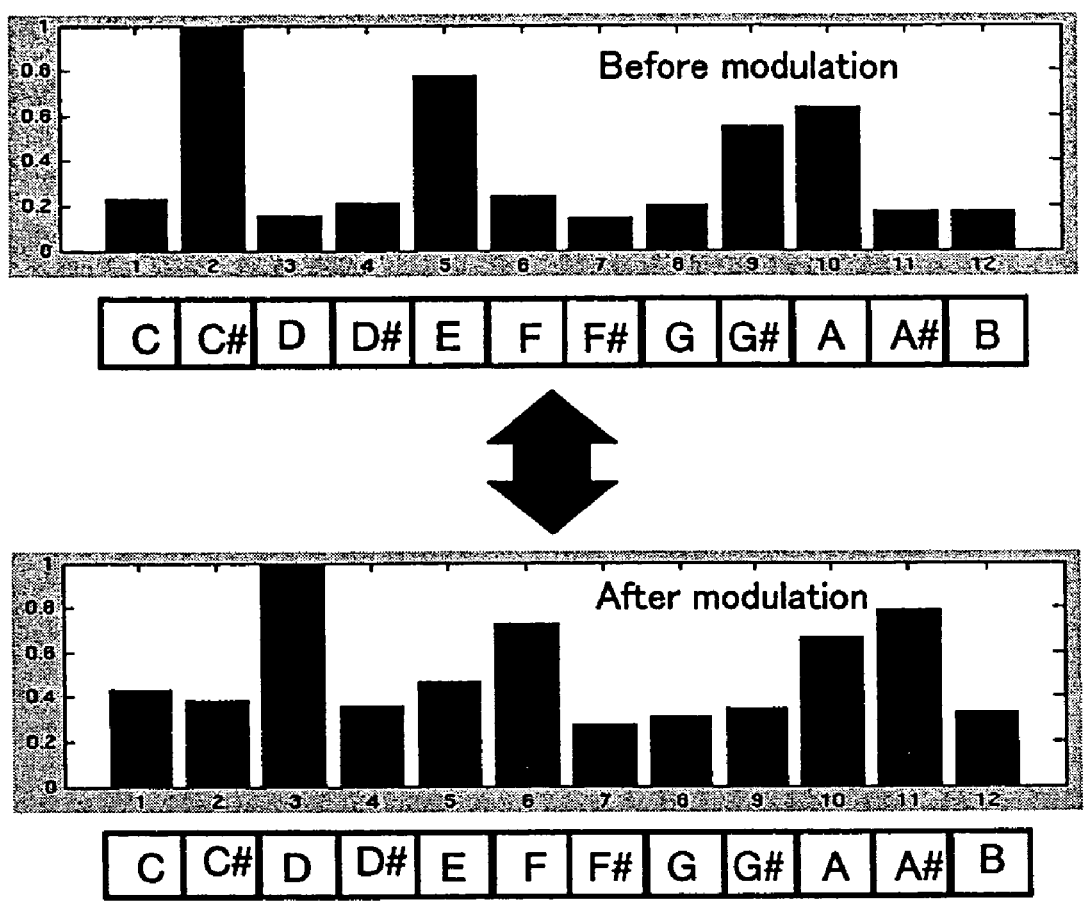
FIG. 36 shows a difference in the 12 dimensional chroma vectors before and after modulation of a certain chorus.
Figure 37:
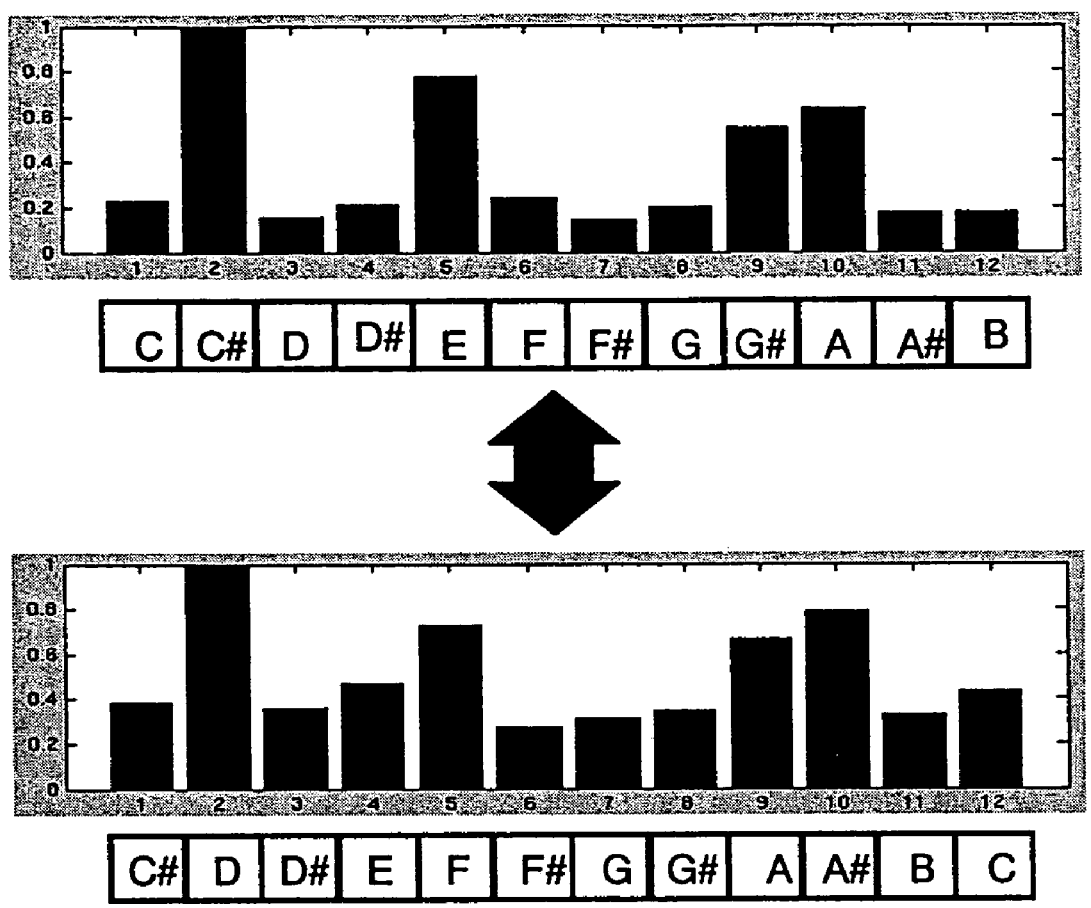
FIG. 37 is a diagram to be used to describe a shifting operation for accomplishing modulation.
Figure 38:
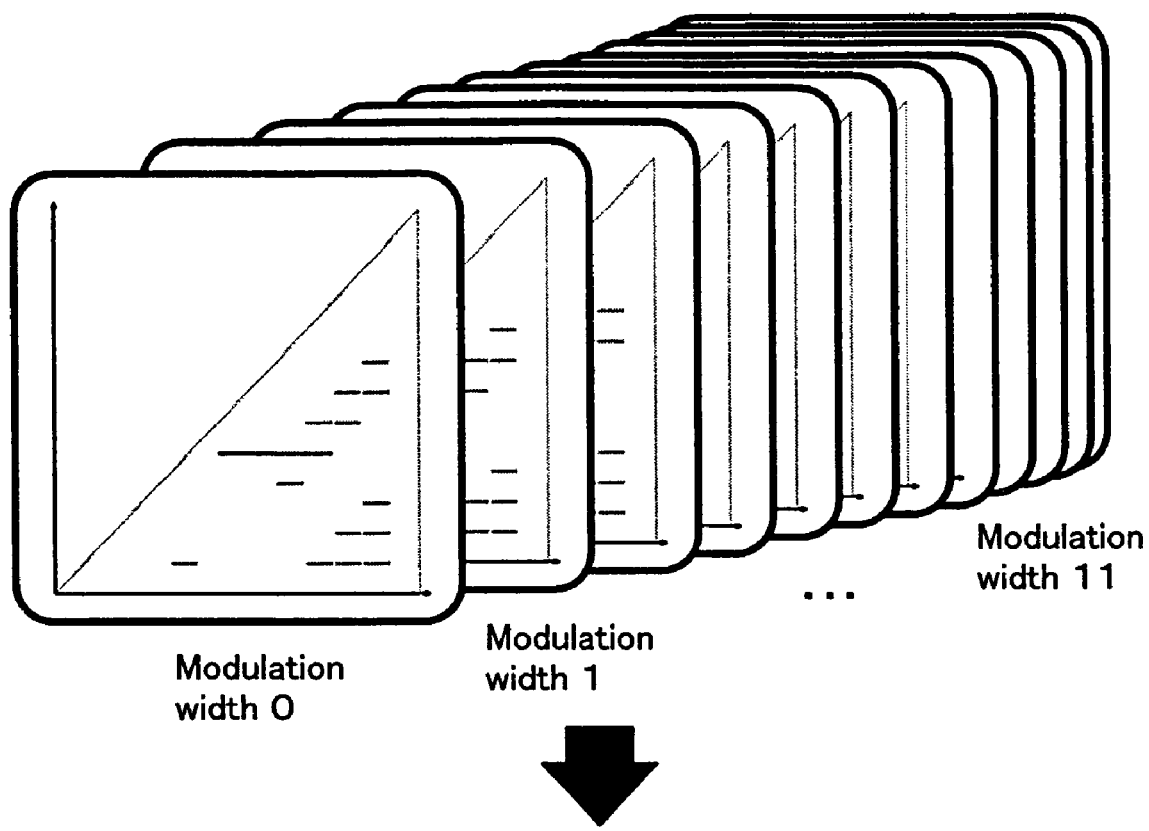
FIG. 38 is a diagram showing the created lists of 12 types for modulation process.

In the following, detection of modulated repetitions (step S4 of FIG. 15) is described. The process described above did not take modulations into consideration. However, the above process can easily be extended to the process that can handle modulations, as described in the following. As shown in FIG. 36, 12-dimensional chroma vectors before modulation differ from those after modulation. Therefore, in the acoustic feature extraction step (step S2 of FIG. 15), as shown in FIG. 37, 12 types of the acoustic features having different modulation widths are obtained by shifting the acoustic features comprising the 12-dimensional chroma vectors, by one modulation width, 11 times. Then, in the similarity calculation step (step S3-1 of FIG. 15), similarities between the acoustic features determined this time and all of the acoustic features of the 12 types previously determined are calculated as the similarities between the 12-dimensional chroma vectors indicative of the acoustic features of this time at time t and the 12-dimensional chroma vectors indicative of all the acoustic features of the 12 types at lag l ($0 \leq l \leq t$) earlier. At the repeated section listing step (step S3-2 of FIG. 15), as shown in FIG. 38, assuming one axis as the time axis t and the other as the lag axis l, the 12 types of the lists for the 12 types of the acoustic features are listed up so that similarity line segments are repeated sections relative to the time axis, wherein each of the similarity line segments have a time length corresponding to a length of a part where the similarity exceed a predetermined threshold during a period of time longer than a predetermined time length. In the integrated repeated section determination step (step S3-3 and S4 of FIG. 15), for each of the 12 types of lists, the listed similarity line segments falling within the common section on the time axis are integrated by grouping into integrated repeated section (S3-3). In addition, the plurality of integrated repeated sections defined for the 12 types of lists are classified into multiple types of integrated repeated section rows with consideration given to the multiple types of modulations, based on the positions and lengths of the common sections on the time axis, and the positional relationships relative to the lag axis among the similarity line segments to be grouped (S4). This enables accurate extraction of acoustic features of modulated parts even when music audio data involves modulations, because similarities are obtained by shifting the acoustic features of the modulated part with the modulation widths of 11 steps.

If a piece of music involves modulations, and is to be processed more specifically by using a computer, the process described above should be performed as described below. The modulations here indicate that the key is shifted up by tr semitones of the equal temperament. $t_r$ shall take 12 kinds of values from 0, 1, ... 11. $t_r$=0 means that no modulation is involved, while $t_r$=10 means modulating up by 10 semitones or modulating down by a whole tone.

The 12-dimensional chroma vector v(t) (wherein v is a vector) can express modulations by shifting a value of each dimension $v_c$(t) by $t_r$ among dimensions. Specifically, denoting the 12-dimensional chroma vector of a certain performance as v(t) (wherein v is a vector) and the 12-dimensional chroma vector of the performance modulated up by tr as v(t)' (wherein v is a vector), it satisfies the following;

$$v(t) \approx S^{tr} v(v)' \qquad (11)$$

However, S is a shift matrix and, as shown in the following equation (12), is defined as the matrix with the twelve-order square matrix shifted to right by one.

$$S = \begin{pmatrix} 0 & 1 & 0 & \ldots & \ldots & 0 \\ 0 & 0 & 1 & 0 & \ldots & 0 \\ \vdots & & \ddots & \ddots & \ddots & \vdots \\ 0 & \ldots & \ldots & 0 & 1 & 0 \\ 0 & \ldots & \ldots & \ldots & 0 & 1 \\ 1 & 0 & \ldots & \ldots & \ldots & 0 \end{pmatrix} \qquad (12)$$

In the following, the procedure for detection of modulated repetitions is described. First, using this feature of the chroma vectors, redefine the 12 types of similarity $r_{tr}$(t, l) corresponding to each $t_r$ as shown in the following expression (13).

$$r_{tr}(t, l) = 1 - \frac{\left| \frac{S^{tr}\vec{v}(t)}{\max_c v_c(t)} - \frac{\vec{v}(t-l)}{\max_c v_c(t-l)} \right|}{\sqrt{12}} \qquad (13)$$

Then, for respective similarities $r_{tr}$(t,l), repeated sections as described above are listed up. However, the automatic threshold selection method is applied only when $t_r$=0. A threshold defined when $t_r$=0 is used for other $t_r$'s. This should prevent erroneous detection of similarity line segments in a piece of music without modulation when $t_r$ is not equal to 0. Then, the integration process described above is performed for the similarities and similarity line segments for each $t_r$ thus obtained. As a result, a set $\phi_{tr}$ of groups of line segments $\phi_{tr,i}$ is obtained separately for every $t_r$. Then, the integration process of the groups having common sections as described above is performed across $t_r$'s (searching for groups having common sections for different $t_r$'s), so as to integrate repeated sections including modulated sections as one group. However, although in the process described above it is said that "if a majority of peaks in $\gamma_k$ are included in $\gamma_l$, the integration process which is the same as the above is performed", the integration process is always performed without exception.

In the following, groups obtained from different tr's are also denoted by $\Phi = \{\phi_i\}$. In order to be able to know later which are the modulated sections, the information concerning which tr the integration was performed from is saved.

Returning to FIG. 16, in the chorus section determination means 117, chorus sections are determined from the integrated repeated section rows stored in the integrated repeated sections storing means 115. In addition, in the example of FIG. 16, the integrated repeated section rows including the chorus sections or the multiple types of integrated repeated section rows are displayed on the display means 118 (Refer to FIG. 41). Then, the integrated repeated section rows including the chorus sections are displayed in a mode different from other integrated repeated section rows. This can display the detected chorus sections distinctively from other repeated sections. In this example, the integrated repeated section rows can be selected by means of a selection means 121 while they are displayed on the display means 118, and the integrated repeated section rows including the chorus sections or the other integrated repeated section rows can be selectively played back with an audio playback means 123.

In the chorus section determination step (S5, ST6) in FIGS. 15 and 17, for instance, the chorus possibility of the integrated repeated sections included in the integrated repeated section rows is determined, based on a mean of the similarities of the integrated repeated sections contained in the integrated repeated section rows, and the number and the length of the integrated repeated sections. And the integrated repeated section included in the integrated repeated section rows having the highest chorus possibility is to be selected as a chorus section. The integrated repeated sections that satisfy the above Assumption 1 to Assumption 3 first described with reference to FIGS. 39 and 40 have high chorus possibility, in general.

Taking the above assumptions into consideration, a method of automatically selecting a chorus section by using a computer is described as follows. From the set groups $\Phi$ of line segments mentioned above, one group is selected as a chorus section. To this end, the chorus possibility $v_i$ of each group $\phi_i$ is evaluated based on the average similarity of the similarity line segments or on the assumptions mentioned above, and a group having the highest chorus possibility $v_i$ is judged as a chorus section. As a preparation for this, the similarity line segment (line segment candidate peak $v_{ij}$) is developed into the 2 sections which it indicates, and a set of the pairs of all the repeated sections [$Ps_{ij}$, $Pe_{ij}$] and their reliability $\lambda_{ij}$ is determined with the following expression (14):

$$\Lambda_i = \{[[Ps_{ij}, Pe_{ij}], \lambda_{ij}] | j=1,2,3,\ldots,M_i+1\} \qquad (14)$$

wherein [$Ps_{ij}$, $Pe_{ij}$]=[$Ts_i - v_{ij}$, $Te_i - v_{ij}$], and the reliability $\lambda_{ij}$ shall be a mean of the similarities $r_{tr}$ (t,l) corresponding to the similarity line segments. However, when j=$M_i$+1, it shall be as shown by the following expression (15):

$$[Ps_{ij}, Pe_{ij}] = [Ts_i, Te_i], \lambda_{ij} = \max_{k=1}^{M_i} \lambda_{ik} \qquad (15)$$

The chorus possibility $v_i$ is evaluated with the following procedures:

(1) Increase Reliability of an Integrated Repeated Section that Satisfies Assumption 2.

For a group (integrated repeated section row) $\phi_h$ having an adequately long integrated repeated section (50 sec or longer) corresponding to verse A to chorus mentioned in Assumption 2, a search is done to find if there is a section in other groups (other integrated repeated section rows) that has an endpoint $Pe_{ij}$ which is almost equal to the endpoint $Pe_{hk}$ of that section. If any, it is considered that the integrated repeated section found is most likely to be a chorus. Then, the reliability $\lambda_{ij}$ thereof is doubled.

(2) Increase the Reliability of an Integrated Repeated Section that Satisfies Assumption 3

For the integrated repeated section $[Ps_{ij}, Pe_{ij}]$ within a range of an appropriate section length as a chorus (Assumption 1), it is examined whether or not there is a short integrated repeated section, the length of which is almost half of that section, in each of the earlier half and the latter half. If any, half of a mean of the reliabilities of the 2 sections is added to the reliability of the original section $\lambda_{ij}$.

(3) Calculate Chorus Possibility

Based on the reliability obtained above, chorus possibility is calculated with the following expression (16).

$$v_i = \left(\sum_{j=1}^{M_i+1} \lambda_{ij}\right) \log \frac{Te_i - Ts_i}{D_{len}} \quad (16)$$

In the above expression (16), the term of $\Sigma$ means that the greater the number of integrated repeated sections included in the group (integrated repeated section row) $\phi_i$ is, or the higher the reliability thereof is, the higher the chorus possibility is. The term of log means that the longer the length of the integrated repeated section included in the group (integrated repeated section row) is, the higher the chorus possibility is. The constant $D_{len}$ is set to 1.4 sec from the result of preliminary experiments.

Lastly, in the group having the range of section length appropriate for a chorus (Assumption 1), sections $[Ps_{mj}, Pe_{mj}]$ in a set $\Lambda m$ determined with the following expression (17) shall be a chorus section.

$$m = \underset{i}{\mathrm{argmax}}_{v_i} \quad (17)$$

Now, as post processing, the minimum interval between adjacent $Ps_{mj}$ is determined, and a length of each section is widened by moving $Pe_{mj}$ so that the section length will have the minimum interval in order to fill the gaps. This is performed because, although chorus sections are originally sequential, and thus there are no gaps therebetween, the obtained repeated sections may sometimes bring in gaps. If a gap to be filled is too large (12 sec or longer and wider than half of the section length), however, it is not filled.

As shown in FIG. 17, when a chorus section is determined as described as above (step ST6), the result is displayed real time in the display means 118 of FIG. 16 (step ST7). Then, the above process is repeated till it covers all of the music audio data (step ST8).

Figure 41:
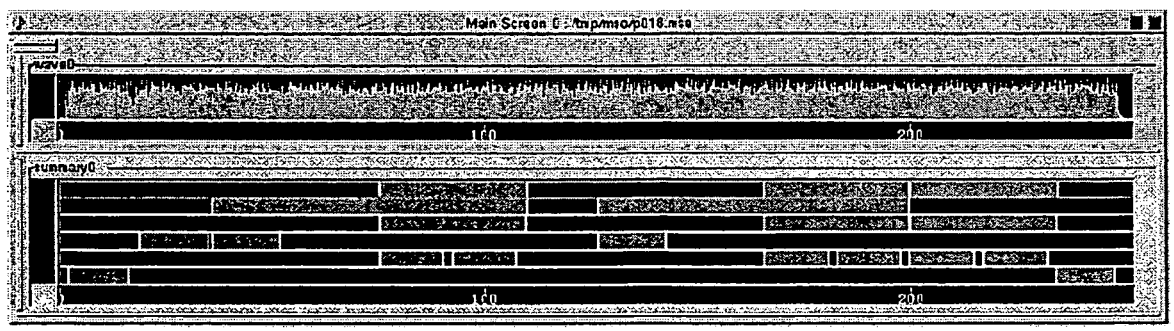
FIG. 41 shows the result of correct chorus detection at completion of the music of RWC-MB-P-2001, No.18.

Then, an actual chorus section detection apparatus of the above embodiment and the result of experiments using the apparatus are described. In the experiments, music audio signals were input as music audio data. And a list of detected chorus sections was output on real-time bases. The apparatus momentarily obtains a listing (list) of the sections considered to be chorus sections in the past audio signals, and keeps on outputting them together with the repetition structures (list of repeated sections $\Lambda_i$) obtained as an intermediate result. FIG. 41 shows a visualized example of the output. In FIG. 41, the horizontal axis is the time axis (sec) showing an entire piece of music, and the upper half represents power variations, the top column of the lower half represents a list of integrated repeated section rows including chorus sections (the last chorus involves modulation), while the lower five columns represent the repetition structure of other integrated repeated section rows.

As an evaluation experiment, detection capability of this apparatus was examined for 100 pieces of music (RWC-MDB-P-2001, No. 1 to No. 100) of the popular-music database "RWC Music database: Popular Music" (Masataka Goto, Hiroki Hashiguchi, Takuichi Nishimura, and Ryuichi Oka, RWC Music Database for studies; Popular Music Database and Copyright-Expired Music Database, The special Interest Groun Note of IPSJ, Music Information Science, 2001-MUS-42-6, 35–42 (2001)). When a whole piece of music has been entered, what are detected as chorus sections are evaluated. In addition, to provide a reference for judging whether detection results are right or wrong, correct chorus sections have to be labeled manually. To enable this task, a music structure labeling editor was developed, which can divide up the piece of music, and label each section as a chorus, verse A, verse B, interlude, etc. In the labeling, the relative width of key shift (by how many semitones the key is shifted up with respect to the key at the start of the music) is also taken into consideration to determine correct chorus sections.

Based on thus created reference of the correct chorus sections, the degree of matching between the detected and the correct chorus sections was evaluated in terms of the recall rate, the precision rate, and the F-measure, which is the harmonic mean thereof van Rijsbergen, C. J., Information Retrieval, Butterworths, second edition (1979)). The definition is shown below:

Recall rate ($R$)=total length of correctly detected chorus sections/total length of correct chorus sections Precision rate ($P$)=total length of correctly detected chorus sections/total length of detected chorus section $F$-measure=$(\beta^2+1)PR/(\beta^2 P+R)$ (using $\beta=1$)

If modulation (key change) was involved, a chorus section was judged correctly detected, only if the relative width of key shift matched the actual width. And, the output for a piece of music was judged to be correct (correctly answered) if its F-measure is more than 0.75.

As the results of the evaluation, table 1 lists the number of pieces of music in which chorus sections were detected correctly.

TABLE 1

| | Condition (Use: o, Not Use: x) | | | |
|---|---|---|---|---|
| Detection of modulated sections | o | x | o | x |
| Use of Assumptions 2 and 3 | o | o | x | x |

TABLE 1-continued

| | Condition (Use: o, Not Use: x) | | | |
|---|---|---|---|---|
| The number of pieces of music in which chorus sections were correctly detected | 80 | 74 | 72 | 68 |

The result of the evaluation of this apparatus was 80 pieces of music, as shown in the left column (with the average F-measure of those 80 pieces of music being 0.938). The main reasons that the method made mistakes were; the choruses that did not repeat more times than other sections, and the repetition of similar accompaniments throughout most of the piece of music. Among these 100 pieces of music, 10 pieces of music had modulated choruses, and 9 pieces of music out of these could be detected correctly. When the detection of modulated repetitions described above was ceased, the capability was degraded, as shown in the second column from left. When increasing the reliability based on Assumptions 2 and 3 was ceased, the capability deteriorated further, as shown in the right 2 columns. Twenty-two pieces of music had choruses exhibiting significant changes in accompaniment or melody on repetition, and 21 of these were detected; the repeated chorus section itself was correctly detected in 16 of them.

Basically, the present invention detects as a chorus, sections that are repeated most frequently in a piece of music. Also by examining various repeated sections, while integrating information on an entire piece of music, this invention has enabled acquisition of a list of beginning and end positions of all chorus sections, which was not implemented in the past. In addition, by introducing similarity between chroma vectors, a repeated section can be judged as such even after modulation; which has enabled detection of modulated chorus sections. As a result of the evaluation using 100 pieces of music of RWC Music database (RWC-MDB-P-2001), 80 pieces were returned correct. It was thus confirmed that the present invention can detect chorus sections in real-world audio signals.

Furthermore, the present invention is also related to music summarization (Keiji Hirata, Shu Matsuda, Papipoon: GTTM-based Music Summarization System, The special Interest Group Note of IPSJ, Music Information Science, 2002-MUS-46-5, 29–36 (2002)), and the apparatus of the present invention can be regarded as a method of summarizing a piece of music which presents chorus sections as the result of the summarization. In addition, when a summary of a section longer than a chorus section is needed, the use of repetition structures, which have been acquired as the intermediate results, enables to present a summary reducing the redundancy of an entire piece of music. For instance, when a repetition of (verse A→ verse B→ chorus) is captured as the intermediate result, it can be presented.

Although in this experiment, the evaluation was performed using popular music, the present invention is possibly applied to other music genres. When it was actually applied to a few pieces of classic music, the part presenting the most representative theme of the music was able to be determined.

The present invention shall not be limited to the above embodiments. Based on the purpose of the invention, various modifications may be made, and these should not be removed from the scope of the invention. For instance, as acoustic features, frequency spectrum, MFCC (Mel-Frequency Cepstrum Coefficient), etc., may be used, in addition to the chroma vectors. It is also possible to add the derivatives thereof as acoustic features. In addition, the following three may be also regarded as similarity between acoustic features.

$$\tau(t, l) = 1 - \frac{\left| \frac{\vec{v}(t)}{\sum_c v_c(t)} - \frac{\vec{v}(t-l)}{\sum_c v_c(t-l)} \right|}{\sqrt{2}}$$

$$\tau(t, l) = 1 - \frac{\left| \frac{\vec{v}(t)}{|\vec{v}(t)|} - \frac{\vec{v}(t-l)}{|\vec{v}(t-l)|} \right|}{\sqrt{2}}$$

$$\tau(t, l) = \frac{\vec{v}(t) \cdot \vec{v}(t-l)}{|\vec{v}(t)||\vec{v}(t-l)|}$$

The present invention is also applicable when input is not an audio signal but MIDI signal. In such a case, a MIDI signal or MIDI signal features should replace the acoustic features, and, as similarity, the similarity based on the distance between the MIDI signals or the MIDI signal features may be used. It is needless to say that a 12-dimensional chroma vector may be used as the MIDI signal features. In such a case, an optional method of determining the 12-dimensional chroma vector from the MIDI signal may be used. For instance, octave information on the message of MIDI note ON/OFF can be erased to determine the 12-dimensional chroma vector.

Thus, as have been described in details, the embodiments of the present invention can not only detect chorus sections from complicated mixed sound due to music CD (compact discs), etc., in the real world, and obtain a list of the beginning and end positions of respective chorus sections, but also it can detect modulated chorus sections. Based on various repetition structures (a plurality of integrated repeated section area) contained in an entire piece of music, chorus sections are detected. In addition, since the chorus sections are detected based on the various repetition structures contained in the entire music, as the intermediate results thereof, a list of the repetition structures can also be obtained.

INDUSTRIAL APPLICABILITY

According to the present invention, the advantage can be obtained wherein characteristic music structure sections such as chorus sections etc. can be easily played back by using amusic audio data playback apparatus, through selection by an interface.

Use of the present invention provides a music listening station with the "chorus-detection" function (chorus section selection button). Simply by pressing the chorus section selection button, a trial listener can jump playback to the beginning of the chorus section (fast-forward in an instant), and is relieved from troublesome task of finding a chorus section by himself/herself. In addition, by estimating or preparing in advance repeated sections other than the chorus sections in a piece of music, the trial listener can have the benefit of jumping playback to the beginning of a next repeated section of the music structure.

According to the present invention, chorus sections appearing in a piece of music can be detected exhaustively. Also, according to the present invention, where one chorus section begins and ends, can be detected. Furthermore, according to the present invention, a modulated chorus section can be detected. In addition, according to the present invention, other repeated sections as well as chorus sections can be played back and also displayed on a display means, respectively.

The invention claimed is:

1. A music playback method for playing back music audio data by using a music audio data playback apparatus for playing back the music audio data, comprising:
   a first step of preparing in advance a plurality of characteristic music structure section specifying data for specifying characteristic music structure sections in a piece of music in respect of the music audio data to be played back;
   a second step of providing an interface for selecting an arbitrary characteristic music structure section from the plurality of characteristic music structure sections; and
   a third step of changing a playback position of the music audio data to be played back by the music audio data playback apparatus to the arbitrary characteristic music structure section, based on the characteristic music structure section specifying data corresponding to the arbitrary characteristic music structure section that an operator has selected by using the interface after starting playback of the music audio data by using the music audio data playback apparatus,
   wherein at the first step, the plurality of characteristic music structure sections are identified based on statistical data on playback behaviors of a plurality of trial listeners who have played back the music audio data to be played back, and the plurality of characteristic music structure section specifying data for specifying the plurality of characteristic music structure sections which have been identified are created.

2. The music playback method according to claim 1, wherein the characteristic music structure section is a chorus section in the piece of music.

3. The music playback method according to claim 1, wherein the characteristic music structure section includes repeated sections in the piece of music.

4. A music playback method for playing back an arbitrary characteristic music structure section selected from a plurality of characteristic music structure sections in a piece of music by using a music audio data playback apparatus for playing back music audio data, comprising:
   a first step of preparing in advance a plurality of characteristic music structure section specifying data for specifying the plurality of characteristic music structure sections in respect of the music audio data to be played back;
   a second step of providing an interface for selecting an arbitrary characteristic music structure section from the plurality of characteristic music structure sections; and
   a third step of causing the music audio data playback apparatus to play back the arbitrary characteristic music structure section, based on the characteristic music structure section specifying data corresponding to the arbitrary characteristic music structure section which an operator has selected by using the interface,
   wherein at the first step, the plurality of characteristic music structure sections are identified based on statistical data on playback behaviors of a plurality of trial listeners who have played back the music audio data to be played back, and the plurality of characteristic music structure section specifying data for specifying the plurality of characteristic music structure sections which have been identified are created.

5. The music playback method according to claim 4, wherein the characteristic music structure section is a chorus section in the piece of music.

6. The music playback method according to claim 4, wherein the characteristic music structure section includes repeated sections in the piece of music.

7. A music playback method for playing back music audio data by using a music audio data playback apparatus for playing back the music audio data, comprising:
   a first step of preparing in advance a plurality of characteristic music structure section specifying data for specifying characteristic music structure sections in a piece of music in respect of the music audio data to be played back;
   a second step of providing an interface for selecting an arbitrary characteristic music structure section from the plurality of characteristic music structure sections; and
   a third step of changing a playback position of the music audio data to be played back by the music audio data playback apparatus to the arbitrary characteristic music structure section, based on the characteristic music structure section specifying data corresponding to the arbitrary characteristic music structure section that an operator has selected by using the interface after starting playback of the music audio data by using the music audio data playback apparatus,
   wherein the interface provided at the second step has a graphic display portion for graphically displaying a length of the music audio data along a time axis, and also graphically displaying, along the time axis, a playback position of the music audio data which is being played back by the music audio data playback apparatus and the plurality of characteristic music structure sections, and
   wherein the plurality of characteristic music structure sections include a plurality of chorus sections indicative of chorus parts of a piece of music, and a plurality of repeated sections indicative of repeated parts of the music except for the chorus sections, and the plurality of chorus sections and the plurality of repeated sections are distinctively displayed on the graphic display portion.

8. The music playback method according to claim 7, wherein the interface has one or more selection buttons to be manipulated by an operator for selecting an arbitrary characteristic music structure section from the plurality of characteristic music structure sections.

9. The music playback method according to claim 8, wherein the one ore more selection buttons include one or more chorus section selection buttons for selecting only the chorus sections from the plurality of characteristic music structure sections.

10. The music playback method according to claim 9, wherein the one or more chorus section selection buttons include a first chorus section selection button for selecting a previous chorus section, and a second chorus section selection button for selecting a next chorus section.

11. The music playback method according to claim 8, wherein the one or more selection buttons include a first repeated section selection button for selecting a previous repeated section when selecting the plurality of repeated sections and a second repeated section selection button for selecting a next repeated section when selecting the plurality of repeated sections.

12. The music playback method according to claim 7, wherein
the interface has one or more selection buttons to be manipulated by an operator for selecting an arbitrary characteristic music structure section from the plurality of characteristic music structure sections; and
the one or more selection buttons are graphic display buttons shown on the graphic display portion.

13. The music playback method according to claim 12, wherein
the plurality of chorus sections and the plurality of repeated sections are distinctively displayed on the graphic display portion; and
the plurality of chorus sections and the plurality of repeated sections displayed on the graphic display portion are represented as one or more selection buttons to be manipulated by an operator for selecting an arbitrary characteristic music structure section from the plurality of characteristic music structure sections.

14. A music playback method for playing back an arbitrary characteristic music structure section selected from a plurality of characteristic music structure sections in a piece of music by using a music audio data playback apparatus for playing back music audio data, comprising:
a first step of preparing in advance a plurality of characteristic music structure section specifying data for specifying the plurality of characteristic music structure sections in respect of the music audio data to be played back;
a second step of providing an interface for selecting an arbitrary characteristic music structure section from the plurality of characteristic music structure sections; and
a third step of causing the music audio data playback apparatus to play back the arbitrary characteristic music structure section, based on the characteristic music structure section specifying data corresponding to the arbitrary characteristic music structure section which an operator has selected by using the interface,
wherein the interface provided at the second step has a graphic display portion for graphically displaying a length of the music audio data along a time axis, and also graphically displaying, along the time axis, a playback position of the music audio data which is being played back by the music audio data playback apparatus and the plurality of characteristic music structure sections, and
wherein the plurality of characteristic music structure sections include a plurality of chorus sections indicative of chorus parts of a piece of music, and a plurality of repeated sections indicative of repeated parts of the music except for the chorus sections, and the plurality of chorus sections and the plurality of repeated sections are distinctively displayed on the graphic display portion.

15. The music playback method according to claim 14, wherein the interface has one or more selection buttons to be manipulated by an operator for selecting an arbitrary characteristic music structure section from the plurality of characteristic music structure sections.

16. The music playback method according to claim 15, wherein the one ore more selection buttons include one or more chorus section selection buttons for selecting only the chorus sections from the plurality of characteristic music structure sections.

17. The music playback method according to claim 16, wherein the one or more chorus section selection buttons include a first chorus section selection button for selecting a previous chorus section, and a second chorus section selection button for selecting a next chorus section.

18. The music playback method according to claim 15, wherein the one or more selection buttons include a first repeated section selection button for selecting a previous repeated section when selecting the plurality of repeated sections and a second repeated section selection button for selecting a next repeated section when selecting the plurality of repeated sections.

19. The music playback method according to claim 14, wherein
the interface has one or more selection buttons to be manipulated by an operator for selecting an arbitrary characteristic music structure section from the plurality of characteristic music structure sections; and
the one or more selection buttons are graphic display buttons shown on the graphic display portion.

20. The music playback method according to claim 19, wherein
the plurality of chorus sections and the plurality of repeated sections are distinctively displayed on the graphic display portion; and
the plurality of chorus sections and the plurality of repeated sections displayed on the graphic display portion are represented as one or more selection buttons to be manipulated by an operator for selecting an arbitrary characteristic music structure section from the plurality of characteristic music structure sections.

21. A music playback system, which has a music audio data playback apparatus for playing back music audio data and a function of playing back an arbitrary characteristic music structure section selected from a plurality of characteristic music structure sections in a piece of music, comprising:
an interface having a function of selecting an arbitrary characteristic music structure section from the plurality of characteristic music structure sections;
a characteristic music structure section specifying data storage means for storing characteristic music structure section specifying data for specifying the plurality of characteristic music structure sections that have been predetermined corresponding to the music audio data to be played back; and
a specifying data providing means for providing the music audio data playback apparatus with the characteristic music structure section specifying data for specifying the arbitrary characteristic music structure section selected by the interface,
wherein the music audio data playback apparatus is so constructed as to change a playback position to the characteristic music structure section specified by the characteristic music structure section specifying data which has been provided by the specifying data providing means,
wherein the interface has a graphic display portion for graphically displaying a length of the music audio data along a time axis, and also graphically displaying, along the time axis, a playback position of the music audio data which is being played back by the music audio data playback apparatus and the plurality of characteristic music structure sections, and
wherein the plurality of characteristic music structure sections include a plurality of chorus sections indicative of chorus parts of a piece of music, and a plurality of repeated sections indicative of repeated parts of the music except for the chorus sections; and the graphic display portion has a function of distinctively displaying the plurality of chorus sections and the plurality of repeated sections.

22. The music playback system according to claim 21, wherein the music audio data is accompanied by the characteristic music structure section specifying data, and the characteristic music structure section specifying data storage means reads and stores the characteristic music structure section specifying data accompanying the music audio data.

23. The music playback system according to claim 21 further comprising a characteristic section specifying data generation means for automatically extracting from the music audio data the plurality of characteristic music structure sections in the music and generating the characteristic music structure section specifying data.

24. The music playback system according to claim 21, wherein the interface has one or more selection buttons to be manipulated by an operator for selecting an arbitrary characteristic music structure section from the plurality of characteristic music structure sections.

25. The music playback system according to claim 24, wherein the one or more selection buttons include one or more chorus section selection buttons for selecting only the chorus sections from the plurality of characteristic music structure sections.

26. The music playback system according to claim 24, wherein the one or more selection buttons include a first chorus section selection button for selecting a previous chorus section and a second chorus section selection button for selecting a next chorus section.

27. The music playback system according to claim 24, wherein the one or more selection buttons include a first repeated section selection button for selecting a previous repeated section when selecting the plurality of repeated sections and a second repeated section selection button for selecting a next repeated section when selecting the plurality of repeated sections.

28. The music playback system according to claim 24, wherein the one or more selection buttons are graphic display buttons shown on the graphic display portion.

29. The music playback system according to claim 28, wherein
the plurality of chorus sections and the plurality of repeated sections are distinctively displayed on the graphic display portion; and
the graphic display portion is so constructed as to represent the plurality of chorus sections and the plurality of repeated sections displayed on the graphic display portion as the one or more selection buttons to be manipulated by an operator for selecting an arbitrary characteristic music structure section from the plurality of characteristic music structure sections.

30. An interface, used for selecting an arbitrary characteristic music structure section and transmitting a selection result when playing back the arbitrary characteristic music structure section selected from a plurality of characteristic music structure sections in a piece of music using a music audio data playback apparatus for playing back music audio data, comprising one or more selection buttons including a chorus section selection button to be manipulated by an operator for selecting the chorus section included in the plurality of characteristic music structure sections,
the interface further comprising a graphic display portion for graphically displaying a length of the music audio data along a time axis, and also graphically displaying, along the time axis, a playback position of the music audio data which is being played back by the music audio data playback apparatus and the plurality of characteristic music structure sections,
wherein the plurality of characteristic music structure sections include a plurality of chorus sections indicative of chorus parts of a piece of music and a plurality of repeated sections indicative of repeated sections of the music except for the chorus sections;
wherein the plurality of chorus sections and the plurality of repeated sections are distinctively displayed on the graphic display portion; and
wherein the plurality of chorus sections and the plurality of repeated sections displayed on the graphic display portion are represented as the one or more selection buttons to be manipulated by an operator for selecting an arbitrary characteristic music structure section from the plurality of characteristic music structure sections.

31. A computer-readable medium including a program for implementing a music playback system, intended for causing a computer to perform a function of playing back an arbitrary characteristic music structure section selected from a plurality of characteristic music structure sections in a piece of music by using a system including the computer, a display to be operated based on a command from the computer, and a music audio data playback apparatus for playing back music audio data according to a command from the computer,
the program being constructed to cause the computer to perform:
a function of constructing on the display an interface for selecting an arbitrary characteristic music structure section from the plurality of characteristic music structure sections;
a function of constructing a characteristic music structure section specifying data storage means for storing characteristic music structure section specifying data for specifying the plurality of characteristic music structure sections which have been predetermined corresponding to the music audio data to be played back;
a function of constructing a specifying data providing means for providing the music audio playback apparatus with the characteristic music structure section specifying data for specifying the arbitrary characteristic music structure section selected by the interface; and
a function of giving the music audio data playback apparatus a command to play back the characteristic music structure section specified by the characteristic music structure section specifying data which has been provided by the specifying data providing means,
wherein the function of constructing the interface on the display is capable of forming on the display one or more selection buttons including a chorus section selection button to be manipulated by an operator for selecting a chorus section included in the plurality of characteristic music structure sections,
wherein the function of constructing the interface on the display is further capable of graphically displaying a length of the music audio data along a time axis on the display and is also capable of graphically displaying along the time axis a playback position of the music audio data which is being played back by the music audio data playback apparatus and the plurality of characteristic music structure sections,
wherein the plurality of characteristic music structure sections include a plurality of chorus sections indicative of chorus parts of a piece of music and a plurality of repeated sections indicative of repeated parts of the music except for the chorus sections; and wherein the function of constructing the interface on the display is further capable of distinctively displaying the plurality of chorus sections and the plurality of repeated sections, and representing the plurality of chorus sections and the plurality of repeated sections displayed on the display as the one or more selection buttons to be manipulated by an operator for selecting an arbitrary characteristic music structure section from the plurality of characteristic music structure sections.

32. A chorus section detection method for detecting a chorus section in music audio data, which detects a part corresponding to a chorus section in music audio data of a piece of music in order to detect repeated chorus sections in the music, comprising:

an acoustic feature extraction step of sequentially extracting acoustic features from the music audio data every predetermined time unit;

a similarity calculation step of calculating similarities between the acoustic features extracted from the music audio data;

a repeated section listing step of listing up a plurality of repeated sections repeatedly appearing in the music audio data, based on the similarities;

an integrated repeated section determination step of examining an interrelationship among the plurality of repeated sections listed up, integrating one or more of the repeated sections, which fall within a common section on a time axis, into one integrated repeated section on the time axis, grouping a plurality of the integrated repeated sections thus obtained for each of the common sections into a plurality of types of integrated repeated section rows; and a chorus section determination step of determining the repeated chorus sections from the plurality of types of integrated repeated section rows.

33. The chorus section detection method for detecting a chorus section in music audio data according to claim 32, wherein each of the acoustic features extracted at the acoustic feature extraction step is 12-dimensional chroma vectors obtained by respectively adding, over a plurality of octaves, a power at frequency of each of 12 pitch classes included in a range of one octave.

34. The chorus section detection method for detecting a chorus section in music audio data according to claim 33, wherein the similarity calculation step calculates the similarities between acoustic features newly extracted and all of the acoustic features previously extracted.

35. The chorus section detection method for detecting a chorus section in music audio data according to claim 34, wherein the similarity calculation step calculates the similarities between the 12-dimensional chroma vectors at time t and all of the 12-dimensional chroma vectors during a period from time t to time 1 lag earlier ($0 \leq 1 \leq t$);

the repeated section listing step assumes one axis as a time axis and another axis as a lag axis, and lists up as the repeated section relative to the time axis a similarity line segment having a time length which corresponds to a length of a part where the similarity exceeds a predetermined threshold, when the similarity exceeds the predetermined threshold during a period of time longer than a predetermined time length.

36. The chorus section detection method for detecting a chorus section in music audio data according to claim 35, wherein the integrated repeated section determination step integrates the similarity line segments falling within the common section on the time axis into the integrated repeated section for each of the common sections, and groups a plurality of the integrated repeated sections into the plurality of types of the integrated repeated section rows, based on positions and lengths of the common sections on the time axis, and positional relationships relative to the lag axis among the similarity line segments to be grouped.

37. The chorus section detection method for detecting a chorus section in music audio data according to claim 36, wherein the integrated repeated section determination step creates the integrated repeated section row by complementing a first repeated section not included in the integrated repeated sections.

38. The chorus section detection method for detecting a chorus section in music audio data according to claim 32, wherein the music involves modulation;

the acoustic feature extraction step obtains 12 types of the acoustic features having different modulation widths by shifting the acoustic features comprising the 12-dimensional chroma vectors, by one modulation width, 11 times;

the similarity calculation step calculates the similarities between the acoustic features newly extracted and all of the acoustic features of the 12 types previously obtained to define the similarities between the 12-dimensional chroma vectors indicative of the acoustic features newly extracted at time t and the 12-dimensional chroma vectors indicative of all of the acoustic features of the 12 types that have been obtained during a period from time t to time 1 lag earlier ($0 \leq 1 \leq t$);

the repeated section listing step assumes one axis as a time axis t and another axis as a lag axis 1, and lists up the similarity line segments as the repeated sections relative to the time axis respectively for the 12 types of the acoustic features, each of the similarity line segments having a time length corresponding to a length of a part where the similarity exceeds a predetermined threshold during a period of time longer than a predetermined time length.

39. The chorus section detection method for detecting a chorus section in music audio data according to claim 38, wherein the integrated repeated section determination step integrates the similarity line segments falling within the common section on the time axis into an integrated repeated section for each of the 12 types of the acoustic features and groups a plurality of the integrated repeated sections determined for the 12 types of the acoustic features into the plurality of types of integrated repeated section rows with consideration given to the plurality of types of modulations, based on positions and lengths of the common sections on the time axis, and positional relationships relative to the lag axis among the similarity line segments to be grouped.

40. The chorus section detection method for detecting a chorus section in music audio data according to claim 32, wherein the chorus section determination step evaluates chorus possibility for each of the integrated repeated sections included in each of the integrated repeated rows, based on a mean of the similarities of the integrated repeated sections included in each of the integrated repeated section rows and the number and length of the integrated repeated sections included in each of the integrated repeated section rows, and defines the integrated repeated sections, included in the integrated repeated section row, having the highest chorus possibility as the chorus sections.

41. A chorus section detection apparatus for detecting a chorus section in music audio data, which detects a part corresponding to a chorus section in music audio data of a piece of music and displays the part on a display means in order to detect repeated chorus sections in the music, comprising:

an acoustic feature extraction means for sequentially extracting acoustic features from the music audio data every predetermined time unit;

a similarity calculation means for calculating similarities between the acoustic features extracted from the music audio data;

a repeated section listing means for listing up a plurality of repeated sections repeatedly appearing in the music audio data, based on the similarities;

an integrated repeated section determination means for examining an interrelationship among the plurality of repeated sections listed up, integrating one or more of the repeated sections, which fall within a common section on a time axis, into one integrated repeated section, and grouping a plurality of the integrated repeated sections thus obtained into a plurality of types of integrated repeated section rows; and a chorus section determination means for determining the chorus sections from the plurality of types of integrated repeated section rows, wherein the plurality of types of integrated repeated section rows are displayed on the display means, and the integrated repeated section row including the chorus sections displayed in a different manner from the other integrated repeated section rows.

42. A chorus section detection apparatus for detecting a chorus section in music audio data, which detects a part corresponding to a chorus section in music audio data of a piece of music and displays the part on a display means in order to detect repeated chorus sections to be repeated in the music, comprising;

an acoustic feature extraction means for sequentially extracting acoustic features from the music audio data every predetermined time unit;

a similarity calculation means for calculating similarities between the acoustic features extracted from the music audio data;

a repeated section listing means for listing up a plurality of repeated sections repeatedly appearing in the music audio data, based on the similarities;

an integrated repeated section determination means for examining an interrelationship among the plurality of repeated sections listed up, integrating one or more of the repeated sections, which fall within a common section on a time axis, into one integrated repeated section, and grouping a plurality of the integrated repeated sections thus obtained into a plurality of types of integrated repeated section rows; and a chorus section determination means for determining the repeated chorus sections from the plurality of types of integrated repeated section rows.

43. The chorus section detection apparatus for detecting a chorus section in music audio data according to claim 42, wherein the integrated repeated section determination means is so constructed as to create the integrated repeated section row by complementing a first repeated section not included in the integrated repeated sections.

44. A playback chorus section detection apparatus for detecting a chorus section in music audio data, which detects a part corresponding to a chorus section in music audio data of a piece of music and play back the chorus section by means of a playback means, comprising:

an acoustic feature extraction means for sequentially extracting acoustic features from the music audio data every predetermined time unit;

a similarity calculation means for calculating similarities between the acoustic features extracted from the music audio data;

a repeated section listing means for listing up a plurality of repeated sections repeatedly appearing in the music audio data, based on the similarities;

an integrated repeated section determination means for examining an interrelationship among the plurality of repeated sections listed up, integrating one or more of the repeated sections, which fall within a common section on a time axis, into one integrated repeated section, and grouping a plurality of the integrated repeated sections thus obtained into a plurality of types of integrated repeated section rows; and a chorus section determination means for determining the chorus sections from the plurality of types of integrated repeated section rows, wherein the plurality of types of integrated repeated section rows are selectively played back by the playback means.

45. A computer-readable medium including a program for a music playback system, intended for causing a computer to implement a method of detecting a part corresponding to a chorus section in music audio data of a piece of music in order to detect the repeated chorus sections in the music, the program being constructed to cause the computer to perform:

an acoustic feature extraction step of sequentially extracting acoustic features from the music audio data every predetermined time unit;

a similarity calculation step of calculating similarities between the acoustic features extracted from the music audio data;

a repeated section listing step of listing up a plurality of repeated sections repeatedly appearing in the music audio data, based on the similarity;

an integrated repeated section determination step of examining an interrelationship among the plurality of repeated sections listed up, integrating one or more of the repeated sections, which fall within a common section on a time axis, into one integrated repeated section, and grouping a plurality of the integrated repeated sections thus obtained into a plurality of types of integrated repeated section rows; and a chorus section determination step of determining the repeated chorus sections from the plurality of types of integrated repeated section rows.

46. The computer-readable medium including a program for a music playback system according to claim 45, wherein the integrated repeated section determination step creates the integrated repeated section row by complementing a first repeated section not included in the integrated repeated sections.

* * * * *